United States Patent
Soga et al.

(10) Patent No.: US 6,560,579 B2
(45) Date of Patent: *May 6, 2003

(54) FREIGHT INFORMATION MANAGEMENT METHOD AND FREIGHT MANAGEMENT SYSTEM USING ELECTRONIC TAGS

(75) Inventors: Shuji Soga, Kawasaki (JP); Kazuhiko Taniguchi, Yokohama (JP); Toshiyuki Ono, Kawasaki (JP); Norihiro Kimijima, Yokohama (JP); Izumi Ota, Yokohama (JP); Isao Tsushima, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/956,975

(22) Filed: Sep. 21, 2001

(65) Prior Publication Data

US 2002/0010606 A1 Jan. 24, 2002

Related U.S. Application Data

(63) Continuation of application No. 09/287,099, filed on Apr. 7, 1999, now Pat. No. 6,304,856.

(30) Foreign Application Priority Data

Apr. 8, 1998 (JP) .......................................... 10-095697

(51) Int. Cl.⁷ .............................................. G06F 17/60
(52) U.S. Cl. .............................. 705/28; 705/7; 705/22
(58) Field of Search ............................. 705/7, 28, 22; 235/380, 381, 382, 382.5; 340/825, 825.01, 2.23, 2.26, 3.1, 3.5, 3.54

(56) References Cited

U.S. PATENT DOCUMENTS 4,340,810 A     7/1982  Glass ......................... 235/375

(List continued on next page.)

FOREIGN PATENT DOCUMENTS

| EP | 0512543 A2 | * 11/1992 | .......... G06K/19/07 |
| EP | 0123456 A2 | 1/2000 | |
| JP | 4-341414 | 11/1992 | |
| JP | 11296581 A1 | 10/1999 | ........... G06F/17/60 |

OTHER PUBLICATIONS

"WiData Announces WiData Firefly—Wireless Resource Mangement System for Timely and Accurate Control of Supply Chain Assets", Business Wire, May 5, 1998, [retrieved on Aug. 22, 2002], 3 pages, Retrieved from: Dialog.*
"Labels and Tags Can Have RF too," Automatic I.D. News, Feb. 1998, vol. 4, Issue 2, 1 page.*
"Radio Frequency Identification [RF/ID]," Automatic I.D. News, Mar. 1998, vol. 14, Issue 4, 2 pages.*
Moore, Bert, "Radio Frequency Identification: Where's the Revolution?," Automatic I.D. News, Jan. 1998, vol. 14, Issue 1, 5 pages.*
Moore, "New Technologies make their mark on business," Automatic I.D. News, Jun. 1998, vol. 14, No. 7, 5 pages.

*Primary Examiner*—Tariq R. Hafiz
*Assistant Examiner*—Beth Van Doren
(74) *Attorney, Agent, or Firm*—Mattingly, Stanger & Malur, P.C.

(57) ABSTRACT

A collection request inputted at a consignor destination system is recorded on an electronic tag attached to freight and sent to a collection management system so as to be received. During collection of freight, information concerning collection is recorded on the electronic tag by means of a terminal unit and the collection information is sent to the collection management system. An in-base station freight information management system informs a freight information overall management system of the collection information and information concerning freight passing through the base station. The freight information overall management system acquires a transport history of the freight on the basis of the information sent from the in-base station freight information management system, calculates a delivery schedule of the freight and informs it to each in-base station freight information management system.

2 Claims, 48 Drawing Sheets

U.S. PATENT DOCUMENTS

| | | | | |
|---|---|---|---|---|
| 4,832,204 A | * | 5/1989 | Handy et al. | 209/3.3 |
| 5,043,908 A | * | 8/1991 | Manduley et al. | 198/349.6 |
| 5,485,369 A | | 1/1996 | Nicholls et al. | 705/9 |
| 5,557,096 A | * | 9/1996 | Watanabe et al. | 235/375 |
| 5,627,517 A | * | 5/1997 | Theimer et al. | 340/505 |
| 5,631,827 A | | 5/1997 | Nicholls et al. | 174/30 |
| 5,712,789 A | | 1/1998 | Radican | 700/226 |
| 5,774,876 A | * | 6/1998 | Woolley et al. | 235/385 |
| 5,804,810 A | * | 9/1998 | Woolley et al. | 235/375 |
| 5,831,860 A | * | 11/1998 | Foladare et al. | 700/219 |
| 5,850,187 A | * | 12/1998 | Carrender et al. | 340/10.42 |
| 5,971,587 A | * | 10/1999 | Kato et al. | 340/10.34 |
| 6,148,291 A | | 11/2000 | Radican | 705/28 |
| 6,304,856 B1 | * | 10/2001 | Soga et al. | 705/28 |

* cited by examiner

FIG. 13

| | INPUT ITEMS | INPUT CONTENTS | |
|---|---|---|---|
| FREIGHT INFORMATION | ARTICLE | TIMEPIECE | 1312 |
| | NUMBER | 1 | 1316 |
| | INCIDENTAL SERVICE | TIME APPOINTMENT | 1318 |
| | APPOINTED DELIVERY DATE | 8/16 10:00 | 1320 |
| | SPECIAL FREIGHT INDEX | PRECISION MACHINERY AND INSTRUMENTS | 1322 |
| | BILL INDEX | CASH INCOME | 1324 |
| CONSIGNOR INFORMATION | CONSIGNOR CODE | 345678 | 1326 |
| | NAME | SOGA KENTA | 1328 |
| | ADDRESS | KANAGAWA-KEN KAWASAKI-SHI SAIWAI-KU KOKURA1-1··· | 1330 |
| | TELEPHONE NUMBER | 044-511-×××× | 1332 |
| | ELECTRONIC ADDRESS | soga@hyper.log.******.jp | 1334 |
| | READER/WRITER TYPE | ELECTRONIC READER/WRITER | 1335 |
| CONSIGNEE INFORMATION | NAME | HITACHI HANAKO | 1336 |
| | ADDRESS | OHSAKA-FU SUITA-SHI SENRIGAOKA ··· | 1338 |
| | TELEPHONE NUMBER | 06-878-××× | 1340 |
| | ELECTRONIC ADDRESS | hitati@senri.******.jp | 1342 |
| CONSIGNEE BRANCH OFFICE INFORMATION | NAME | HITACHI JIRO | 1348 |
| | ADDRESS | OHSAKA-FU SUITA-SHI YAMADAGAOKA ··· | 1350 |
| | TELEPHONE NUMBER | 06-879-××× | 1352 |
| | ELECTRONIC ADDRESS | j-hitati@yamada.******.jp | 1354 |
| DESIRABLE COLLECTION DATE | | 8/15 10:30 | 1310 |

<DATE:8/11~15> — 1410

| TIME ZONE \ AREA | TOTSUKU-KU:SAEDO-KU KAWAWA-CHO, KAGAHARA ... | TOTSUKU-KU:KITAYAMADA MINAMIYAMATA, HIGASHIYAMADA ... | KOHHOKU-KU: SHINYOSHIDA-CHO NIIBA-CHO, TAKADA-CHO ... |
|---|---|---|---|
| 8:00~10:00 | PERSON IN CHARGE NO.10 | PERSON IN CHARGE NO.12 | PERSON IN CHARGE NO.14 |
| 10:00~12:00 | PERSON IN CHARGE NO.11 | PERSON IN CHARGE NO.10 | PERSON IN CHARGE NO.12 |
| · | · | · | · |
| 18:00~20:00 | PERSON IN CHARGE NO.10 | PERSON IN CHARGE NO.10 | PERSON IN CHARGE NO.10 |

| PERSON IN CHARGE NO. /1610 | PORTABLE TERMINAL NO. /1620 |
|---|---|
| 10 | PORTABLE TERMINAL NO.10 |
| 11 | PORTABLE TERMINAL NO.15 |
| 12 | PORTABLE TERMINAL NO.21 |
| ⋮ | ⋮ |

| ADDRESS /1700 | | | ARRIVAL STORE NAME /1720 |
|---|---|---|---|
| METROPOLIS AND DISTRICTS /1710 | CITY·DISTRICT | WARD·SUBWARD· VILLAGE | |
| KANAGAWA-KEN | YOKOHAMA-SHI | TOTSUKU-KU KAGAHARA | TOTSUKU-TEN |
| | | TOTSUKU-KAWAWA-CHO | TOTSUKU-TEN |
| | | · | · |
| | | KOHHOKU-KU SHINYOSHIDA-CHO | KOHHOKU NISHI-TEN |
| | | KOHHOKU-KU NIIBA-CHO | KOHHOKU NISHI-TEN |
| | | ⋮ | ⋮ |

FIG. 21

| CHARGE ITEM | FLAT RATE |
|---|---|
| COLLECTION FEE | 30 YEN |
| LOADING/UNLOADING FEE | 20 YEN |
| ⋮ | ⋮ |

FIG. 22

| INCIDENTAL SERVICE ITEM | FEE |
|---|---|
| TIME APPOINTMENT | 300YEN |
| CHILLED TRANSPORT | 350YEN |
| ⋮ | ⋮ |

FIG. 23

| | DEPARTURE STORE / ARRIVAL STORE | TOTSUKU-TEN | KOHHKU NISHI-TEN | KOHHKU HIGASHI-TEN | ... |
|---|---|---|---|---|---|
| TOTSUKU-TEN | | 0km | 10km | 15km | ... |
| KOHHOKU NISHI-TEN | | 10km | 0km | 5km | ... |
| KOHHOKU HIGASHI-TEN | | 15km | 5km | 0km | ... |
| ⋮ | | ⋮ | ⋮ | ⋮ | ⋮ |

FIG. 24

| | WEIGHT / DISTANCE | 0~5km | 5~10km | 10~20km | ... |
|---|---|---|---|---|---|
| 0~10km | | 250 YEN | 300 YEN | 350 YEN | ... |
| 10~30km | | 320 YEN | 370 YEN | 420 YEN | ... |
| 30~100km | | 400 YEN | 450 YEN | 500 YEN | ... |
| ⋮ | | ⋮ | ⋮ | ⋮ | ⋮ |

| FREIGHT NO. | CHANGED DELIVERY DESTINATION ||||| CHANGED ARRIVAL STORE NAME | CHANGED DESIRABLE DELIVERY TIME |
|---|---|---|---|---|---|---|---|
| | NAME | ADDRESS | TELEPHONE NUMBER | ELECTRONIC ADDRESS | | | |
| 1234567890 | TANIGUCHI IZUMI | YOKOHAMA-SHI TOTSUKU-KU KAGAHARA* | 045 (948)* | tani@*.*.*.jp | | TOTSUKU-TEN | — |
| 1357638213 | — | — | — | — | | — | 8/15 18:00 |
| ... | ... | ... | ... | ... | | ... | ... |

| ARRIVAL STORE NAME \ DEPARTURE STORE NAME | SAPPORO NISHI-TEN | ... | FUKUOKA HIGASHI-TEN | ... |
|---|---|---|---|---|
| SAPPORO NISHI-TEN | SAPPORO NISHI-TEN | ... | FUKUOKA HIGASHI-TEN | ... |
| ... | ... | ... | ... | ... |
| FUKUOKA HIGASHI-TEN | SAPPORO NISHI-TEN CHITOSE KUHKOH-TEN FUKUOKA KUHKOH-TEN FUKUOKA HIGASHI-TEN | ... | FUKUOKA HIGASHI-TEN FUKUOKA KUHKOH-TEN CHITOSE KUHKOH-TEN SAPPORO NISHI-TEN | ... |
| ... | ... | ... | ... | ... |
| FUKUOKA HIGASHI-TEN | ... | ... | FUKUOKA HIGASHI-TEN | ... |
| ... | ... | ... | ... | ... |

| FREIGHT NO. | LOT NUMBER NO. | NUMBER |
|---|---|---|
| 1234567890 | 3 | 50 |
| 3456789012 | 11 | 20 |
| 1234567890 | 6 | 50 |
| 3456789012 | 8 | 20 |
| ⋮ | ⋮ | ⋮ |

FIG. 30

| FREIGHT NO. | LOT NUMBER | BASE STATION NAME | WORK INDEX | PASS TIME | VEHICLE NO. | CUSTODY INDEX | PERSON IN CHARGE NAME |
|---|---|---|---|---|---|---|---|
| 1234567890 | 3 | TOTSUKU-TEN | UNLOADING | 8/16 13:21 | — | — | SOGA |
| 2345678901 | — | TOTSUKU-TEN | SORTING | 8/16 13:32 | — | CUSTODY | TOKO |
| 3456789012 | — | TOTSUKU-TEN | LOADING | 8/16 13:51 | 13 | — | ONO |
| ... | ... | ... | ... | ... | ... | ... | ... |

| SORTING PORT NO. | ARRIVAL STORE NARE |
|---|---|
| SORTING PORT 1 | SAIWAI-TEN<br>NAKAHARA-TEN |
| SORTING PORT 2 | MIYAMAE-TEN<br>TAMA-TEN |
| ⋮ | ⋮ |
| SORTING PORT n | NONE |

| SORTING TIME ZONE (3710) | DELIVERY END SCHEDULE TIME (3720) |
|---|---|
| 10:00~12:00 | 14:00 |
| 12:00~14:00 | 16:00 |
| ⋮ | ⋮ |

FIG. 35

| SORTING PORT NO. (3810) | ADDRESS (3820) |
|---|---|
| SORTING PORT 1 | KAWASAKI-SHI SAIWAI-KU ICHIBA, KAWASAKI-SHI SAIWAI-KU SHIMOHIRAMA,··· |
| SORTING PORT 2 | KAWASAKI-SHI NAKAHARA-KU ODAMNAKA, KAWASAKI-SHI NAKAHARA-KU SHIMOODANAKA, |
| ⋮ | ⋮ |
| SORTING PORT n | NONE |

| FREIGHT NO. | NUMBER | DELIVERY DESTINATION | | | APPOINTED DELIVERY DATE |
|---|---|---|---|---|---|
| | | NAME | ADDRESS | TELEPHONE NUMBER | |
| 1234567890 | 1 | SOGA TAROH | KAWASAKI-SHI NAKAHARA-KU KAMIODANAKA *** | 044 (798) **** | 18:00 |
| 2345678901 | 2 | TANI COPPO (INC.) | YOKOHAMA-SHI HODOGAYA-KU KAMIHOSHIKAWA*** | 045 (371) **** | — |
| ... | ... | ... | ... | ... | ... |

| FREIGHT NO. | LOT NO. | APPOINTED DELIVERY TIME DESIRABLE DELIVERY TIME | ENTRY DATE | LOCATION |
|---|---|---|---|---|
| 4410 | 4420 | 4430 | 4440 | 4450 |
| 1234567890 | — | 8/14 18:00 | 8/13 14:24 | A5 |
| ... | ... | ... | ... | ... |

<FREIGHT NO.> 4800

| PASS POINT | BASE STATION NAME | WORK INDEX | PASS DATE | | PERSON IN CHARGE | MAIL NAME |
|---|---|---|---|---|---|---|
| CONSIGNOR | SAIWAI-TEN | COLLECTION | 4/1 | 10:30 | N | COLLECTION MAIL 11 |
| O1 | SAIWAI-TEN | UNLOADING | 4/1 | 11:15 | M | COLLECTION MAIL 11 |
| O1 | SAIWAI-TEN | SORTING | 4/1 | 11:35 | P | — |
| O1 | SAIWAI-TEN | LOADING | 4/1 | 11:55 | O | DEPARTURE MAIL 21 |
| A2 | HANEDA KUHKOH-TEN | UNLOADING | 4/1 | 13:10 | R | DEPARTURE MAIL 21 |
| A2 | HANEDA KUHKOH-TEN | SORTING | 4/1 | 13:30 | S | — |
| A2 | HANEDA KUHKOH-TEN | LOADING | 4/1 | 13:58 | T | AIR MAIL 101 |
| B2 | ITAMI KUHKOH-TEN | UNLOADING | 4/1 | 15:18 | L | AIR MAIL 101 |
| B2 | ITAMI KUHKOH-TEN | SORTING | 4/1 | 15:33 | Y | — |
| B2 | ITAMI KUHKOH-TEN | LOADING | 4/1 | 15:51 | C | ARRIVAL MAIL 31 |

| FREIGHT NO. | 1234567890 |
|---|---|
| ARTICLE | TIMEPIECE |
| NUMBER | 1 |
| WEIGHT | 2.5Kg |
| INCIDENTAL SERVICE | TIME APPOINTMENT |
| APPOINTED DELIVERY DATE | 8/16 10:00 |
| SPECIAL FREIGHT INDEX | PRECISION MACHINERY AND INSTRUMENTS |
| BILL INDEX | CASH INCOME |
| CHARGE | 1590 YEN |
| CONSIGNOR INFORMATION — CONSIGNOR CODE | 345678 |
| CONSIGNOR INFORMATION — ADDRESS | KANAGAWA-KEN KAWASAKI-SHI SAIWAI-KU KOKURA1-1 |
| CONSIGNOR INFORMATION — NAME | SOGA KENTA |
| CONSIGNOR INFORMATION — TELEPHONE NUMBER | 044-511-×××× |
| CONSIGNOR INFORMATION — ELECTRONIC ADDRESS | soga@hyper.log.*.*.jp |
| CONSIGNOR INFORMATION — READER/WRITER TYPE | ELECTRONIC TAG READER/WRITER |
| CONSIGNOR INFORMATION — ADDRESS | OHSAKA-FU SUITA-SHI SENRIGAOKA |
| CONSIGNOR INFORMATION — NAME | HITACHI HANAKO |
| CONSIGNOR INFORMATION — TELEPHONE NUMBER | 06-878-×××× |
| CONSIGNOR INFORMATION — ELECTRONIC ADDRESS | hitati@senri.*.*.jp |
| CONSIGNEE BRANCH OFFICE INFORMATION — ADDRESS | OHSAKA-FU SUITA-SHI YAMADAGAOKA |
| CONSIGNEE BRANCH OFFICE INFORMATION — NAME | HITACHI HANAKO |
| CONSIGNEE BRANCH OFFICE INFORMATION — TELEPHONE NUMBER | 06-879-×××× |
| CONSIGNEE BRANCH OFFICE INFORMATION — ELECTRONIC ADDRESS | j-hitati@yamada.*.*.jp |
| DESIRABLE DELIVERY DATE | |
| DESIRABLE COLLECTION DATE | 8/15 10:30 |
| FREIGHT RECIPIENT | TANIGUCHI IZUMI |
| DEPARTURE STORE | SAIWAI-TEN |
| ARRIVAL STORE | SUITA-TEN |

FIG. 47

| ARRIVAL STORE / DEPARTURE STORE NAME (5010) | DISTRICT AREA (5020) |
|---|---|
| $D_1$ | KAWASAKI-SHI ASOH-KU、 KAWASAKI-SHI MIYAMAE-KU、··· |
| $D_2$ | YAMATO-SHI TSURUMA、 YAMATO-SHI HAYASIMA、··· |
| ⋮ | |
| $D_m$ | NAGOYA-SHI SHOWA-KU、 NAGOYA-SHI MIZUHO-KU、··· |
| ⋮ | |

<FREIGHT NO.> (4910)

| BASE STATION INDEX | ARRIVAL BASE STATION NAME (4920) | ARRIVAL SCHEDULE DATE (4930) |
|---|---|---|
| CONSIGNOR | — | 4/1 10:00−11:00 |
| DEPARTURE STORE | $O_1$ | 4/1 11:00 |
| DEPARTURE TRANSIT STORE | $A_2$ | 4/1 13:00 |
| ARRIVAL TRANSIT STORE | $B_2$ | 4/1 15:00 |
| ARRIVAL STORE | $D_5$ | 4/1 17:00 |
| DELIVERY DESTINATION | — | 4/1 18:00−19:00 |

| <BASE STATION NAME:D5> | | |
|---|---|---|
| WORK SHIFT | START TIME | END TIME |
| WORK SHIFT 1 | 7:30 | 8:00 |
| WORK SHIFT 2 | 8:30 | 9:00 |
| • | • | • |
| • | • | • |
| WORK SHIFT 9 | 16:20 | 17:10 |
| WORK SHIFT 10 | 17:20 | 17:50 |
| WORK SHIFT 11 | 18:10 | 18:40 |
| • | • | • |

5410, 5420, 5400, 5430

| FREIGHT NO. (6210) | ARRIVAL SCHEDULE DATE (6220) |
|---|---|
| 1234567890 | 8/17 13:00 |
| ⋮ | ⋮ |

6000, 6230

FREIGHT INFORMATION MANAGEMENT METHOD AND FREIGHT MANAGEMENT SYSTEM USING ELECTRONIC TAGS

This is a continuation application of U.S. Ser. No. 09/287,099, filed Apr. 7, 1999, now U.S. Pat. No. 6,304,856.

BACKGROUND OF THE INVENTION

The present invention relates to a method of managing freight information for performing freight transportation from a consignor to a consignee and a freight management system and more particularly, to a freight information management method and a freight management system which use a contactless information readable IC card as an electronic tag and have many freight loading/unloading base stations so as to be suitable for wide area transport requiring quick and accurate transportation.

In mixed freight transportation services for transport of mixed freight goods of many consignors, as represented by door to door delivery, freight goods are transported from a consignor to a consignee through many stages of base stations. Under the circumstances, with a view to improving the quality of transport service including prevention of irregular conditions such as loss of freight, misunderstood delivery destination and damage, the freight pursuit intending to precisely catch the pass history of freight at each base station is of significant importance.

At the present-day practical level, a system using a bar code has been used widely as a means for realizing the freight pursuit. In the bar code system, the freight pursuit is carried out by printing a bar code indicative of a freight number on a freight slip and reading the bar code on the slip attached to the freight at each pass base station. But, in the bar code system, it is necessary for reading the bar code to align the direction of the freight goods and to scan for read of information freight by freight. Further, technical restrictions are encountered in which only initially registered information can be held or the capacity of information which can be held is small. Consequently, acquisition work of freight pass information is laborious and time-consuming, raising a problem that perfect automation of freight control such as sorting is difficult to achieve without resort to manual labor. Further, owing to these problems, there arises other fatal problems from the standpoint of freight pursuit that a time lag occurs between acquired freight history information and actual freight transit or items in the freight history information are insufficient.

To solve these problems, a freight information management method has been studied recently, according to which an electronic freight slip (electronic tag) utilizing an IC card capable of storing a great amount of information and writing and reading information in a contactless fashion is used in place of the freight slip printed with a bar code. Such a technique as above is described in, for example, JP-A-4-341414. In the literature, when delivery information is stored in an electronic tag in response to an inquiry signal from an electronic reader/writer installed in a truck in a navigation system using the electronic tag and adapted to transmit stored delivery information, the position information of a delivery destination is inputted on longitude and latitude corresponding to GPS information. On the other hand, the truck detects its vehicle position by means of a GPS (Global Positioning System) to display its present position in the form of a present position indication mark on a navigation map displayed on an indicator of a navigation unit and at the same time, displays on the navigation map, as delivery destination, position information of the delivery destination contained in the delivery information read out of the electronic tag and inputted to the navigation unit. According to JP-A-4-341414 as above, even an unexperienced door to door delivery worker can set a delivery route as exactly as an experienced worker does and delivery miss and missing delivery can be prevented.

SUMMARY OF THE INVENTION

In the transport information management method using the electronic tag, its application range is not limited to the method applied to navigation and the electronic tag can be utilized effectively by solving problems as below.

(1) When collection request information or the like is written into the electronic tag at a consignor destination, there arises a practical problem that installation conditions in the information system at the consignor destination differ including a site where an electronic reader/writer can be installed, a site where an IC card reader/writer can be installed and a site where only a bar code label printer can be installed.

(2) When a request for changing the delivery destination/date occurs, a plurality of freight goods exist in one order (called lot) or special freight goods such as fragile or precision machinery and instruments are handled, there arises a problem as to how use of the electronic tag should be made in the case as above.

(3) There arises a problem as to how the electronic tag should be utilized in order to quickly deal with irregular conditions such as erroneous arrival, erroneous loading, left-out freight, nonarrival freight and over loading.

An object of the present invention is to provide a freight information management method which can realize freight transportation with high efficiency by using, as an electronic tag, a contactless information readable storage medium.

To accomplish the above object, according to a preferred embodiment of the present invention, in a freight information management system having a consignor destination system installed at a consignor destination, base station systems respectively provided at a plurality of base stations a dealer in delivering freight collected from the consignor destination to a consignee, a consignee destination system provided at a consignee destination, a freight information overall management system connected with the base station systems, and an electronic tag attached to the freight to be delivered and being capable of electronically storing freight information necessary for delivery, a collection request inputted by the consignor destination system is recorded on the electronic tag attached to the freight and transmitted to a collection management system in a base station system so as to be received thereby. During collection of the freight, information concerning the collection is recorded on the electronic tag by means of a terminal unit and the collection information is transmitted to the collection management system. The base station system informs the freight information overall management system of the collection information and information concerning the freight passing through the base station. The freight information overall management system acquires a transport history of the freight on the basis of the information sent from an in-base station freight information system and calculates a delivery schedule of the freight and informs it to each in-base station freight information management system.

According to another aspect, in the freight information management system using electronic tags, when an electronic reader/writer is provided at the consignor destination, collection request information and an arrival store name are written into an electronic tag in advance by means of the electronic reader/writer at the consignor destination but when the reader/writer for electronic tag is not provided at the consignor destination, collection request information received at a base station system is stored in a terminal unit used by a collector in charge and the collection request information precedently inputted in a terminal unit is written into an electronic tag at the consignor destination. In the course of transportation of the freight, freight transport history information such as arrival base station name, work end date and person in charge of work is written into the electronic tag by means of the electronic tag reader/writer connected to the aforementioned portable terminal, a on-vehicle terminal or a sorting unit at an end of unloading, sorting or loading work in each base station, so that the freight transport history of each freight may be caught precisely with reality. By comparing the freight transport history information with freight arrival schedule information and the collection information such as special freight handling and appointed delivery date, quick handling of the freight transport and irregular conditions can be realized on the aforementioned practical level.

BRIEF DESCRIPTION OF THE DRAWINGS

FIG. 13 is a data structural diagram of collection request information.

FIG. 14 is a data structural diagram of a time zone/area classified collector in charge DB.

FIG. 16 is a data structural diagram of a person in charge—portable terminal correspondence DB.

FIG. 17 is a data structural diagram of an address classified arrival store name DB.

FIG. 21 is a data structural diagram of a flat rate system DB.

FIG. 22 is a data structural diagram of an incidental service charge system DB.

FIG. 23 is a data structural diagram of a transport distance calculation DB.

FIG. 24 is a data structural diagram of a weight dependent charge system DB.

FIG. 27 is a data structural diagram of a delivery destination/date change freight DB.

FIG. 28 is a data structural diagram of a transport route pattern DB.

FIG. 29 is a data structural diagram of a lot freight information DB.

FIG. 30 is a data structural diagram of a freight pass information DB.

FIG. 34 is a data structural diagram of a sorting time zone—delivery end time correspondence DB.

FIG. 35 is a data structural diagram of an address classified sorting port DB.

FIG. 37 is a structural diagram of a delivery destination list.

FIG. 42 is a data structural diagram of a custody freight location DB.

FIG. 45 is a data structural diagram of a freight transport history DB.

FIG. 46 is a data structural diagram of a freight attribute DB.

FIG. 47 is a data structural diagram of an arrival store/departure store area information DB.

FIG. 48 is a data structural diagram of a transport route schedule DB.

FIG. 51 is a data structural diagram of a work shift master DB.

DESCRIPTION OF THE EMBODIMENTS

An embodiment of the present invention will be described hereunder in greater detail by way of example of mixed freight transportation services in which freight goods are transported under mixed loading of a plurality of shippers from a consignor to a consignee. Generally, in case of mixed freight transportation, transport freight is delivered from a consignor destination to a consignee via many stages of base stations including a departure store, a departure transit store, an arrival transit store and an arrival store.

Figure 1:
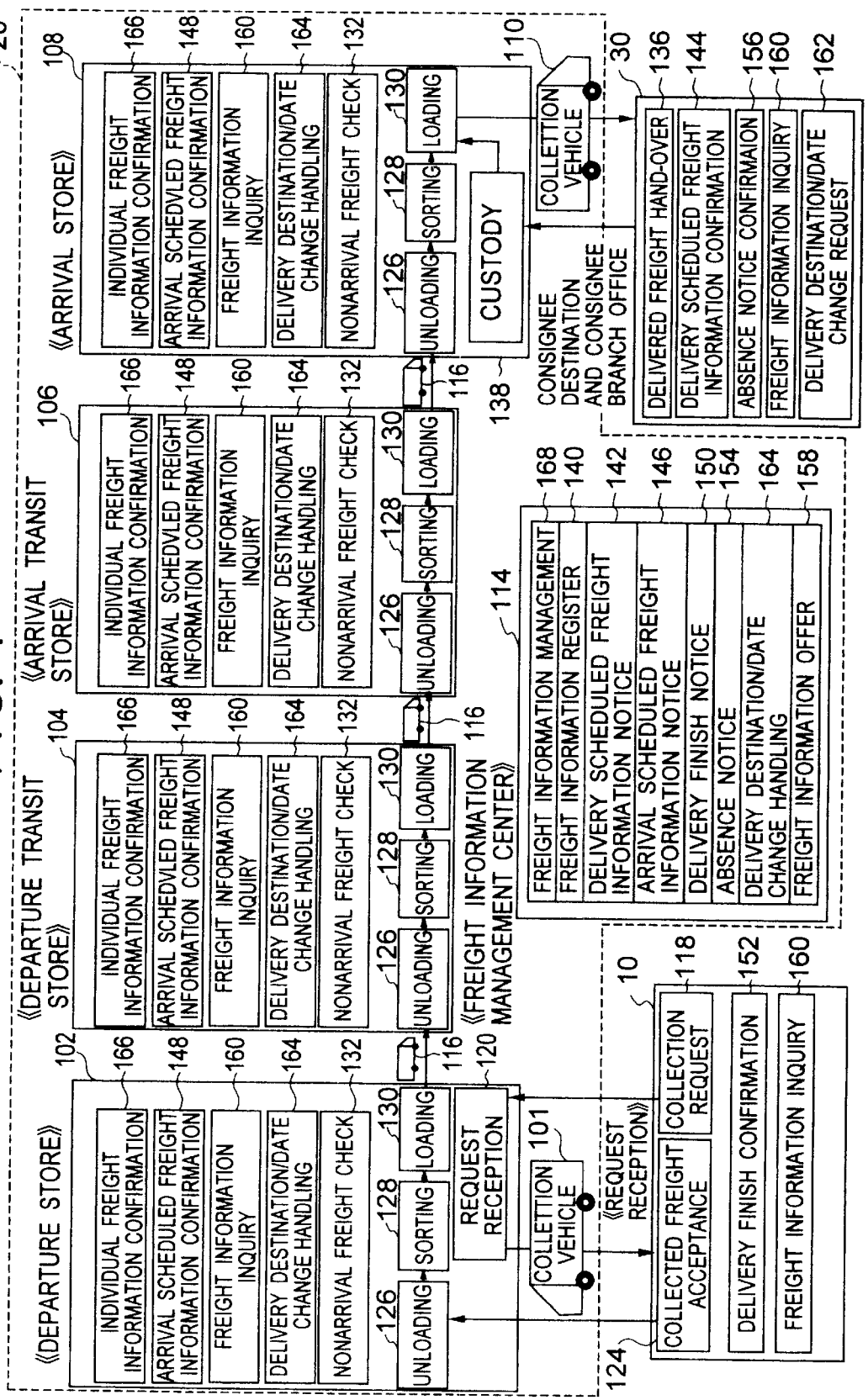
FIG. 1 is a conceptual diagram showing the function and the overall flow of mixed freight transportation services according to an embodiment of the present invention.

FIG. 1 is a conceptual diagram showing the function and the overall flow of mixed freight transportation services according to an embodiment of the present invention. The participant in the mixed freight transportation services includes a consignor 10, a carrier 20 and a consignee 30. An individual, an enterprise or the like entrusting transportation of freight comes under the consignor 10. The carrier 20 possesses base stations such as departure store 102, departure transit store 104, arrival transit store 106 and arrival store 108, a freight information management center 114, collection vehicles 101, transit vehicles 116 and delivery vehicles 110 and contracts transportation services. The consignee 30 corresponds to an individual or enterprise receiving freight. Generally, a plurality of consignors 10 and consignees 30 are involved. The overall flow of the mixed freight transportation services will be described below with reference to FIG. 1.

Firstly, the consignor 10 makes a request for collection to the carrier 20 (collection request process 118) and the carrier 20 receives the request (request reception process 120). Based on this, the carrier 20 causes a collection vehicle 101 to make the rounds of a plurality of consignor destinations so as to collect freight goods to be transported at individual consignor destinations (collected freight acceptance process 124). The collected freight goods are carried back to the departure store 102 and unloaded from the collection vehicle 101 (unloading process 126). Thereafter, the freight goods are sorted in accordance with destinations (sorting process 128), loaded on a transit vehicle 116 (loading process 130) and then transported to the next base station. During unloading 126, it is checked whether appointed freight goods correctly reach the departure store 102 (nonarrival freight check process 132).

Subsequently, as in the departure store 102, the unloading 126, sorting 128, loading 130 and nonarrival freight check 132 are carried out in each of the base stations of the departure transit store 104, arrival transit store 106 and arrival store 108 in this order.

After being loaded 130 onto a delivery vehicle 110 in the arrival store 108, the freight goods are transported to consignee destinations 30 and are handed over at the individual consignee destinations 30 (delivered freight hand-over process 136). At that time, in case a consignee is absent and the freight cannot be handed over, the freight is carried back to the arrival store 108 and kept in custody (custody process 138). Then, the loading 130, delivery transportation and delivered freight hand-over 136 are repeated at suitable timings.

During the collected freight acceptance 124 and the unloading 126, sorting 128, loading 130 and delivered freight hand-over 136 at each base station, freight information such as freight pass time is registered in the information management center 114 (freight information register process 140). Further, on the basis of the freight information registered at the time of collected freight acceptance 124, the freight information management center 114 informs the consignor of freight information such as delivery schedule time (delivery scheduled freight information informing process 142 and delivery scheduled freight information confirming process 144) and informs each base station of freight information such as arrival schedule time (arrival scheduled freight information informing process 146 and arrival scheduled freight information confirming process 148). In addition, when hand-over of the freight to the consignee 30 is correctly carried out on the basis of the freight information registered at the time of delivered freight hand-over, the freight information management center 114 gives information to this effect to the consignor 10 (delivery finish informing process 150 and delivery finish confirming process 152) but when hand-over of the freight cannot be carried out correctly because of absence of the consignee 30, gives information to this effect to the consignee 30 (absence notice process 154 and absence notice confirming process 156).

In addition to the above function, the mixed freight transportation services have the function of responding to inquiries about requests from the consignor 10, consignee 30 and each base station so as to cause the freight information management center 114 to offer to the requesters various kinds of information such as attribute information and pass time information concerning freight about which the inquiries are made (freight information offer process 158 and freight information inquiry process 160), the function of handling requests for change of the delivery destination and delivery time for the consignee (delivery destination/date change requesting process 162 and delivery destination/date change handling process 164), and the function of causing each base station to catch the freight information without resort to connection to the freight information management center 114 (individual freight information confirming process 166).

Figure 2:
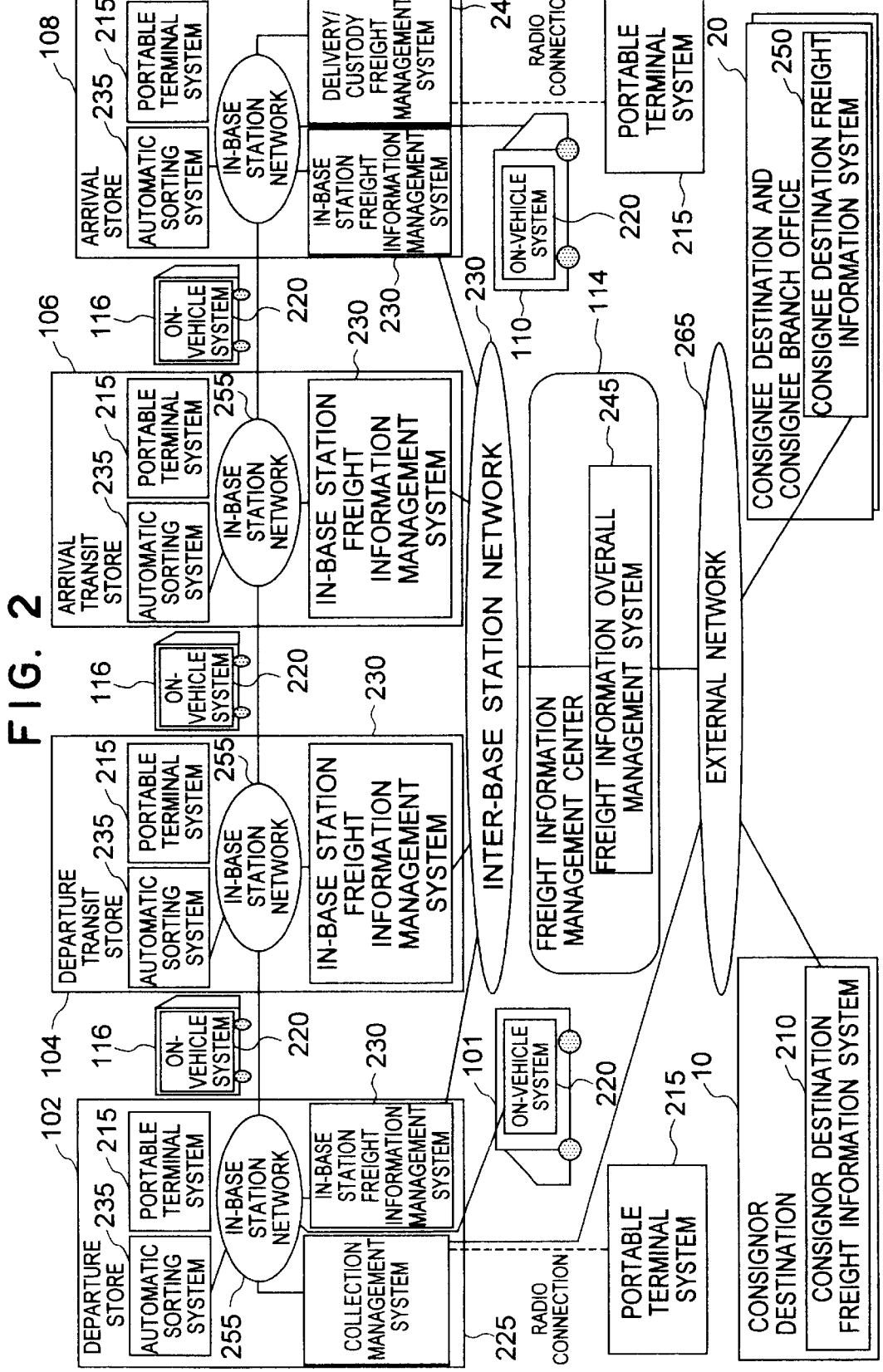
FIG. 2 is a block diagram showing the overall construction of a mixed freight transportation service system according to an embodiment of the present invention.

FIG. 2 is a block diagram showing the overall construction of a system for realizing, in the present embodiment, various kinds of functions at the consignor destination, each base station and freight information management center of the carrier and the consignee destination shown in FIG. 1. The system shown in FIG. 2 comprises a consignor destination freight information system 210 installed at the consignor destination 10, a portable terminal system 215 packaged in a portable terminal carried by a driver of the collection vehicle 101 or delivery vehicle 110 to the consignor destination 10 or consignee destination 30 and another portable terminal system 215 packaged in a portable terminal provided in each base station, on-vehicle systems 220 respectively installed in the collection vehicle 101, delivery vehicle 110 and transit vehicle 116, a collection management system 225 installed in the departure store, an in-base station freight information management system 230 and an automatic sorting system 235 which are installed in each base, a delivery/custody freight management system 240 installed in the arrival store 108, a freight information overall management system 245 installed in the freight information management center 114, a consignee destination freight information system 250 installed at the consignee destination or consignee branch office 20, in-base station networks 255 each adapted to interconnect individual systems in the base stations, an inter-base station network 260 for interconnecting the in-base station freight information management systems 230 in the individual base stations, and an external network 265 for connecting the freight information overall management system 245 to the consignor destination freight information system 210 and consignee destination freight information system 250. The portable terminal system 215 possessed by the driver connects to the collection management system 225 or the delivery/custody freight management system 240 by radio.

Figure 3:
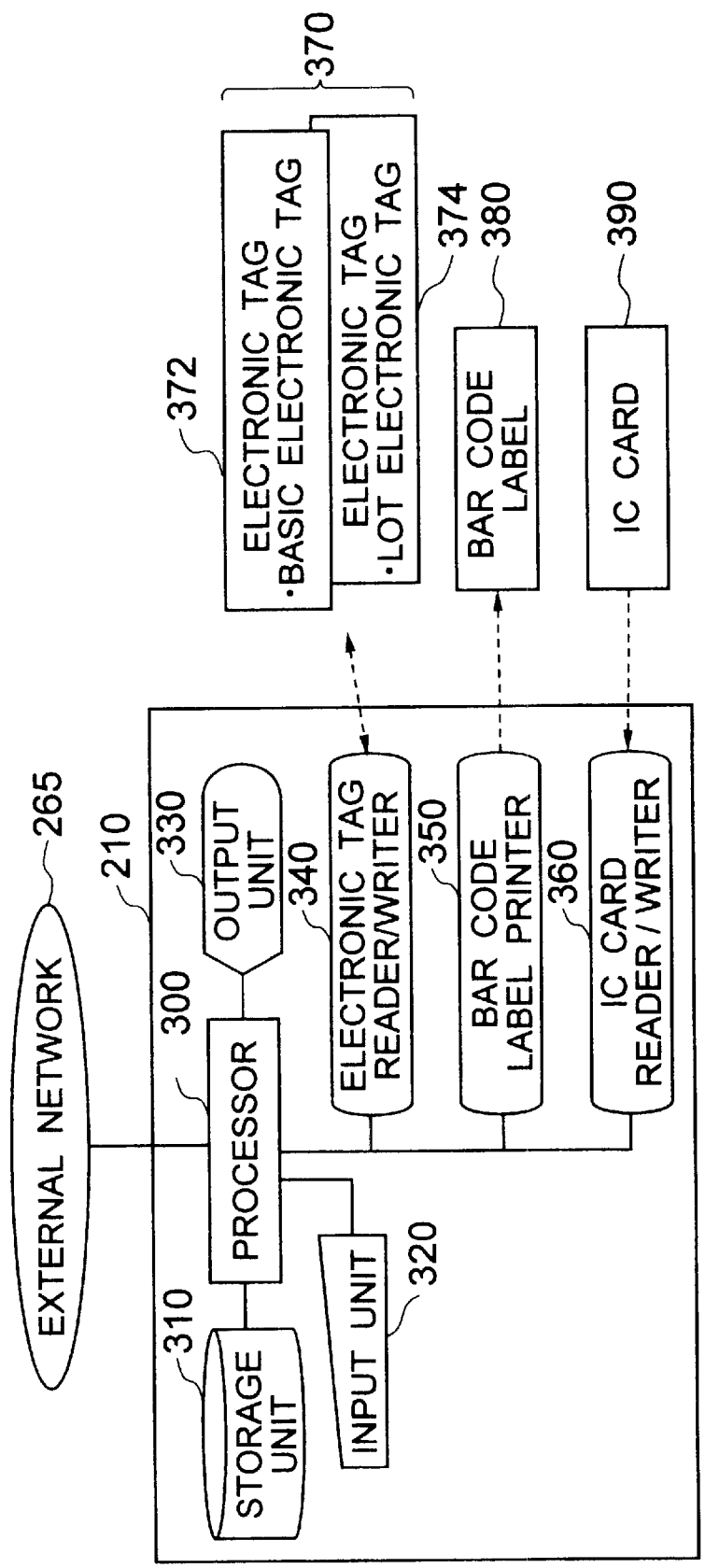
FIG. 3 is a structural diagram showing the construction of a consignor destination freight information system.

FIG. 3 is a structural diagram showing the construction of the consignor destination freight information system 210. The consignor destination freight information system 210 includes a processor 300, a storage unit 310, an input unit 320, an output unit 330, an electronic tag reader/writer 340, a bar code label printer 350, an IC card reader/writer 360, an electronic tag 370 and an IC card 390 which are used for the consignor to carry out the collection request process 118, delivery finish confirming process 152 and freight information inquiry process 160.

The input unit 320 is a general input unit such as keyboard, pointing device or the like. The output unit 330 is a general output unit such as display, printer or the like. The bar code label printer 350 is a unit for issuing a seal-like bar code label 380 printed with a bar code. The IC card reader/writer 360 is a unit for writing and reading information to and from the IC card 390. The IC card 390 is stored with special charge rules for individual consignors to be described later. The electronic tag 370 is an electronic freight slip including a storage medium which can read and write information in a contactless manner. The electronic tag reader/writer 340 is a unit for writing/reading information to/from the electronic tag 370.

In the present embodiment, the electronic tag 370 may have a form in which a storage medium capable of reading/writing information in a contactless manner is mounted to a part of conventionally used bound freight slips (for example, a receipt piece recovered at the time of delivery finish) or may be realized with a single storage medium such as a so-called contactless IC card.

Figure 57:
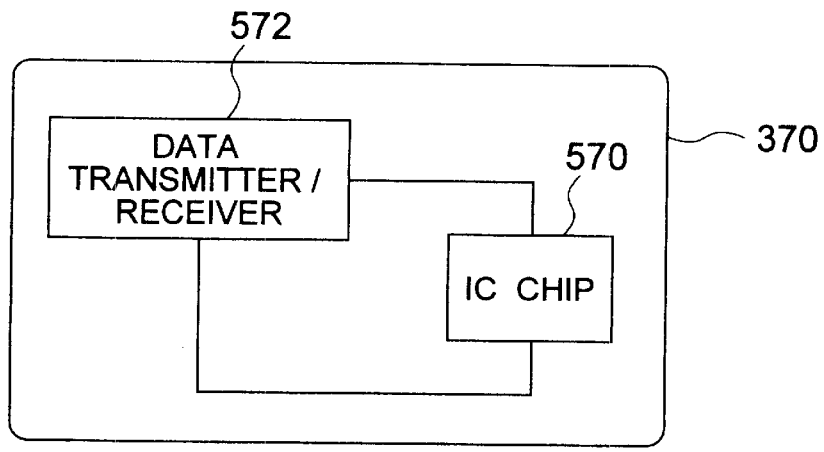
FIG. 57 is a schematic structural diagram of an electronic tag used in embodiments of the present invention.

An example of an electronic tag 370 using a single contactless IC card is shown in FIG. 57. In the figure, the electronic tag 370 includes an IC chip 570 for receiving and storing data from the electronic tag reader/writer and reading data from a memory in the electronic tag to transmit the data to the electronic tag reader/writer, and a data transmitter/receiver 572 for performing transmission and reception of data between the reader/writer and the electronic tag in a contactless fashion.

Figure 58:
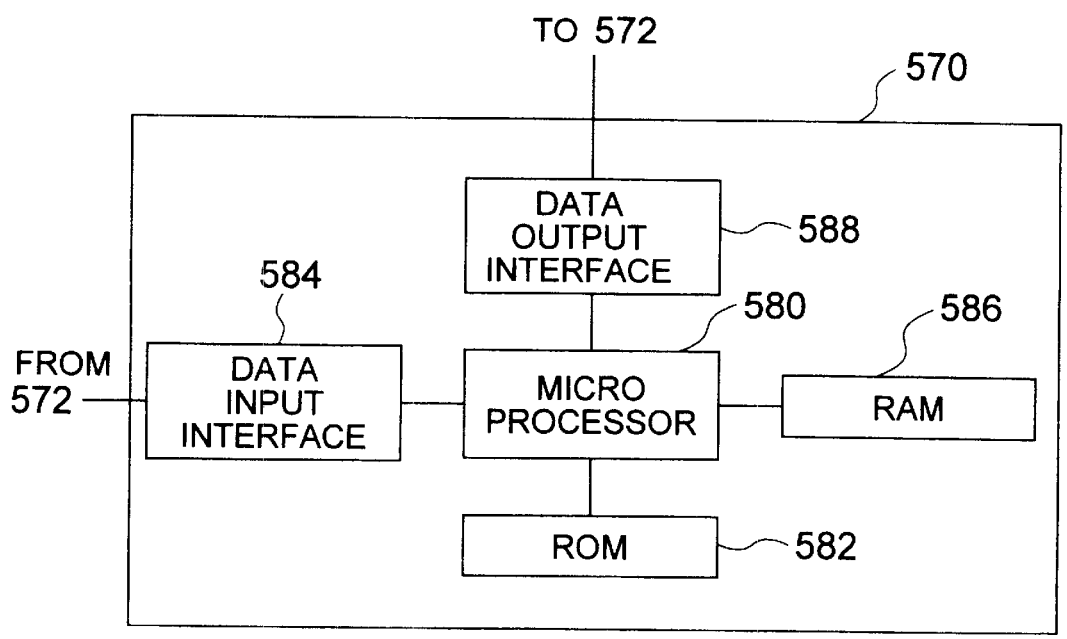
FIG. 58 is a schematic structural diagram of an IC chip shown in FIG. 57.

An example of internal construction of the IC chip 570 is shown in FIG. 58. In the figure, a microprocessor 580 mainly executes the process of data transmission/reception to/from the reader/writer in accordance with a program stored in a ROM (which may alternatively be a programmable ROM) 582. Data received from the reader/writer in a contactless fashion through the medium of a data input interface 584 is stored in a RAM 586 by means of the microprocessor 580. The microprocessor 580 transmits the data stored in the RAM 586 to the reader/writer in a contactless fashion through the medium of a data output interface 588.

As the contactless data transmission/reception system in the IC card, a system has been proposed which utilizes light, magnetism or electromagnetic wave. When a contactless data transmission/reception system utilizing electromagnetic waves, inclusive of a microwave system, is adopted as the electronic tag 370 used in the freight transportation system, the distance between the freight attached with the electronic tag 370 and the electronic tag reader/writer can be increased, thereby making it possible to perform identification and data transmission/reception while the freight being moved.

The electronic tag 370 is classified into a basic electronic tag 372 in which a freight number for definitely determining an order from the consignor is registered in advance and a lot electronic tag 374 which is used when the freight number is not registered and a plurality of freight goods are present for one order. A tag index for discriminating the basic electronic tag 372 from the lot electronic tag 374 is registered in these tags in advance. One consignor destination freight information system 210 is not always required to have all of the electronic reader/writer 340, bar code label printer 350 and IC card reader/writer 360 but may suffice by having any one of these components. Both of the basic electronic tag 372 and the lot electronic tag 374 are precedently distributed, as the electronic tag 370, to a consignor destination 10 provided with a consignor destination freight information system 210 having the electronic tag reader/writer 340. A person in charge of collection carries the electronic tags 370 to other consignor destinations 10 other than the above at the time of collection.

Figure 4:
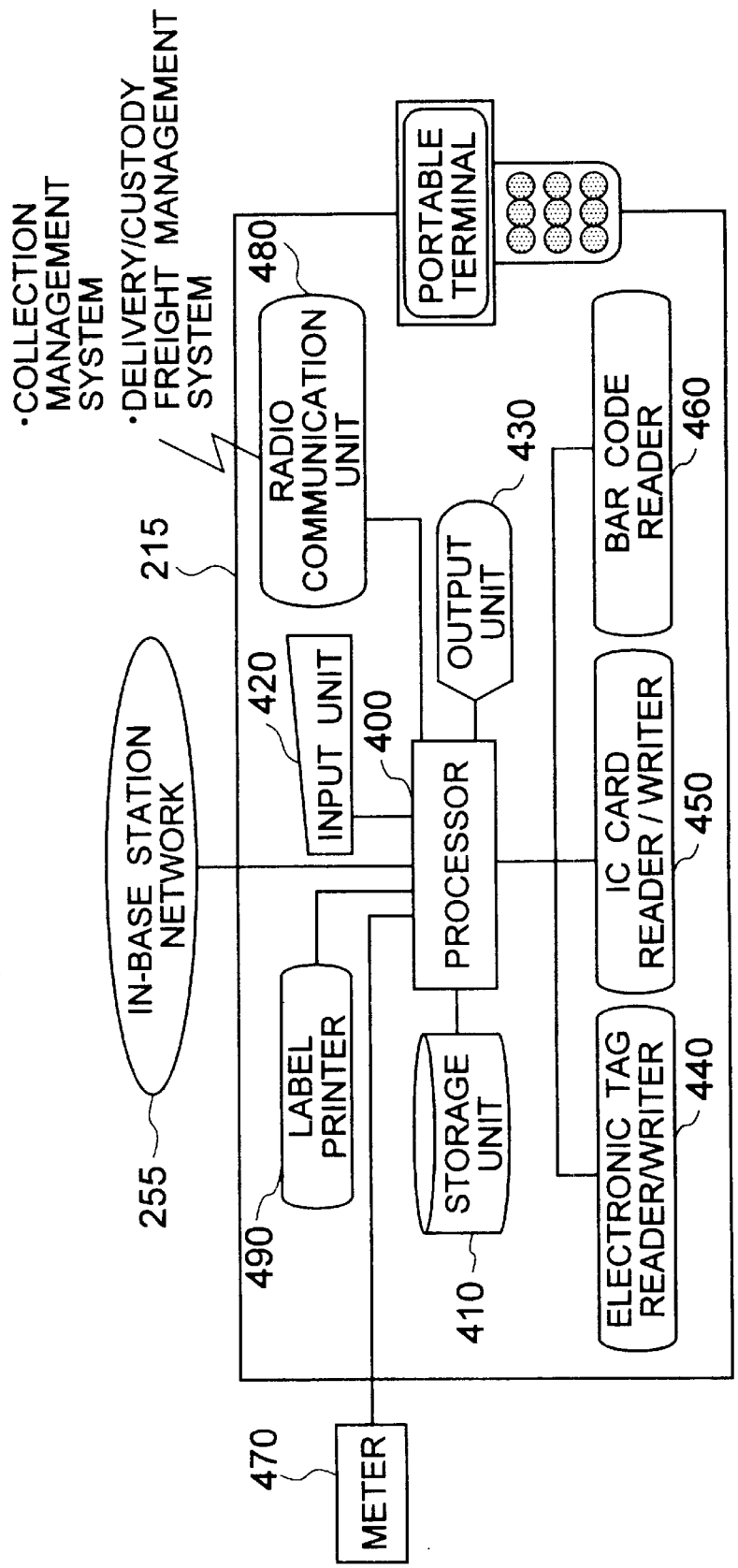
FIG. 4 is a structural diagram showing the construction of a portable terminal system.

FIG. 4 is a structural diagram showing the construction of the portable terminal system 215. The portable terminal system 215 is used for the collected freight acceptance process 124, delivered freight hand-over process 136 and individual freight information confirming process 166 and includes a processor 400, a storage unit 410, an input unit 420, an output unit 430, an electronic tag reader/writer 440, an IC card reader/writer 450, a bar code reader/writer 460, a radio communication unit 480 and a label printer 490. The processor 400 is connected to a meter 470 and the in-base station network 255. The input unit 420 and output unit 430 have the functions similar to those of the input unit 320 and output unit 330 of the consignor destination freight information system 210, respectively. The electronic tag reader/writer 440 and IC card reader/writer 450 also have the functions similar to those of the electronic tag reader/writer 340 and IC card reader/writer 360 of the consignor destination freight information system 210. The bar code reader/writer 450 is a unit for reading printed bar codes. The IC card reader/writer 450, bar code reader 460 and meter 470 are used during the collected freight acceptance process. The radio communication unit 480 has the function of performing radio communication with the collection management system 225 and delivery/custody freight management system 240 and is used for collected freight acceptance 124 and delivered freight hand-over 136. When the portable terminal system 215 and the on-vehicle system 220 are connectable to each other, the radio communication unit 480 may be provided on the on-vehicle system 220.

Figure 5:
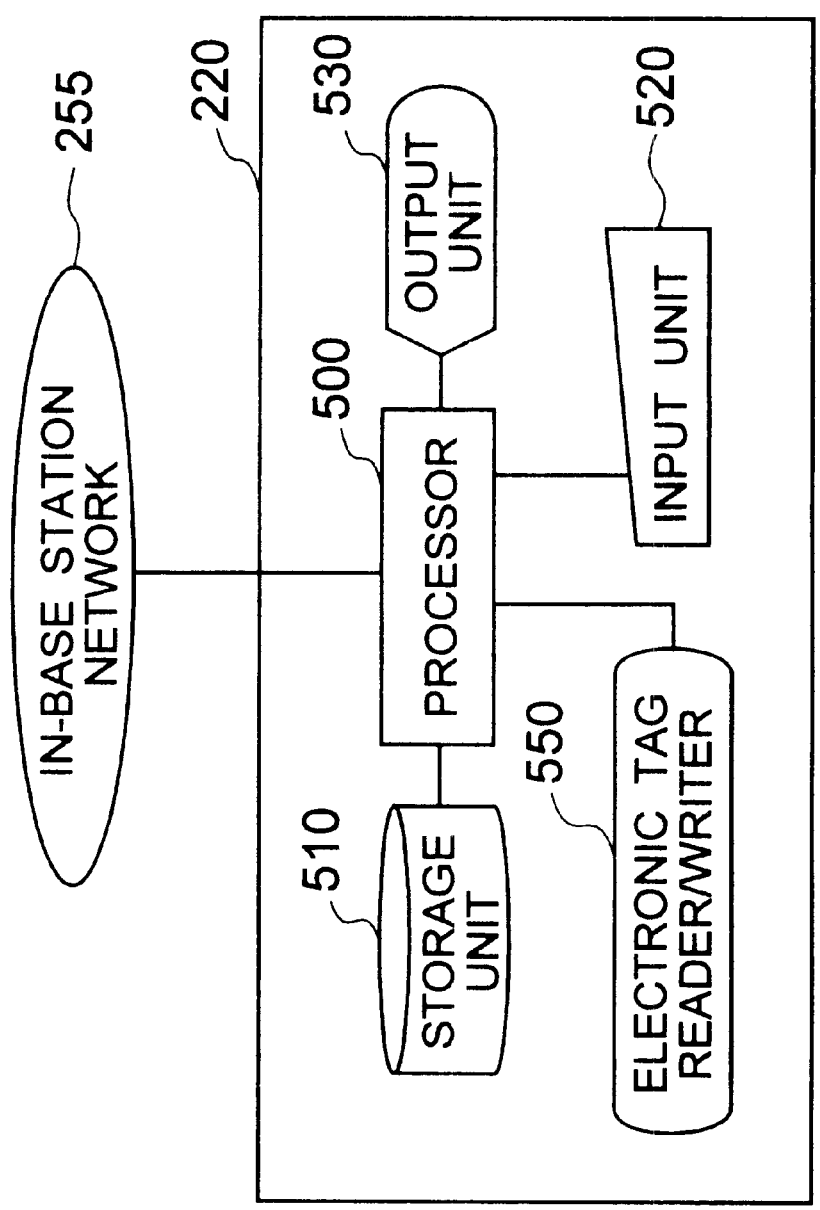
FIG. 5 is a structural diagram showing the construction of an on-vehicle system.

FIG. 5 is a structural diagram showing the construction of the on-vehicle system 220. The on-vehicle system 220 is used for the unloading process 126 and loading process 130 and includes a processor 500, a storage unit 510, an input unit 520, an output unit 530 and an electronic tag reader/writer 550. The processor 500 is connected to the in-base station freight information management system 230 during unloading 126 and loading 130. The input unit 520 and output unit 530 have the functions similar to those of the input unit 320 and output unit 330 of the consignor destination freight information system 210, respectively. The electronic tag reader/writer 550 has the function similar to that of the electronic tag reader/writer 340 of the consignor destination freight information system 210. The electronic tag reader/writer 550 is installed at a loading/unloading port of vehicle and the input unit 520 and output unit 530 are also installed near the loading/unloading port. When carrying out the unloading process 126 and loading process 130, the function of the on-vehicle system 220 may be realized with the in-base station freight information management system 230.

Figure 6:
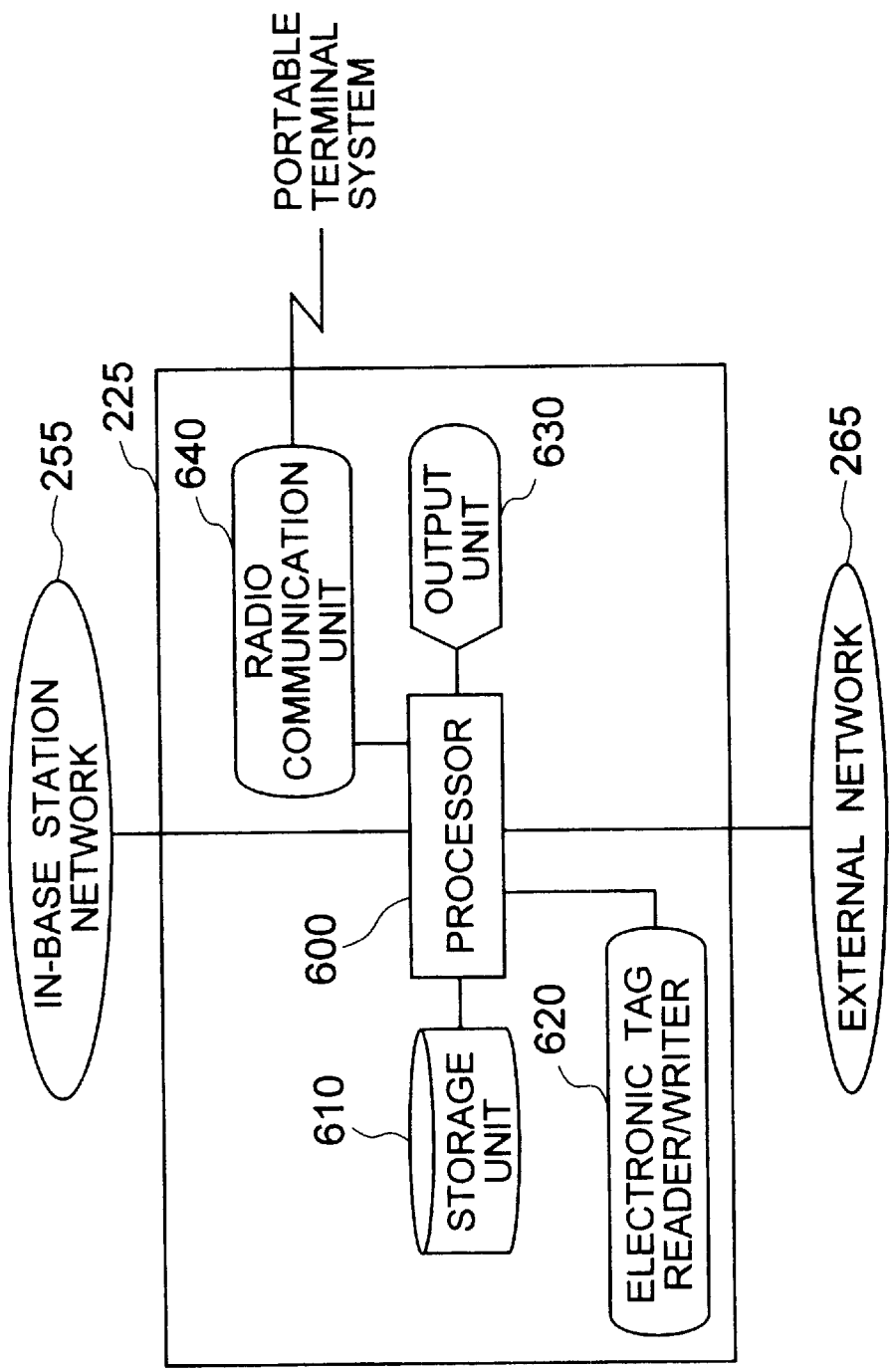
FIG. 6 is a block diagram showing the construction of a collection management system.

FIG. 6 is a block diagram showing the construction of the collection management system 225. The collection management system 225 is used for the request reception process 120 and collected freight acceptance process 124 and it includes a processor 600, a storage unit 610, an input unit 620, an output unit 630 and a radio communication unit 640. The processor 600 is connected to the in-base station network 255 and the external network 265. The input unit 620 and output unit 630 have the functions similar to those of the input unit 320 and output unit 330 of the consignor destination freight information system 210, respectively. The radio communication unit 640 has the function similar to that of the radio communication unit 480 of the portable terminal system 215 and is used for radio communication with the portable terminal system 215 during collected freight acceptance 124 and delivered freight hand-over 136.

Figure 7:
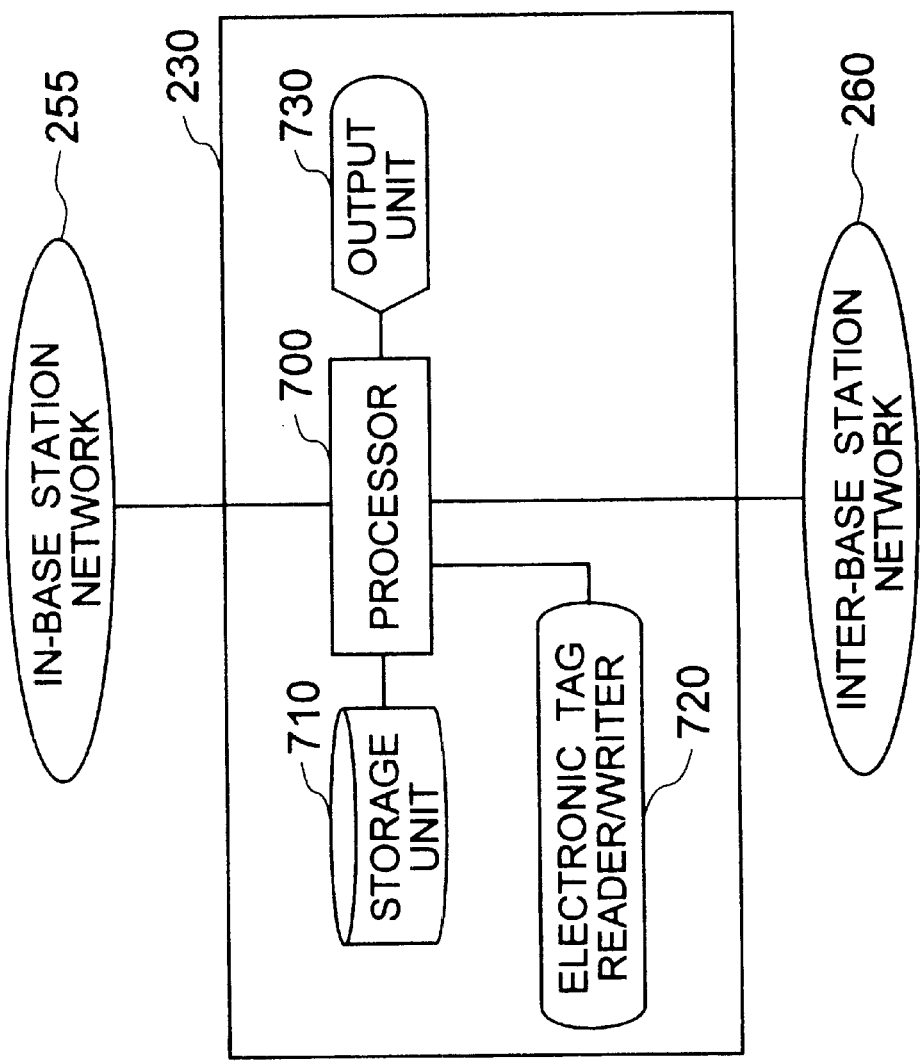
FIG. 7 is a block diagram showing the construction of an in-base station freight information management system.

FIG. 7 is a block diagram showing the construction of the in-base station freight information management system 230. The in-base station freight information management system 230 is used for the nonarrival freight check process 132, freight information inquiry process 160, freight information register process 140 and delivery destination/date change handling process 164 and it includes a processor 700, a storage unit 710, an input unit 720 and an output unit 730. The processor 700 is connected to the in-base station network 255 and the inter-base station network 260. The input unit 720 and output unit 730 have the functions similar to those of the input unit 320 and output unit 330 of the consignor destination freight information system 210, respectively.

Figure 8:
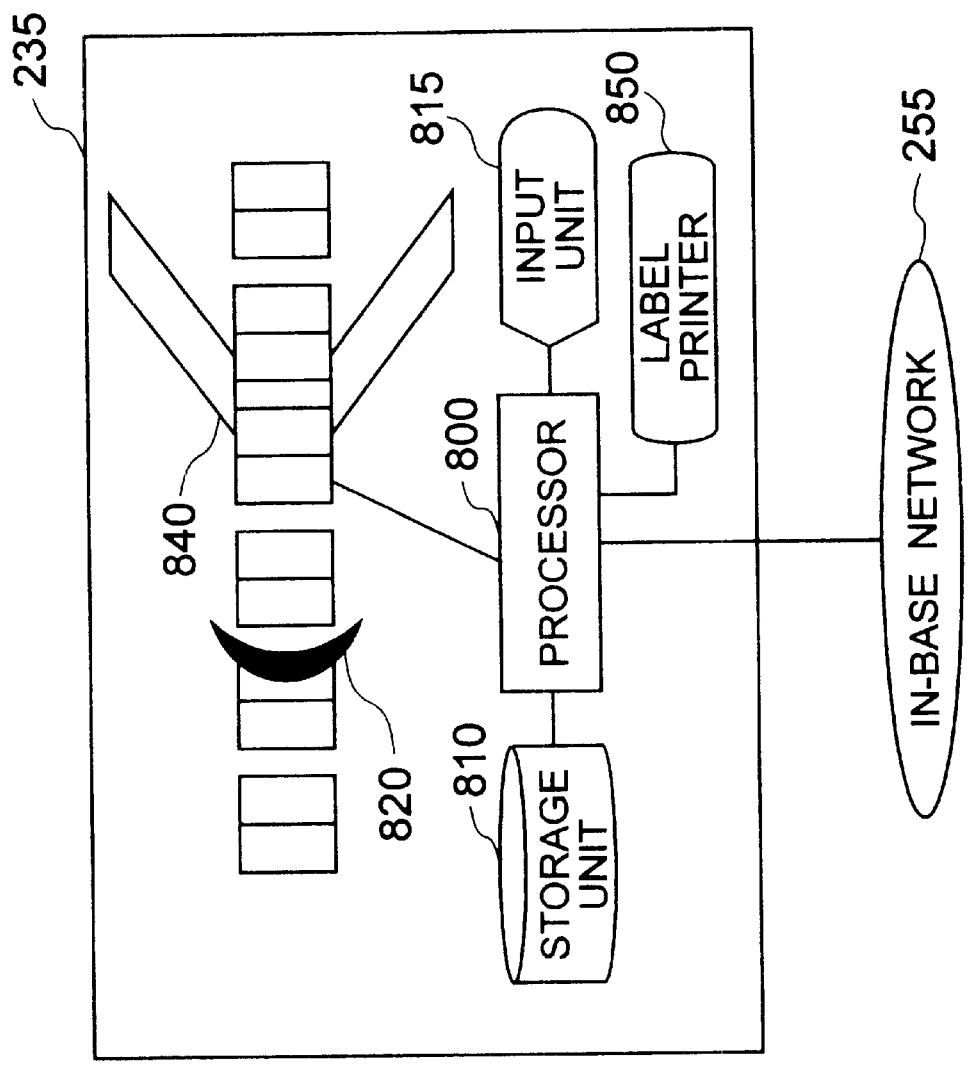
FIG. 8 is a structural diagram showing the construction of an automatic sorting system.

FIG. 8 is a structural diagram showing the construction of the automatic sorting system 235. The automatic sorting system 235 is used for sorting 128 and it includes a processor 800, a storage unit 810, an input unit 815, an electronic tag reader/writer 820, a sorting line 840 and a label printer 850. The processor 800 is connected to the in-base station network 255. The electronic tag reader/writer 820 has the function similar to that of the electronic tag reader/writer 340 of the consignor destination freight information system 210. The label printer 850 is used at the arrival store.

Figure 9:
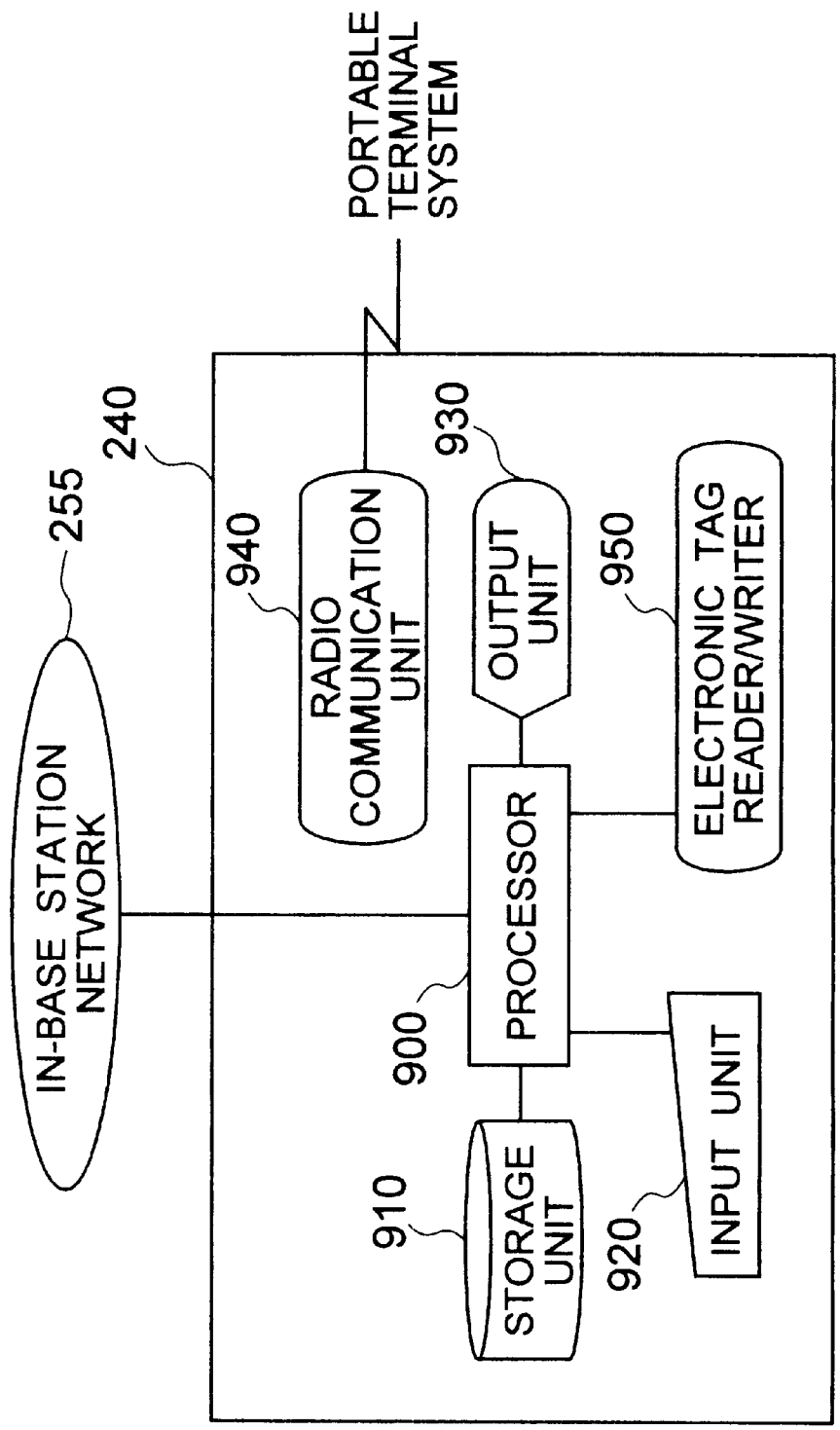
FIG. 9 is a block diagram showing the construction of a delivery/custody freight management system.

FIG. 9 is a block diagram showing the construction of the delivery/custody freight management system 240. The delivery/custody freight management system 240 is used for the delivered freight hand-over process 136 and custody process 138 and it includes a processor 900, a storage unit 910, an input unit 920, an output unit 930, a radio communication unit 940 and an electronic tag reader/writer 950. The processor 900 is connected to the in-base station network 255. The radio communication unit 940 has the function similar to that of the radio communication unit 480 of the portable terminal system 215 and is used for radio communication with the portable terminal system 215 during delivered freight hand-over 136. The input unit 920 and output unit 930 have the functions similar to those of the input unit 320 and output unit 330 of the consignor destination freight information system 210, respectively. The electronic tag reader/writer 950 has the function similar to that of the electronic tag reader/writer 340 of the consignor destination freight information system 210.

Figure 10:
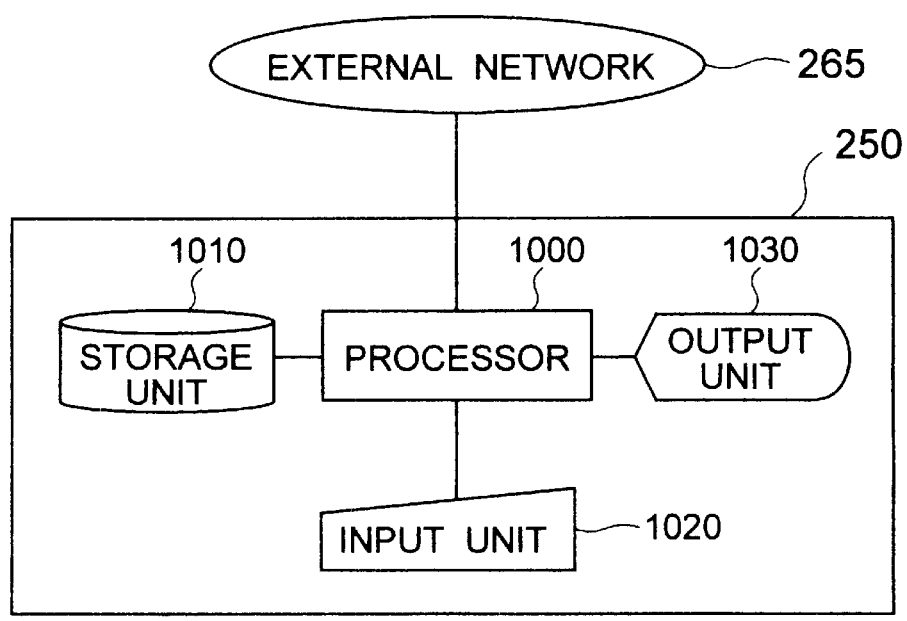
FIG. 10 is a structural diagram showing the construction of a consignee destination freight information system.

FIG. 10 is a structural diagram showing the construction of the consignee destination freight information system 250. The consignee destination freight information system 250 is used for the delivery scheduled freight information confirming process 144, absence notice confirming process 156, freight information inquiry process 160 and delivery destination/date change request process 162 by the consignee and it includes a processor 1000, a storage unit 1010, an input unit 1020 and an output unit 1030. The processor 1000 is connected to the external network 265. The input unit 1020 and output unit 1030 have the functions similar to those of the input unit 320 and output unit 330 of the consignor destination freight information system 210, respectively.

Figure 11:
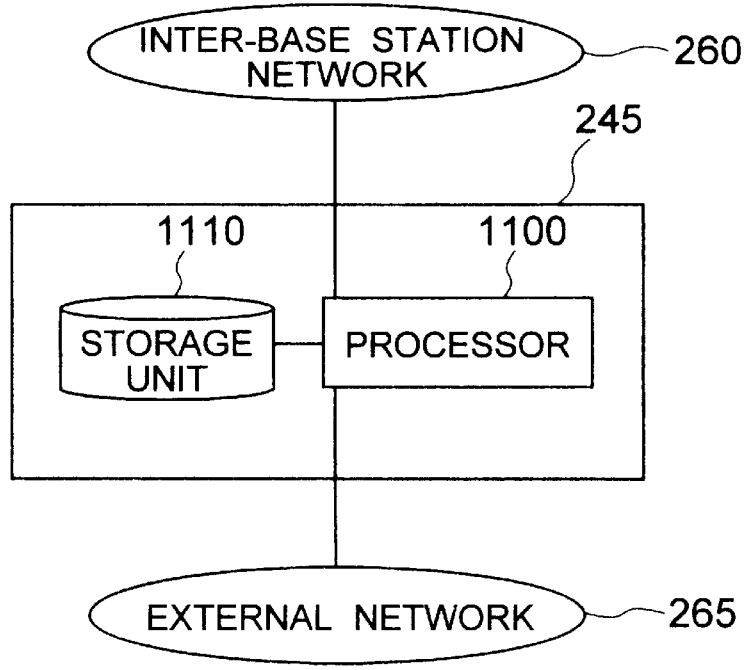
FIG. 11 is a structural diagram showing the construction of a freight information overall management system.

FIG. 11 is a structural diagram showing the construction of the freight information overall management system 245. The freight information overall management system 245 is used for the freight information register process 140, delivery scheduled freight information informing process 142, arrival scheduled freight information informing process 146, delivery finish informing process 150, absence notice process 154, delivery destination/date change handling process 164 and freight information offer process 158 and it includes a processor 1100 and a storage unit 1110. The processor 1100 is connected to the inter-base station network 260 and external network 265.

The process operation of each component will be described hereunder along the flow of the mixed freight transportation services.

<1: Collection Request and Request Reception>

Figure 12:
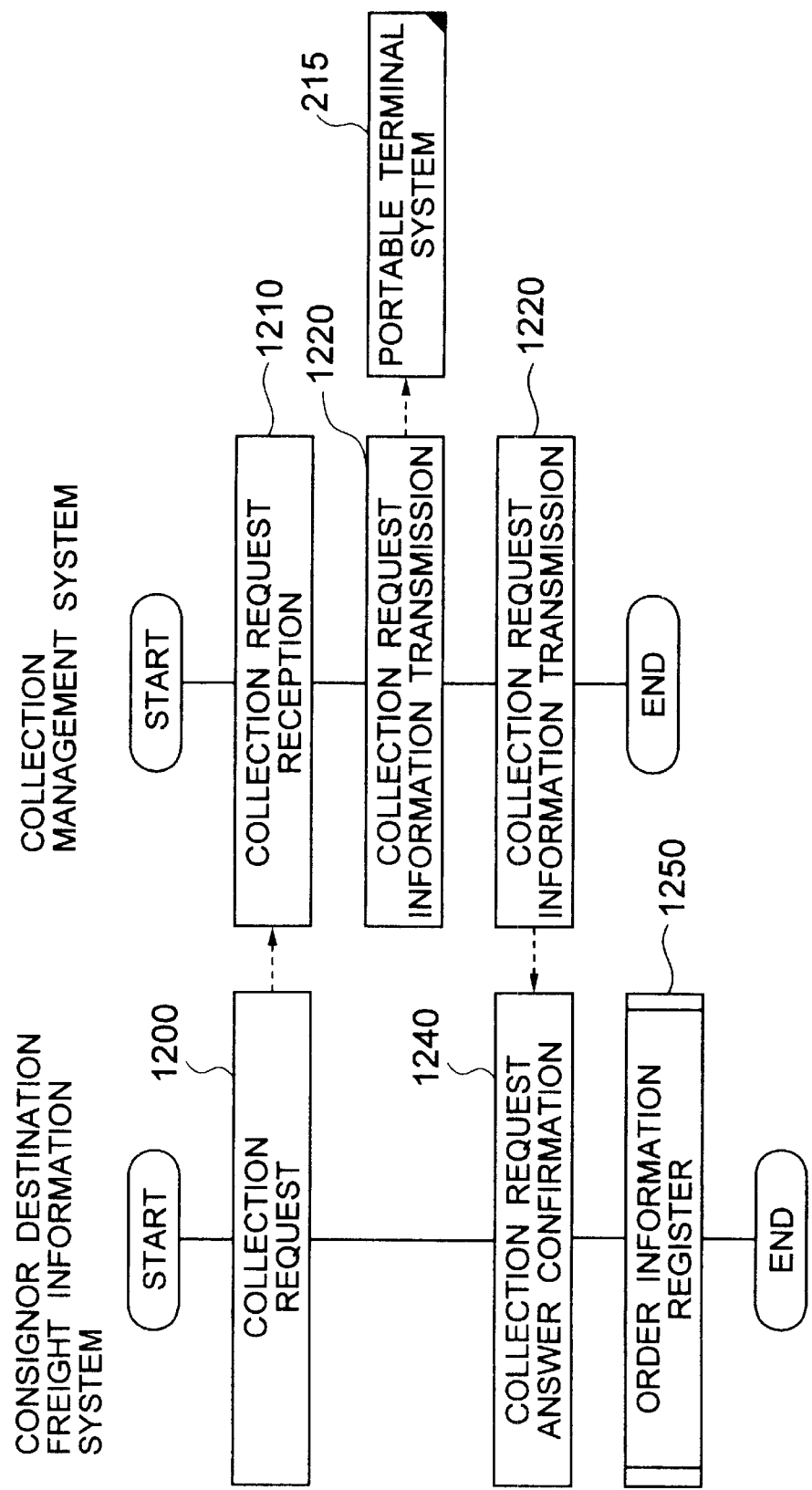
FIG. 12 is a flow chart showing the process flow of the collection request process and request reception process.

FIG. 12 is a flow chart showing the process flow in the collection request process 118 and request reception process 120. In flow charts depicted in FIG. 12 and other figures, dotted line indicates that transmission of information is to be carried out.

Collection request information is inputted by means of the input unit 320 of the consignor destination freight information system 210. FIG. 13 is a structural diagram of data in the collection request information. The collection request information 1300 mainly includes freight information 1302 concerning freight requested to be collected, consignor information 1304 concerning a consignor, consignee information 1306 concerning a consignee and desirable collection date 1310.

Included in the freight information 1302 are article 1312 of the freight requested to be collected, the number 1316 of freight goods in one order, incidental service 1318 which is set when the consignor requests an additional service such as chilled transport or time-appointed delivery in addition to ordinary transportation, appointed delivery date 1320 which is set with an appointed time when the time-appointed delivery is set as the incidental service 1318, special freight index 1322 which indicates a class of freight when the freight is fragile one or precision machinery and instruments and is required to be handled with care, and bill index 1324 which is set with a class of payment including cash income in which money is recovered during collection, credit sales for credit account or pay on arrival in which money is recovered from the consignee when delivery is finished.

Included in the consignor information 1304 are consignor code 1326 precedently given to each of the consignors so as to definitely identify a consignor, name (denomination) 1328 of the consignor, address 1330 of the consignor, telephone number 1332, electronic address 1334 used as an electronic mail address of the consignor, and reader/writer type 1335 for indicating which one of the electronic tag reader/writer 340, bar code label printer 350 and IC card reader/writer 340 is provided for the consignor destination freight information system 210.

Included in the consignee information 1306 are name 1336, address 1338, telephone number 1342 and electronic address 1342 of a consignee as well as branch office information 1308 including address 1350, telephone number 1352 and electronic address 1354 of a consignee branch office. Information concerning a plurality of branch offices may be included in the consignee branch office information 1308. The collection request information 1300 is inputted from the input unit 320 and then stored sequentially in the storage unit 310.

During setting of the collection request information 1300, the table as shown in FIG. 13 is displayed on the display screen of the output unit 330 and each information is set on the display screen by the consignor. Of the collection request information 1300, the consignor information 1304 is stored in the storage unit 310 in advance so that it may be displayed on the display screen and set into the collection request information 1300 without resort to input operation by the consignor. Information concerning a consignee to which freight goods are delivered somewhat periodically may also be stored in the storage unit 310 and may be retrieved on the input screen by using the name and telephone address as the key so as to be set automatically as consignee information 1306.

When all items of the collection request information 1300 are inputted, the processor 300 follows a command by the consignor to transmit the collection request information stored in the storage unit 310 to the collection management system 225 through the external network 265 (step 1200).

In the collection management system 225, the processor 600 receives the collection request information 1300 from the consignor destination freight information system 210. The processor 600 applies to the received collection request information 1300 a collection request number which definitely defines it. The collection request information 1300 is stored in the storage unit 610 together with the collection request number and a time at which the collection request information is received by the processor 600 (step 1210).

On the basis of consignor address 1330 and desirable collection date 1310 in the collection request information 1300 stored in the storage unit 610, the processor 600 consults a time zone/area classified collector in charge DB stored in the storage unit 610 to determine a person in charge of collection. FIG. 14 shows an example of the time zone/area classified collector in charge DB. In the time zone/area classified collector in charge DB 1400, person in charge numbers of persons in charge of collection work are registered in respect of time zones of day and areas under the control of the departure store. In the time zone/area classified collector in charge DB 1400, a table is set day by day or term by term. Specifically, for determination of a person in charge, a table in time zone/area classified collector in charge DB which meets a desirable collection date 1310 included in the collection request information is first selected on the basis of date information 1410. Then, a person in charge number set in an entry, in which the consignor address 1330 and desirable collection date 1310 in the collection request information match with each other, is extracted.

Subsequently, on the basis of the person in charge number, the processor 600 retrieves a person in charge—portable terminal correspondence DB to specify a portable terminal system 215 possessed by the person in charge. The person in charge—portable terminal correspondence DB 1600 is stored in the storage unit 610 and as shown in FIG. 16, portable terminal numbers (1620) of portable terminal systems 215 possessed by persons in charge specified by person in charge numbers (1610) are registered in respect of individual person in charge numbers. The processor 600 determines, as a transmission destination of the collection request information, a portable terminal system 215 allotted with a portable terminal number specified as above and transmits the collection request information 1300 of interest stored in the storage unit 610 and the corresponding collection request number. The collection request information 1300 is transmitted through the in-base station network 255 when the portable terminal system 215 in question exists in the departure store 102 but is transmitted through the radio communication unit 640 when that portable terminal system exists in a move destination. At that time, in case the electronic tag reader/writer or the IC card reader/writer is given to the reader/writer type 1335 of the consignor destination freight information system 210, the collection request information removed of consignor information 1306 may be transmitted (step 1220).

When the collection request information 1300 is transmitted correctly to the portable terminal system 215 in the step 1220, the processor 600 transmits, as an answer to the collection request, information to this effect to the consignor destination freight information system 210 through the external network 265. At that time, if the reader/writer type of the consignor destination freight information system 210 is the bar code label printer, the collection request number applied in the step 1210 is also transmitted (step 1230).

When the processor 300 of the consignor destination freight information system 210 receives the collection request answer, the information forwarded as the collection request answer is displayed, together with the collection request information 1300 stored in the storage unit 310, on the output unit 330 (step 1240). Thereafter, in the consignor destination freight information system 210, a process for register of order information is carried out by the processor 300 in step 1250.

Figure 15:
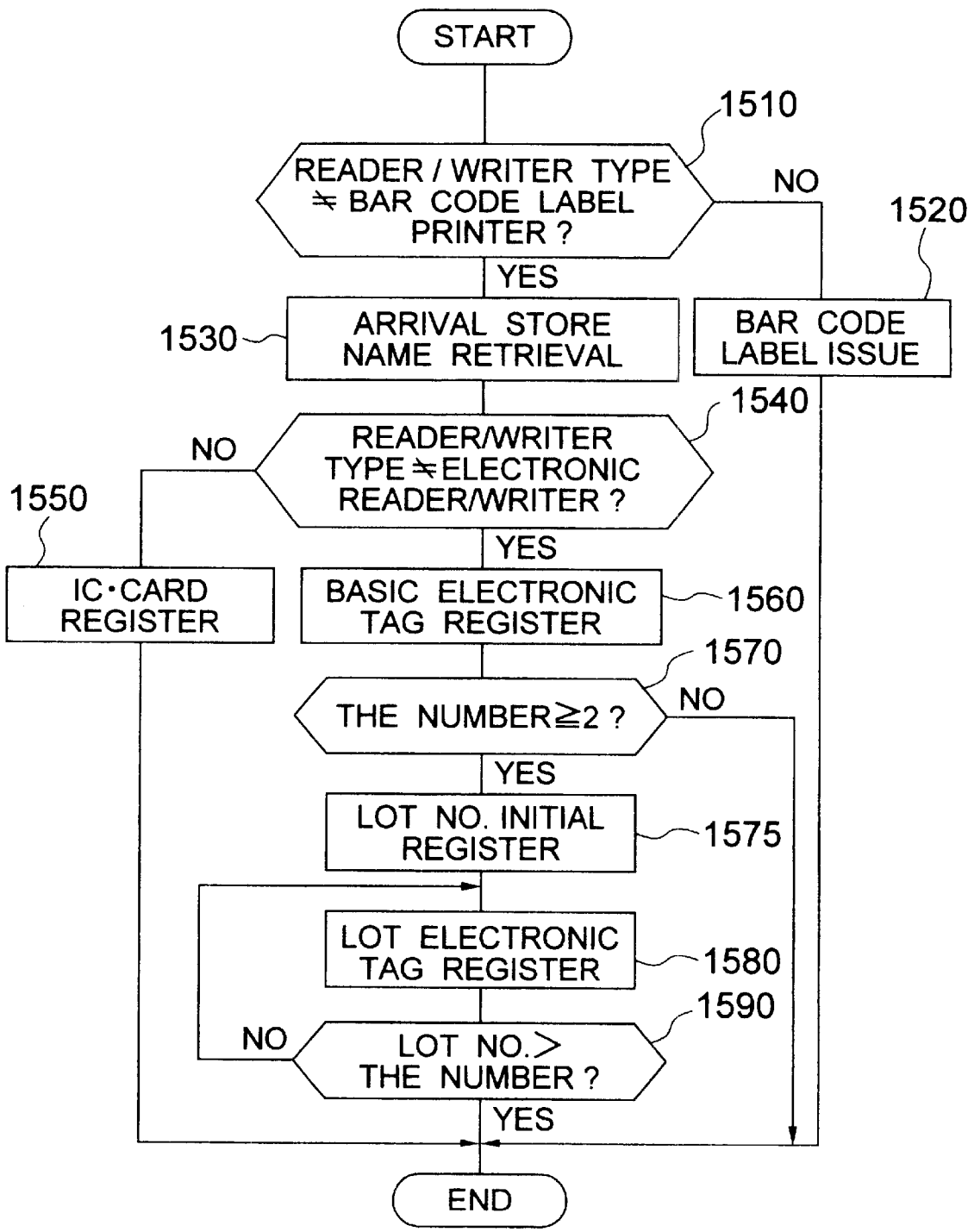
FIG. 15 is a detailed flow chart of the order information register process.

FIG. 15 is a detailed flow chart of the order information register process. In the order information register process (step 1250), it is first examined whether the reader/writer type of the consignor destination freight information system 210 is the bar code label printer (step 1510). If the reader/writer type is the bar code label printer, the processor 300 converts the collection request number included in the collection request answer received in the step 1240 into a bar code form and issues a bar code label 380, thus ending the process. Then, the consignor attaches the printed label 380 to the corresponding freight. In case there are a plurality of freight goods in connection with one order, the consignor attaches the bar code label 380 to representative freight (step 1520).

On the other hand, when the reader/writer type is determined not to be the bar code label printer in the step 1510, the processor 300 uses, as the key, the consignee address 1338 included in the collection request information stored in the storage unit 310 to retrieve an address classified arrival store name DB stored in the storage unit 310 in advance, thereby determining an arrival store name. FIG. 17 shows an example of the address classified arrival store name DB. In the address classified arrival store name DB 1700, arrival store names 1720 having service ranges covering addresses 1710 in a region where the freight transportation services are offered are registered in respect of the individual addresses (step 1530).

Next, it is examined whether the reader/writer type of the consignor destination freight information system 210 is the electronic tag reader/writer (step 1540). If the reader/writer type is not the electronic tag reader/writer, the collection request information 1300 held in the storage unit 310 and the arrival store name settled in the step 1530 are registered in the IC card 390 precedently distributed to the consignor destination 10 by using the IC card reader/writer 360 (step 1550).

When the reader/writer type is determined to be the electronic tag reader/writer in the step 1540, the collection request information 1300 stored in the storage unit 310 and the arrival store name determined in the step 1530 are registered in a basic electronic tag 372 precedently distributed to the consignor destination 10 by using the electronic reader/writer 340. The processor 300 causes the electronic tag reader/writer 340 to read the freight number precedently registered in the basis electronic tag 372 and stores it in the storage unit 310 (step 1560).

Further, the processor 300 examines whether the number 1316 contained in the collection request information 1300 held in the storage unit 310 is not less than two and when the number is less than 2, it ends the process (step 1570). If the number 1316 is not less than 2, the processor 300 stores an initial value of 2, as the lot number, in the storage unit 310. The lot number is a number for definitely defining individual freight goods when a freight lot prevails in which a plurality of freight goods exist for one order (step 1575). Subsequently, the processor 300 causes the electronic tag reader/writer 340 to register the collection request information stored in the storage unit 310 and the arrival store name determined in the step 1530 as well as the freight number registered in the basic electronic tag 372 and the lot number in a precedently distributed lot electronic tag 374. At that time, the lot number in the storage unit 310 is added with 1 (step 1580). Next, it is examined whether the lot number exceeds the number 1316 and when the lot number is larger than the number 1316, the process ends but when this does not stand, the program proceeds to the step 1580 and register operation into the lot electronic tag 374 is caused to continue (step 1590).

<2: Collected Freight Reception>

Figure 18:
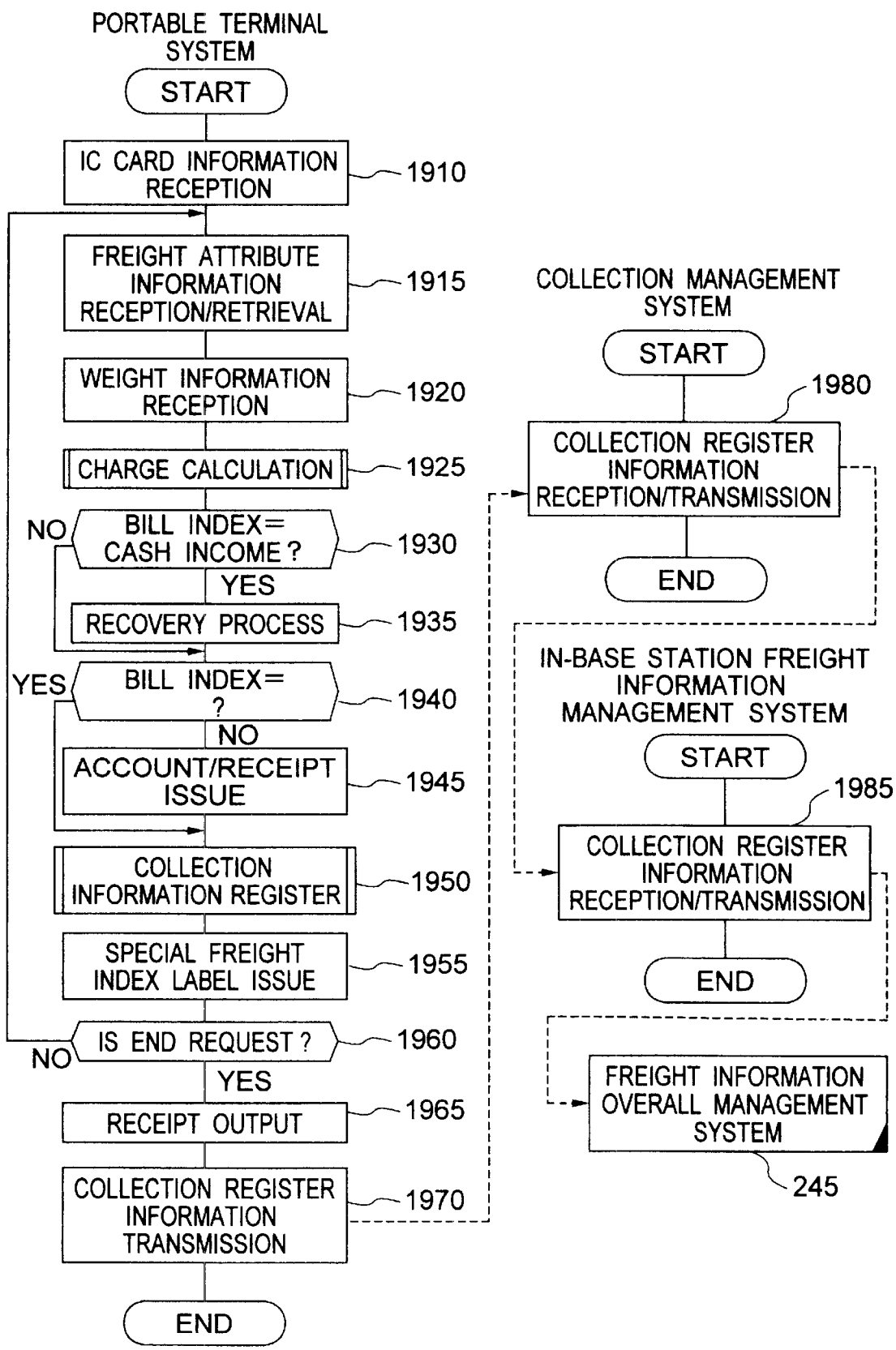
FIG. 18 is a flow chart showing the process flow of the collected freight acceptance process.

The collection request information 1300 transmitted from the collection management system 225 in the step 1220 is received by a portable terminal system 215 of a person in charge of the collection work. The portable terminal system 215 stores the received collection request information 1300 in the storage unit 410 and delivers it to the output unit 430. The collector in charge (driver) carries out the collection work by utilizing the portable terminal system 215. FIG. 18 is a flow chart showing the flow of a process which is mainly performed in the portable terminal system 215 during the collected freight acceptance process 124 carried out by the collector in charge at the consignor destination.

Figure 19:
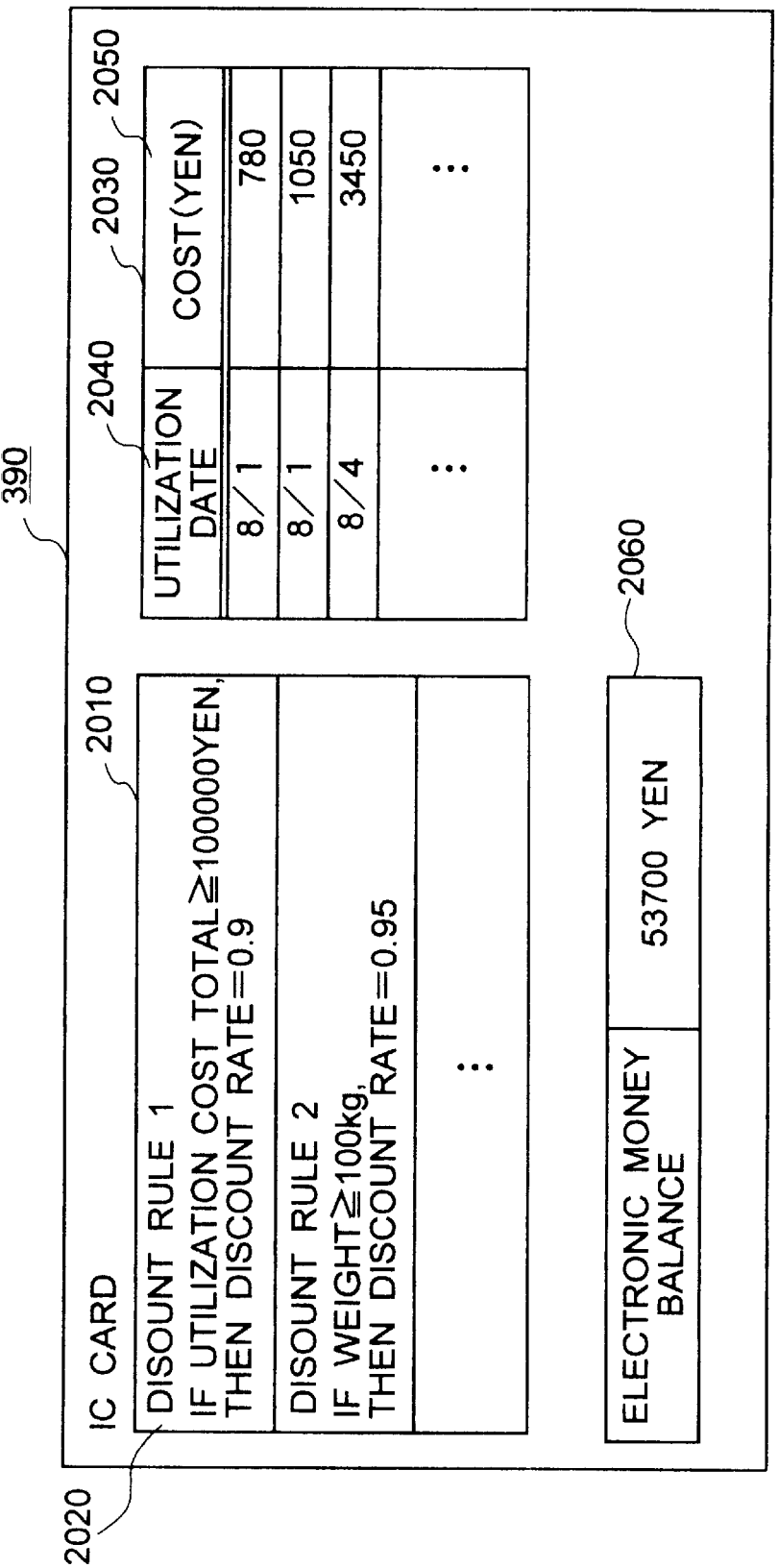
FIG. 19 is a conceptual diagram showing the status of information stored in an IC card.

In the collected freight acceptance process 124, information stored in an IC card 390 precedently distributed to the consignor destination 10 is read by using the IC card reader/writer 450 of the portable terminal system 215 and written into the processor 400. As shown in FIG. 19, special charge rule 2010, utilization cost history 2030 and electronic money balance 2060 are stored in a memory inside the IC card 390. The special charge rule 2010 includes, for example, a rule such as discount rule 2020 used for calculation of a cost for "when the utilization cost total for this month exceeds 100000 yen, the discount rate is 0.9". The special charge rule 2010 can be different for different consignors. In the utilization cost history 2030, a history of utilization date 2040 and cost 2050 on that date incurred in an order of freight transport service by the consignor is described order by order. In the electronic money balance 2060, an electronic money balance when the IC card 370 is provided with the electronic money function is recorded (step 1910).

Next, when the reader/writer type of the consignor destination freight information system 210 is the electronic tag reader/writer, collection request information 1300 for one order stored in a basic electronic tag 372 attached to freight and an arrival store name are written into the processor 400 by means of the electronic tag reader/writer 440 of the portable terminal system 215. When the order is for a freight lot, only collection request information 1300 stored in the basic electronic tag 372 may be written. In case the reader/writer type of the consignor destination freight information system 210 is the IC card reader/writer, collection request information stored in the IC card 390 and an arrival store name are written, for one order, into the processor 400 by using the IC card reader/writer 450 of the portable terminal system 215. Thereafter, by using the IC card reader/writer 450, collection request information 1300 corresponding to the written order is erased from the IC card 390. In case the reader/writer type of the consignor destination freight information system 210 is the bar code label printer, a bar code label 380 is first read by using the bar code reader/writer 460 of the portable terminal system 215. Then, by using a collection request number read from the bar code label 380 as the key, collection request numbers stored in the storage unit 410 are retrieved and collection request information corresponding to a matched collection request number is written into the processor 400 (step 1915).

When the weight of the freight corresponding to the collection request information is measured by means of the meter 470, the processor 400 reads obtained weight information from the meter 470. When there is a freight lot, weight values of all of the corresponding freight goods are measured and the processor 400 adds the weight values to provide weight information (step 1920). Subsequently, the processor 400 performs charge calculation on the basis of the obtained weight information (step 1925).

Figure 20:
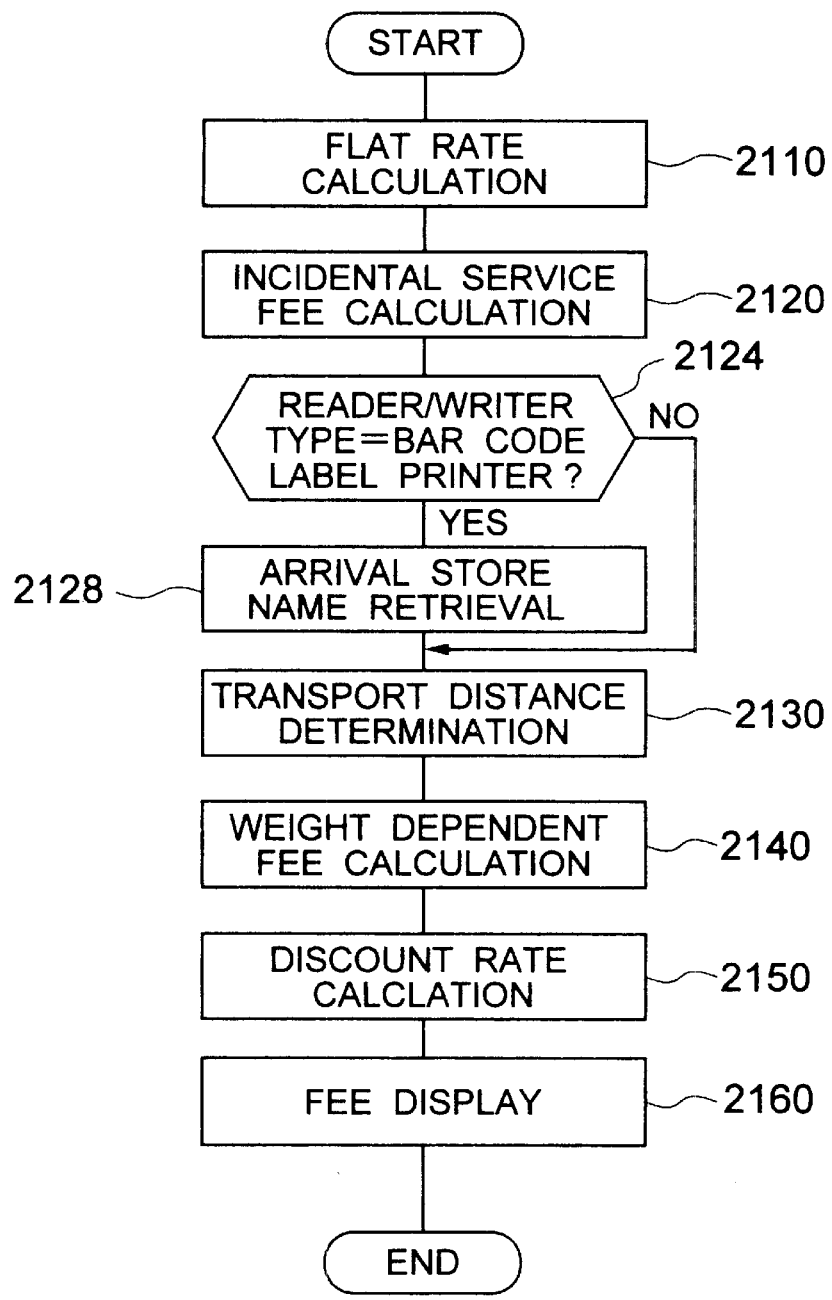
FIG. 20 is a flow chart showing a detailed process of the charge calculation process.

FIG. 20 is a flow chart showing a detailed process of the charge calculation process (step 1925).

In the charge calculation process, the processor 400 computes a flat rate on the basis of a flat rate system DB precedently stored in the storage unit 410 and adds the flat rate to the cost. As shown in FIG. 21, the flat rate system DB is a database in which flat rates 2220 are registered in respect of charge items 2210. The flat rate is a fee of constant amount which is added to the cost regardless of the contents of the order. A flat rate is computed by adding individual flat rates 2220 corresponding to individual charge items 2210 in the flat rate system DB 2200 (step 2110).

Next, on the basis of an incidental service charge system DB precedently stored in the storage unit 410, the processor 400 computes an incidental service fee and adds it to the cost. As shown in FIG. 22, the incidental service charge system DB is a database in which necessary incidental service fees are registered in respect of individual incidental service items 2310. The incidental service is a service such as time appointed delivery or chilled transport carried out in accordance with a demand by the consignor in addition to the ordinary service and a fee added when the consignor utilizes such a service is an incidental service charge. Here, an incidental service fee 2320 corresponding to an incidental service item 2310 matching the incidental service 1318 in the collection request information 1300 is determined. When there are a plurality of matching incidental services, the fee is calculated by totaling fees (step 2120).

The processor 400 examines whether the information set in the reader/writer type 1335 in the collection request information 1300 is the bar code label printer. If the reader/writer type is of the bar code label printer, the program proceeds to step 2128 but in case of a different type, the program proceeds to step 2130 (step 2124).

In the step 2128, the processor 400 consults an address classified arrival store name DB precedently stored in the storage unit 410 by using the consignee address 1330 contained in the collection request information 1300 to determine an arrival store name. The address classified arrival store name DB stored in the storage unit 410 of the portable terminal system 215 is identical to the address classified arrival store name DB in the consignor destination freight information system 210 in FIG. 17 and the arrival store name is settled similarly to the step 1530.

In the step 2130, a transport distance is determined by consulting a transport distance calculation DB precedently stored in the storage unit 410. As shown in FIG. 23, in the transport distance calculation DB 2400, departure stores 2410 are set in the row direction, arrival stores are set in the column direction and inter-base station distances 2430 are registered at intersection points of the departure stores and arrival stores. On the basis of departure store names precedently stored in the storage unit 410 in respect of the individual portable terminal systems 215 and an arrival store name obtained by the processor 400 in the step 1915 (when the reader/writer type of the consignor destination freight information system 210 is the IC card reader/writer or electronic tag reader/writer) or in the step 2128 (when the reader/writer type of the consignor destination freight information system 210 is the bar code label printer), the departure stores 2410 and arrival stores 2420 in the transport distance calculation DB 2400 are retrieved to determine the transport distance from a transport distance described at a matching site. For example, if the departure store is Totsuku store and the arrival store is Kohhoku Higashi store, the transport distance is 15 km.

Next, the processor 400 consults a weight dependent charge system DB precedently stored in the storage unit 410 to compute a weight dependent fee and add it to the cost. The weight dependent fee is a fee determined in accordance with the transport distance and the weight of freight and as shown in FIG. 24, weight dependent fees corresponding to weight zones 2510 and distance zones 2520 are registered in the weight dependent charge system DB. On the basis of the weight value read by the processor 400 in the step 1920 and the transport distance determined in the step 2130, the transport fee is determined from a fee corresponding to the matching weight zone 2510 and distance zone 2520 in the transport charge system DB 2500. For example, if the weight is 7 kg and the transport distance is 15 km in the figure, the weight zone is "5 to 10 kg" and the distance zone is "10 to 30 km" and the transport fee is 370 yen (step 2140).

Further, the processor 400 determines a discount rate on the basis of a discount rule set in the special charge rule 2010 obtained in the step 1910. During the determination of the discount rate, the processor 400 consults, as necessary, the information such as the weight information obtained in the step 1920 and the utilization cost history 2030. When the condition matches a plurality of discount rules, discount rates determined from the individual discount rules are multiplied together to compute a final discount rate. For example, if the utilization fee total for this month is 101000 yen and the weight is 110 kg in case of the special charge rule 2010 shown in FIG. 19, the final discount rate is 0.9×0.95=0.855. The processor 400 computes a final fee by multiplying the cost calculated in the step 2140 by the final discount rate (step 2150).

When the final fee is computed in the manner as above, the processor 400 displays the computed fee on the output unit 430 and then proceeds to the next process in the step 1930 (step 2160). In the step 1930, it is examined whether the bill index 1324 in the collection request information 1300 is "cash income". If the bill index 1324 is the cash income, the program proceeds to step 1935 but in case of a different class, the step 1935 is skipped and the program proceeds to step 1940.

When the bill index 1324 is the cash income, the processor 400 subtracts the fee computed in the step 2150 from the electronic money balance read in the step 1910 to calculate an electronic money balance after the cash income. The electronic money balance is displayed on the output unit 430 and the electronic money balance 2060 in the IC card 390 is updated with the displayed balance by means of the IC card reader/writer 360. When the electronic money balance is minus, a short account is displayed on the output unit 430. When the cost can be recovered correctly, the processor 400 holds "finished" in the recovery index (step 1935).

In the step 1940, it is examined whether the bill index 1324 in the collection request information is "pay on arrival". In the processor 400, the program proceeds to step 1950 if the bill index 1324 is pay on arrival but in case of a different class, the program proceeds to step 1945.

The processor 400 causes the label printer 490 to deliver an account/receipt which describes the consignor name 1328 and bill index contained in the collection request information 1300, the transportation service contractor name, departure store name and person in charge name precedently stored in the storage unit 410, the fee calculated in the step 2150 and date of charge calculation, and the sign column. The processor 400 also causes the IC card reader/writer 450 to record the utilization date and the fee calculated in the step 2150 in the utilization date column 2040 and cost column 2050 in the utilization cost history 2030 of the IC card 390 (step 1945).

Figure 25:
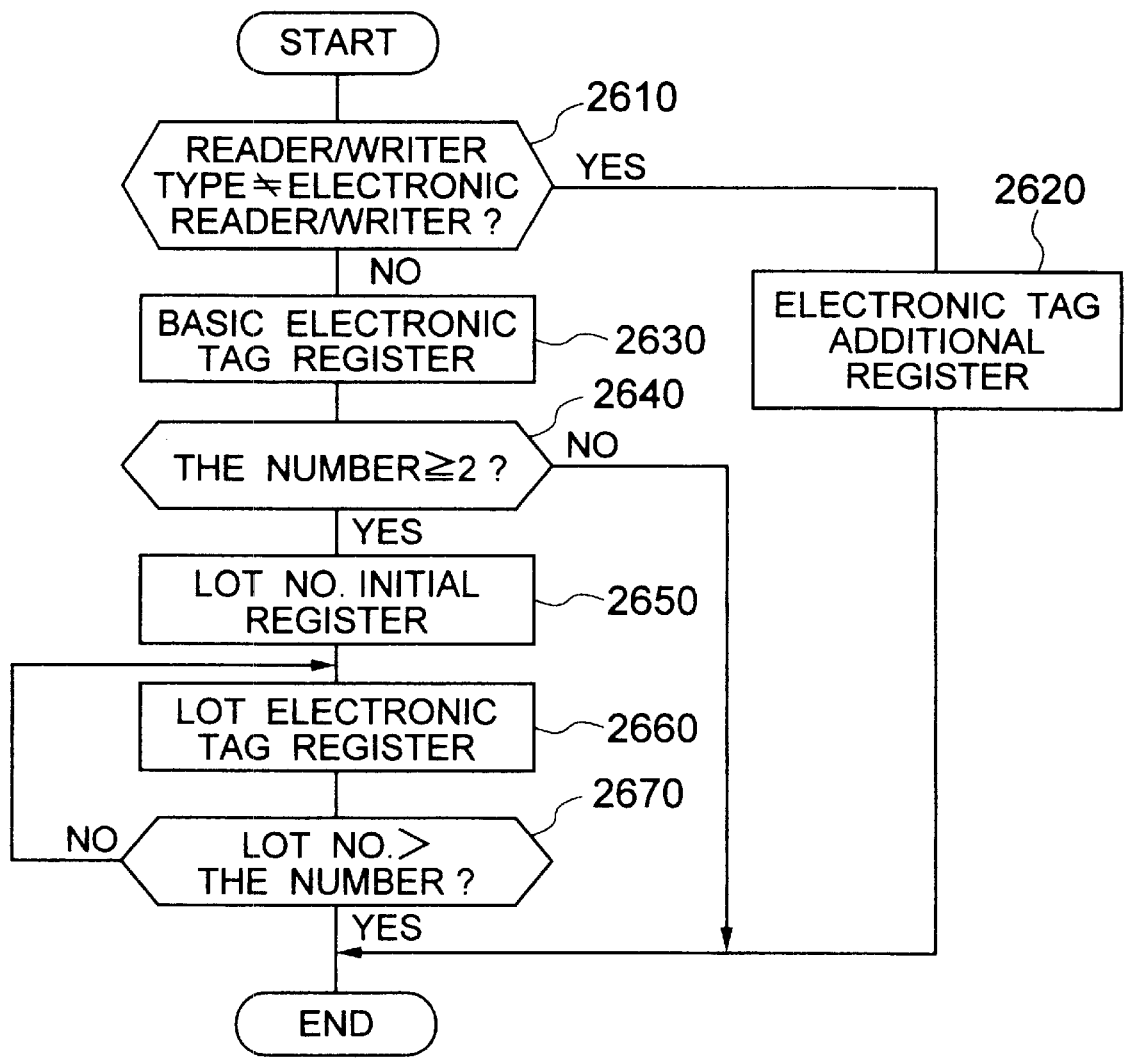
FIG. 25 is a detailed flow chart of the collection information register process.

In the step 1950, the processor performs the process of registering the collection information. FIG. 25 shows a detailed flow chart of the collection information register process.

In the collection information register process, the collection request information 1300 is first examined and it is decided whether the reader/writer type is the electronic tag reader/writer (step 2610). If the reader/writer type is the electronic tag reader/writer, the processor 400 causes the electronic tag reader/writer 440 to register the weight obtained in the step 1920, the fee calculated in the step 2150, the person in charge number precedently stored in the storage unit 410, the data of execution of register and "collection" indicated in the work index in the basic electronic tag 372 attached to the freight of interest. When the recovery index held by the processor 400 in the step 1935 is "finished", "finish" is registered, as recovery class, in the basic electronic tag 372 but when the recovery index is not held, "unfinished" is registered. In case of a freight lot, similar information is all registered in the corresponding lot electronic tags 374. Also, the processor 400 reads the collection request information and the arrival store name registered in the basic electronic tag 372 by using the electronic tag reader/writer 440 and stores in the storage unit 410 the read information together with the information registered in the basic electronic tag 372 and lot electronic tag 374, thus ending the register process (step 2620).

In case the reader/writer type is determined not to be the electronic tag reader/writer in the step 2610, the processor 400 causes the electronic tag reader/writer 440 to register the collection request information, the arrival store name, the weight obtained in the step 1920, the fee calculated in the step 2150, the person in charge number precedently stored in the storage unit 410, the date of execution of register and "collection" indicated in the work index in the basic electronic tag 372 carried by the collector in charge. In connection with the recovery index, register operation into the basic electronic tag 372 is carried out similarly to the step 2620. Also, the processor 400 reads the freight number precedently registered in the basic electronic tag 372 by means of the electronic tag reader/writer 440 and stores the information registered in the basic electronic tag 372 in the storage unit 410 (step 2630).

Next, the processor 400 examines whether the number 1316 in the held collection request information 1300 is not less than "2" and when the number 1316 is less than 2, the processor ends the process (step 2640). If the number 1316 is not less than 2, the processor 400 sets, as the lot number, an initial value 2 and holds it (step 2650).

The processor 400 causes the electronic tag reader/writer 440 to register the held collection request information, the arrival store name, the weight information, the fee calculated in the step 2150, the person in charge number, the register date and the work index, together with the freight number registered in the basic electronic tag in the step 2630 and the lot number, in the lot electronic tag 374 carried by the collector in charge. Register of the recovery index in the lot electronic tag 374 is carried out similarly to the step 2620. Then, the value held in the lot number is added with 1 (2660).

Subsequently, the processor 400 decides whether the value of lot number exceeds the number 1316 in the collection request information. If the value of the lot number is less than the number 1316, the process in the step 2660 is repeated but if the value of lot number exceeds the number 1316, the collection information register process is ended (step 2670).

Following the collection information register process, the processor 400 causes the label printer 490 to deliver special freight index labels by the number indicated by the number 1316 in accordance with the special freight index 1322 in the collection request information 1300. The special freight index labels are attached to the freight goods by the person in charge. For example, when the special freight index 1322 is "fragile", a label describing "Fragile, handle with care" is delivered as the special freight index label (step 1955).

Thereafter, the processor 400 examines whether a collection register end request from the input unit 420 is present (step 1960). In the absence of the collection register end request, the processor 400 repeats the process following the step 1915 to carry out the process in connection with another order. In the presence of the collection register end request, the processor 400 causes the label printer 490 to deliver a receipt describing the collection request information, arrival store name, weight information, fee, person in charge number, register date and work index which are stored in the storage unit 410 as well as the sign column. In case there are a plurality of orders, the collection request contents, arrival store name, weight and fee described over plural lines are delivered (step 1965).

When the issuance of the receipt is completed, the processor 400 follows a command by the collector in charge to transmit collection register information containing the collection request information, arrival store name and weight information which have been stored in the storage unit 410, the free calculated in the step 2150, the person in charge number, the register date, the work index and the recovery index to the collection management system 225 by way of the radio communication unit 480 (step 1970).

When receiving the collection register information forwarded from the portable terminal system 215 by way of the radio communication unit 640, the collection management system 225 transmits it to the in-base station freight information management system 230 through the in-base station network 225 (step 1980). Further, the in-base station freight information management system 230 transmits the collection register information to the freight information overall management system 245 through the inter-base station network 260 (step 1985).

<3: Unloading>

Figure 26:
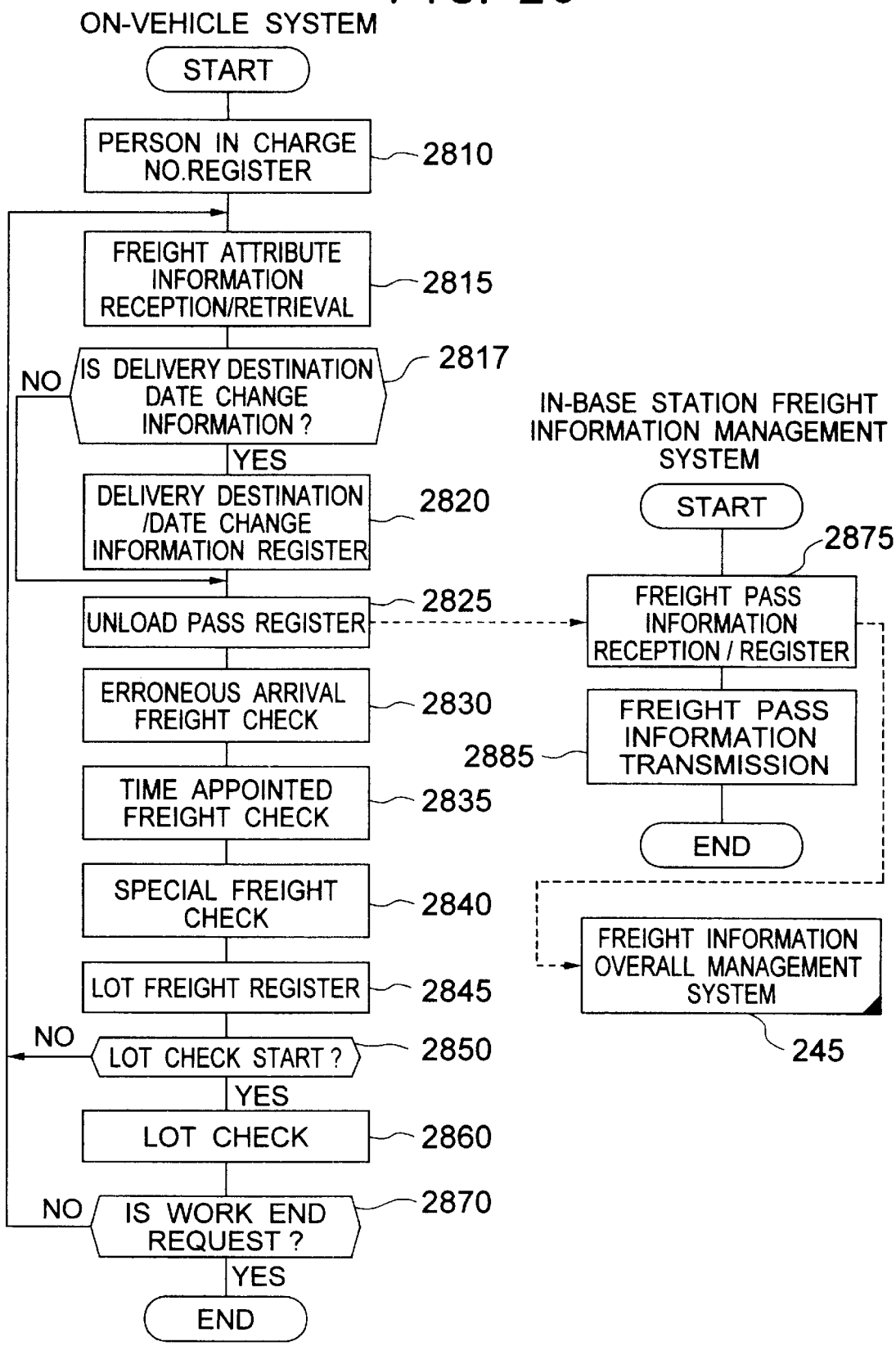
FIG. 26 is a flow chart of a process carried out by the on-vehicle system and in-base station freight information management system during the unloading process.

FIG. 26 is a flow chart of the unloading process 126, that is, a process carried out by the on-vehicle system 220 and the in-base station freight information management system 230 when the freight is unloaded from a vehicle at each base station.

In the unloading process 126, the processor 500 of the on-vehicle system 220 first receives a person in charge number and a base station name from the input unit 520 and stores them in the storage unit 510. For reception of the person in charge number, an IC card reader/writer, for example, is provided for the on-vehicle system 220 and the person in charge number may be accepted through the medium of an IC card in which the person in charge number of each person in charge is registered. This holds true for register of the person in charge number in other processes (step 2810).

Next, processor 500 causes the electronic tag reader/writer 550 to obtain, from the electronic tag 370, the freight number, lot number, electronic tag index, the number special freight index, departure store, arrival store and delivery appointed time which are registered in the electronic tag 370 and to hold them (step 2815).

The processor 500 retrieves a delivery destination/date change freight DB stored in the storage unit 710 of the in-base station freight information system 230 by using the freight number as the key and examines whether delivery destination/date change information is registered in connection with the freight of interest. As shown in FIG. 27, the delivery destination/date change freight DB holds changed delivery destination information 3015 and changed desirable delivery date information 3020 in correspondence to freight numbers 3010. The changed delivery destination information 3015 includes name 3030, address 3035, telephone number 3040, electronic address 3045 of the changed destination and changed arrival store name 305. Through the delivery destination/date change requesting and handling process to be described later, either or both of the changed delivery destination information 3015 and the changed desirable delivery time information 3020 are registered in the delivery destination/date change freight DB 3000 (step 2817). When a record having a freight number 3010 coincident with the freight number is found as a result of retrieval, the program proceeds to the process of step 2820. But in the absence of a record having a freight number 3010 coincident with the freight number, the process of step 2820 is skipped and the program proceeds to the process of step 2825 (step 2817).

In the step 2820, information of the record containing that freight number 3010 is read. If the changed delivery destination 3015 is recorded in the read-out record, the processor 500 changes, by means of the electronic tag reader/writer 550, the consignee name 1336, address 1338 and telephone number 1340 in the collection request information 1300 registered in the electronic tag 370 as well as the arrival store name in accordance with the name 3030, address 3035, telephone number 3040 and electronic address 3045 of the changed delivery destination 3015 as well as the changed arrival store name 3025. In case the changed desirable delivery time 3020 is registered, the electronic tag reader/writer 550 is caused to update the appointed delivery date held in the electronic tag 370 to the changed desirable delivery date 3020 (step 2820).

In the step 2825, the processor 500 registers the person in charge number stored in the storage unit 510 in the step 2810 and the present time in the electronic tag 370. Then, the processor 500 transmits that information and freight pass information containing the freight number, lot number and "unloading" indicated in the work index to the in-base station freight information management system 230 (step 2825).

Next, the processor 500 retrieves a transport route pattern DB by using the departure store name and arrival store name as the key to determine transport route base stations. In the transport route pattern DB, transport route base stations are registered at intersection points of a matrix of departure store 3110 and arrival store 3120 as shown in FIG. 28. For example, if the departure store is "Sapporo nishiten" and the arrival store is "Fukuoka higashiten", then an entry 3130 will determine that the transport route is Sapporo nishiten-Chitose Kuhkohten-Fukuoka kuhkohten-Fukuoka higashiten. In the event that a base station to which the processor 500 belongs is not included in the thus determined transport route base stations, an erroneous alarm to this effect is delivered to the output unit 530 (step 2830).

When a delivery time is designated by the appointed delivery time 1320 obtained in the step 2815, the processor 500 delivers the appointed delivery time, freight number and arrival store name to the output unit 530 (step 2835). In case a special freight class such as "fragile" or "precision machinery and instruments" is indicated by the special freight index 1322, the contents and the freight number are delivered to the output unit 530. By watching the output, the person in charge of work can identify and handle the special freight with ease (step 2840).

Further, when the number is not less than 2, the processor 500 registers the holding freight number, lot number and the number in the lot freight information DB stored in the storage unit 510. As shown in FIG. 29, freight number 3210, lot number 3220 and the number 3230 are registered in the lot freight information DB. If, in this process, a record exists in which both the freight number 3210 and the lot number 3230 have the same values as the freight number and lot number to be registered, register operation into the lot freight information DB 3200 is not carried out (step 2845).

The processor checks whether a lot check start request is inputted to the input unit 520. In the absence of the lot check start request, the processor 500 clears the holding information and returns to the process in the step 2815 and repeats the aforementioned process in connection with the next freight (step 2850). When the lot check start request is detected in the step 2850, the processor 500 examines the lot freight information DB 3200 and counts the number of records in which the same freight number 3210 is registered. The thus obtained count value is compared with a value registered in the number 3230 corresponding to the freight number 3210 of interest and the result is delivered, together with the freight number 3210, the number 3230 and the count value, to the output unit 530. Then, a lot freight information erase request is received from the input unit 520 in respect of the individual freight numbers and when a request from the operator occurs, a record having the same freight number 3210 as the freight number in question is erased from the lot freight information DB 3200 (step 2860).

When the lot check in the step 2860 ends, the processor 500 examines whether a work end request is inputted to the input unit 520. In the presence of the work end request, the processor 500 ends the process and in the absence of the work end request, the processor repetitively carries out the processes following the step 2815 (step 2870).

On the other hand, when the in-base station freight information management system 230 receives the freight pass information from the on-vehicle system 220 in the step 2825, it registers that freight pass information in a freight pass DB stored in the storage unit 710. As shown in FIG. 30, the freight pass information DB consists of freight number 3310, lot number 3320, base station name 3330, work index 3340, pass time 3350, vehicle number 3370, custody index 3380 and person in charge name 3390. When, in this process, a record has already been present in which the same values as those of the freight number and lot number contained in the received pass freight information are set in both the freight number 3210 and the lot number 3220, register operation into the freight pass information DB 3300 is not carried out (step 2875). The in-base station freight information management system 230 transmits data registered in the freight pass information DB 3300 at intervals of constant time to the freight information overall management system 245 through the inter-base station network 260 (step 2885).

<4: Sorting>

Figure 31:
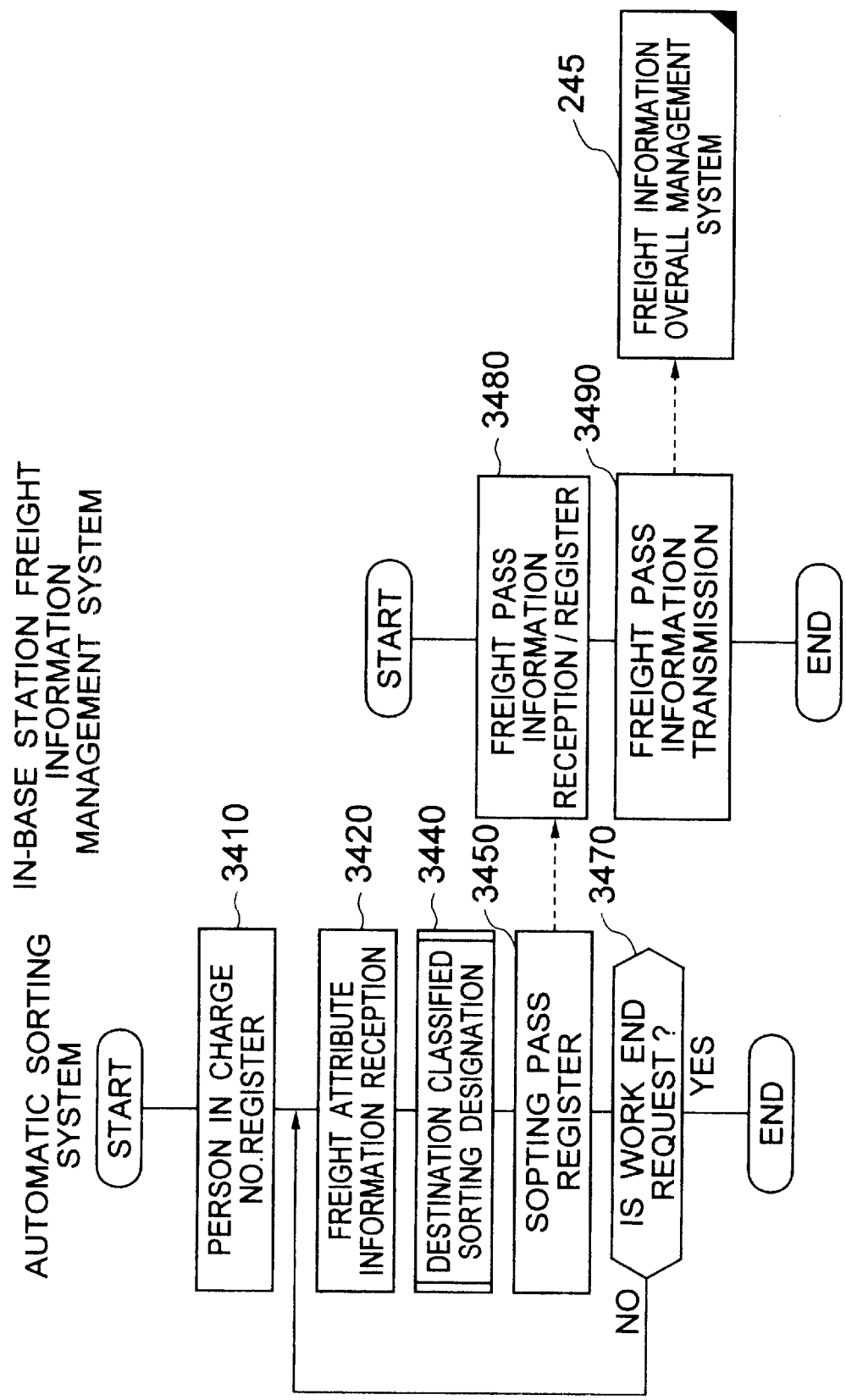
FIG. 31 is a flow chart of a process carried out by the automatic sorting system and in-base station freight information management system during the sorting process.

Unloaded freight goods are sorted by means of the automatic sorting system 235. FIG. 31 is a flow chart showing a process carried out by the automatic sorting system 235 and in-base station freight information management system 230 during the sorting process 128.

Firstly, in the automatic sorting system 235, a person number of a person in charge of sorting work is received from the input unit 815 and stored in the storage unit 810 (step 3410).

The processor 800 causes the electronic reader/writer 820 to read the freight number, lot number and arrival store name from an electronic tag 370. In case the base station for execution of the sorting work is an arrival store, the consignee name 1336, address 1338, telephone number 1340, incidental service 1318 and appointed delivery time 1320 in the collection request information 1300 held in the electronic tag 370 are also read in addition to the aforementioned information (step 3420).

Figures 32, 33:
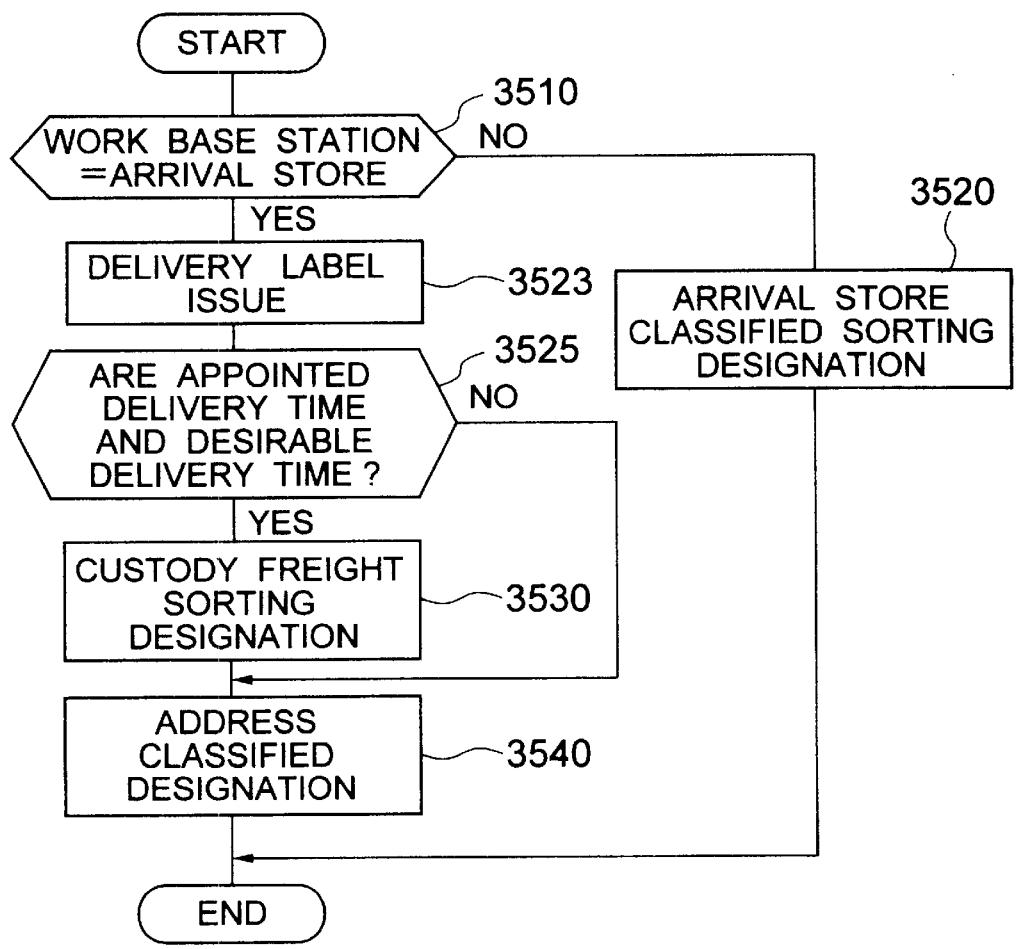
FIG. 32 is a detailed flow chart of the destination classified sorting designation.
FIG. 33 is a data structural diagram of an arrival store classified sorting DB.

Next, destination classified sorting designation is carried out (step 3440). FIG. 32 shows a detailed flow chart of the destination classified sorting designation.

In the step 3440, it is first decided on the basis of an arrival store name read out of the electronic tag 370 whether the base station in question is an arrival store in which freight goods are about to be sorted (step 3510).

If the base station of interest is not the arrival store, the processor 800 consults an arrival store classified sorting lot DB stored in the storage unit 810 by using the held arrival store name as the key to designates the freight number of the freight goods in question and sorting ports to the sorting line 840. As shown in FIG. 33, in the arrival store classified sorting DB, base station names 3620 indicative of base stations serving as destinations of freight goods distributed from the sorting ports are registered in correspondence to sorting port numbers 3610 for identifying the sorting ports of the sorting line 840. Excepting the case where the matching arrival store is not present, one or more base station names are registered in the arrival store names 3620. After issuing the sorting designation to the sorting line 840, the processor 800 shifts to the next process in step 3450 (step 3520).

On the other hand, when the base station in question is an arrival store, the processor 800 uses the information read in the step 3420 to cause the label printer 850 to issue a seal-like label described with the information. This label is attached to the freight of interest by the person in charge (step 3430). Next, the processor 800 examines from the held appointed delivery date 1320 whether the delivery time is appointed. If the time for delivery is appointed, the program proceeds to the process in step 3530 but if the delivery time is not appointed, the process in step 3530 is skipped and the program proceeds to the process in step 3540 (step 3525).

In the step 3530, the processor 800 commands sorting of freight goods kept in custody by consulting a sorting time zone—delivery end time correspondence DB stored in the storage unit 810. As shown in FIG. 34, in the sorting time zone—delivery end time correspondence DB, schedule times (delivery end schedule times) 3720 at which delivery of freight goods subjected to sorting work carried out in the time zones are registered in respect of the individual time zones for sorting work (sorting time zones) 3710. For example, it will be seen that freight goods sorted between 10:00 and 12:00 in the figure are scheduled to be delivered before 14:00. The processor 800 retrieves a time zone to which the current time belongs from the time zones 3710 to obtain a corresponding delivery end schedule time 3720. Then, the appointed delivery time 1320 obtained in the step 3420 is compared with the work end schedule time. If the delivery end schedule time is earlier, the sorting line 840 is commanded to sort the corresponding freight in question to the custody freight sorting port. In case the delivery end schedule time is later, the sorting command is not delivered (step 3530).

In the step 3540, the processor 800 consults an address classified sorting port DB by using the obtained consignee address 1338 as the key to command, to the sorting line 840, a sorting port for the freight in question. As shown in FIG. 35, addresses (regions) 3820 representing destinations of delivery from sorting ports are registered in respect of individual sorting port numbers 3810 (step 3540).

Subsequent to the destination classified sorting command, the processor 800 reads a person in charge number and a precedently registered name of a base station at which the work has been carried out. Then, the information is registered, together with the current time, "sorting" indicative of the work index and custody index, in the electronic tag 370. In connection with the custody index, "custody" is registered for freight for which the custody freight sorting command is issued in the step 3530 and "pass" is registered for freight for which the custody freight sorting command is not issued. Further, the processor 800 transmits freight pass information in the form of the freight number and lot number obtained in the step 3420, together with the information registered in the electronic tag 370, to the in-base station freight information management system 230 (step 3450).

Thereafter, the processor 800 decides whether a work end request is received and in the presence of the work end request, it ends the process. If the work end request is not received, the processor 800 returns to the step 3420 to continue the process (step 3470).

When the in-base station freight information management system 230 receives the freight pass information transmitted from the automatic sorting system 235 in the step 3450, the processor 700 registers that freight pass information in the freight pass information DB 3300 similarly to the step 2875 (step 3480). Then, the information registered in the freight pass information DB 3300 is transmitted at intervals of constant time to the freight information overall management system 245 through the inter-base station network 260 (step 3490).

<5:Loading>

Figure 36:
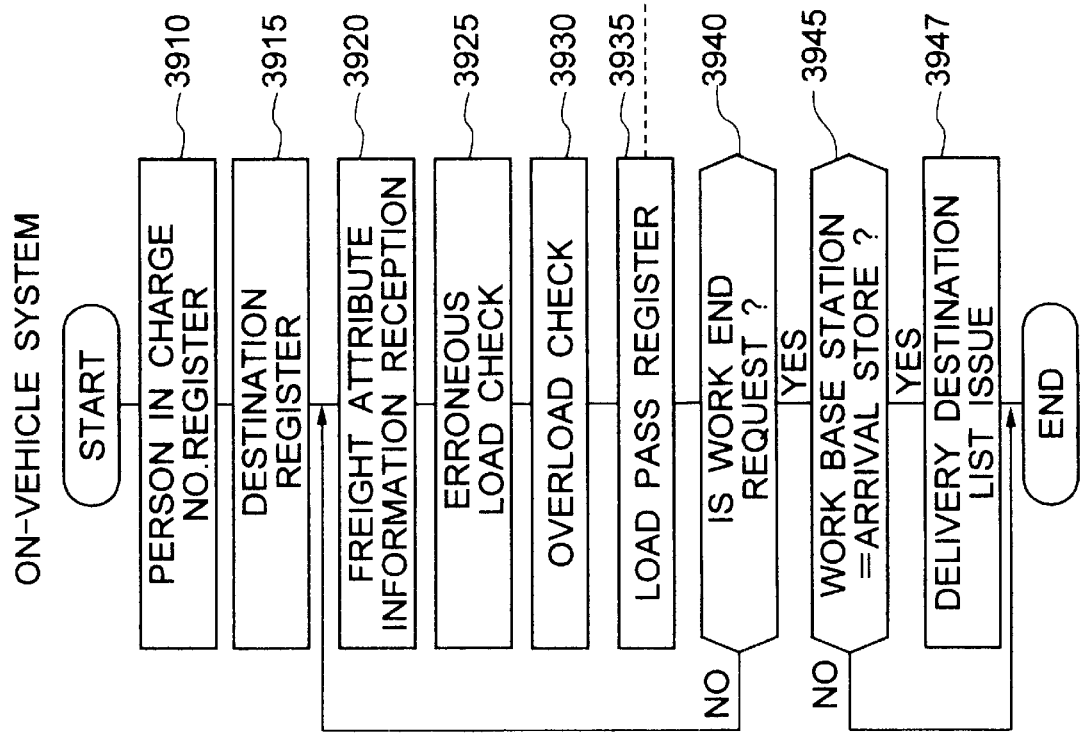
FIG. 36 is a flow chart showing the process flow in the loading process.

FIG. 36 is a flow chart showing the flow of a process carried out when freight is loaded on a vehicle in the loading process 130.

In the loading process 130, the processor 500 receives the input of person in charge number and base station name from the input unit 520 of the on-vehicle system 220. The inputted person in charge number and base station name are stored in the storage unit 510 (step 3910). Similarly, the input of destination base station name is received by the input unit 520 and the inputted base station name is stored in the storage unit 510. Also, as initial setting, 0 is set in a weight total variable (step 3915).

The processor 500 causes the electronic tag reader/writer 550 to read the freight number of freight to be loaded, the lot number, the departure store name and the arrival store name. When the work base station is an arrival store, the electronic tag index is also read. In case the electronic tag index is "basic electronic tag", the number 1316, the consignee name 1336, address 1338, telephone number 1340 and appointed delivery date 1320 which have been recorded as the collection request information 1300 are also read and stored, together with the freight number, in the storage unit 510 (step 3920)

Similarly to the step 2830, the processor 500 retrieves the transport route pattern DB 3100 on the basis of the departure store name and arrival store name to determine transport route base stations. If the destination base station name inputted in the step 2915 is not included in the transport route base stations, an erroneous loading alarm is delivered to the output unit 530 (step 3925). Next, a new weight total is determined by adding the weight read out of the electronic tag 370 in the step 3920 to the weight total variable and a result is compared with a load limit weight value precedently registered in the storage unit 510. When the weight total variable is larger than the load limit weight value, an overload alarm is delivered to the output unit 530 (step 3930).

Following the above check procedure, the processor 500 registers the person in charge number, base station name, current time and a vehicle number precedently stored in the storage unit 510 as well as work index indicative of "loading" in the electronic tag 370. The information as above, together with the freight number and lot number, is transmitted as freight pass information to the in-base station freight information management system 230 (step 3935).

Next, the processor 500 examines whether a work end request is inputted from the input unit 520 and in the absence of the work end request, it repetitively carries out the process following the step 3920 (step 3940). In the presence of the work end request, the processor 500 examines whether the work base station is an arrival store and if not the arrival store, it ends the process (step 3945). If the work base station is the arrival store, the processor 500 reads the freight number, the number 1316, the consignee name 1336, the address 1338, the telephone number 1340 and the appointed delivery date 1320 and delivers a delivery destination list describing the information as above to the output unit 530. As shown in FIG. 37, the delivery destination list is a list describing freight number 2910, the number 2920, consignee name 2930, address 2940, telephone number 2950 and appointed delivery date 2960 of all freight goods to be delivered by the individual delivery vehicles 110. The delivery destination list 2900 is used when the person in charge of delivery carries out delivery transport of freight. It is to be noted that an existing car navigation system may be mounted in the delivery vehicle and the delivery destination list 2900 may be delivered to the display screen of the car navigation system. When the processor 500 delivers the delivery destination list 2900, it ends the process (step 3947).

On the other hand, when receiving the freight pass information forwarded from the on-vehicle system 220 in the step 3935, the in-base station freight information management system 230 registers that freight pass information in the freight pass information DB 3300 similarly to the steps 2875 and 2885 in unloading (step 3950) and transmits it at intervals of constant time to the freight information overall management system 245 through the inter-base station network 260 (step 3955).

Figure 38:
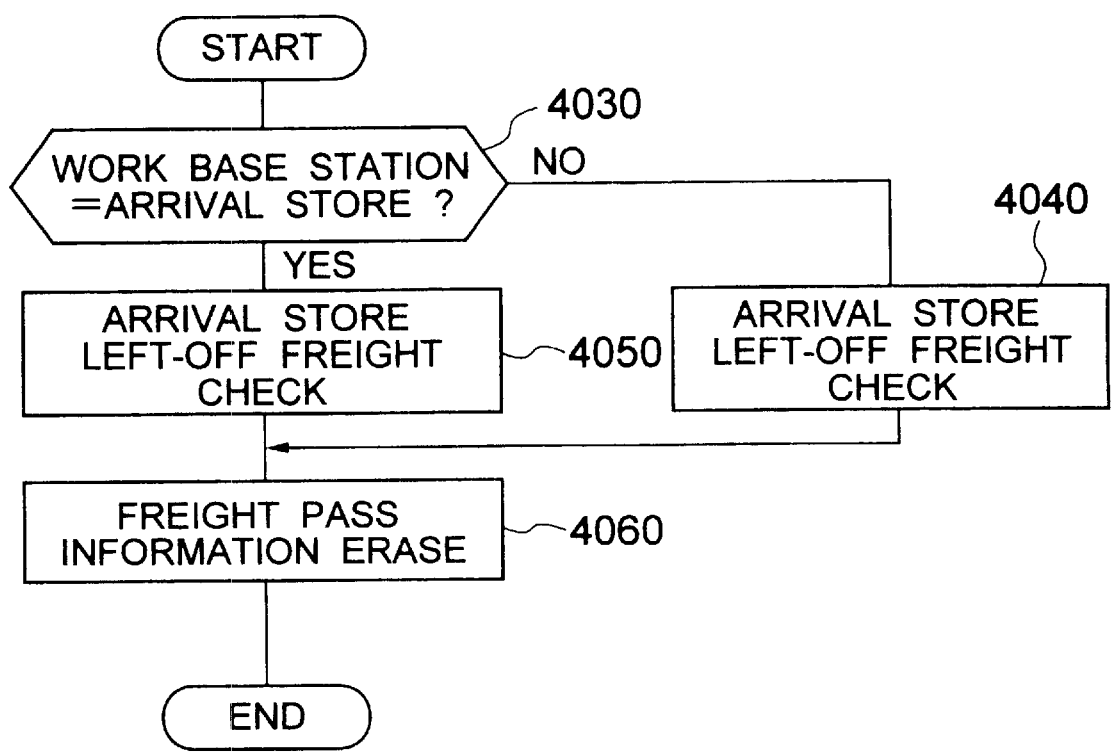
FIG. 38 is a flow chart showing the process flow during check of left-off freight in the loading process.

FIG. 38 is a flowchart showing the flow of a process for checking left-off freight in the unloading process 130. The processor 700 in the in-base station freight information management system 230 responds to a left-off check start request to carry out the following left-off check process.

Firstly, it is decided whether the work base station is an arrival store or a base station other than the arrival store (step 4030). If the work base is not the arrival store, the processor 700 obtains a freight number 3310 of a record in which the work index 3340 is set to "unloading" from the freight pass information DB 3300 stored in the storage unit 710. Subsequently, the processor 700 obtains a freight number 3310 of a record in freight pass information DB 3300 in which the work index 3340 is set to "loading". The processor 700 compares the two and when a freight number 3310 not contained in the freight number of the record in which the work index 3340 is set to "loading" exists in the freight number 3310 of the record in which the work index 3340 is set to "unloading", the processor 700 delivers that freight number, as a left-off freight number, to the output unit 730 (step 4040).

On the other hand, when the work base station is the arrival store, the processor 700 obtains from the freight pass information DB 3300 a freight number 3310 of a record in which the work index 3340 is set to "sorting" and the custody index 3380 is set to "pass" and all freight numbers registered in a carry-out freight information DB to be described later. Next, a freight number of a record in which the work index 3340 is set to "loading" is obtained from the freight pass information DB 3300. If a freight number of a record in which the work index 3340 is set to "loading" exists in freight number 3310 of a record in which the work index 3340 is set to "sorting" and the custody index 3380 is set to "pass" and in all freight numbers registered in the carry-out freight information DB to be described later, that freight number is delivered, as a left-off freight number, to the output unit 730 (step 4050).

Following the process in the steps 4040 and 4050, the processor 700 erases a record which has already been transmitted to the freight information overall management system 245 from all of information in the carry-out freight information DB and the records in the freight pass information DB (step 4060).

<6: Delivered Freight Hand-Over>

Figure 39:
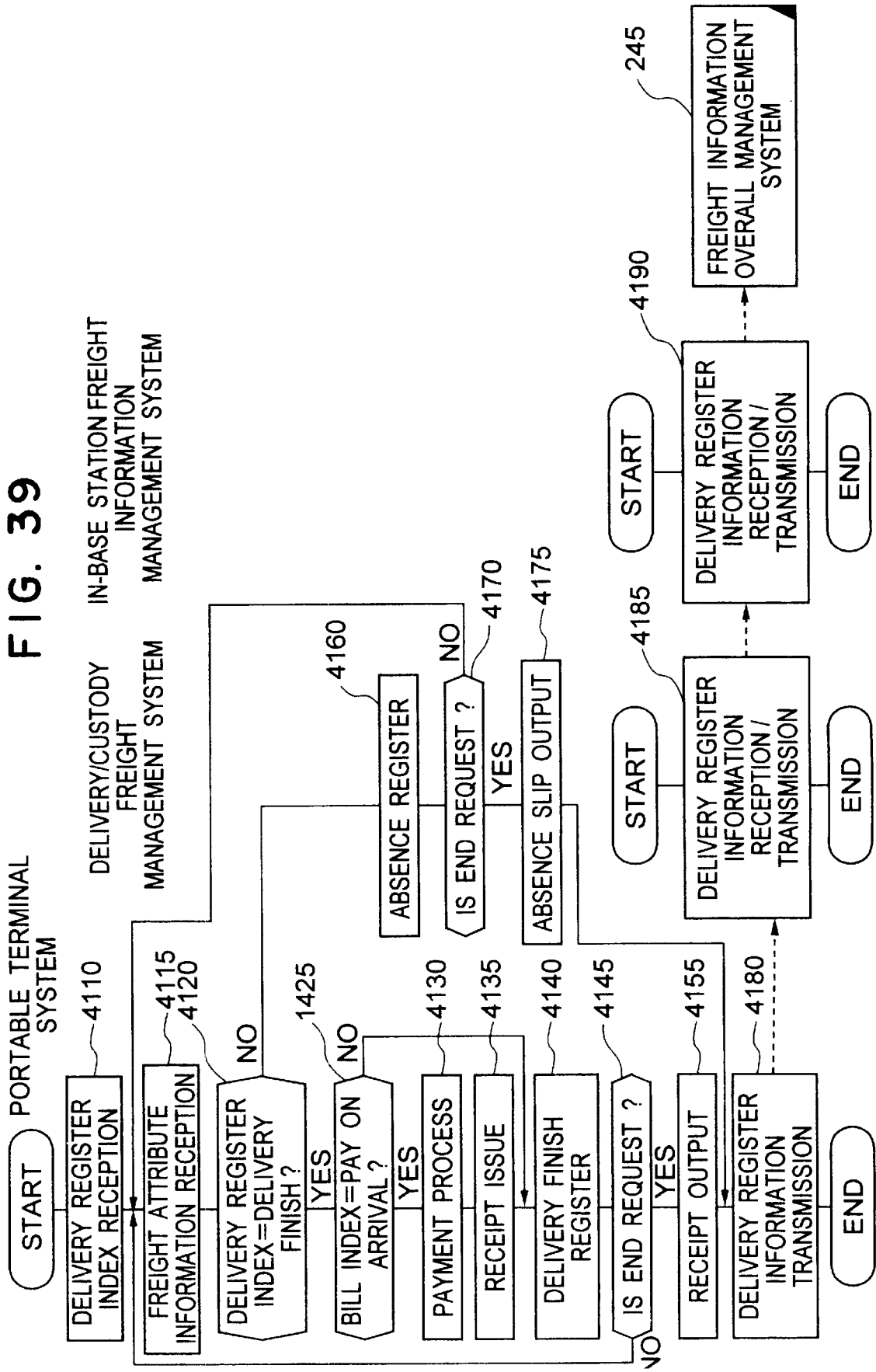
FIG. 39 is a flow chart showing the process flow of the delivered freight hand-over process.

FIG. 39 is a flow chart showing the process flow of the delivered freight hand-over process 136.

In the delivered freight hand-over 136, a delivery register index is first received from the input unit 420 of the portable terminal system 215. When freight cannot be handed over for the reasons that the consignee is absent at the time of delivery of freight, "absence register" is inputted as the delivery register index but when hand-over is completed, "delivery completion register" is inputted (step 4110). With the delivery register index inputted, the processor 400 causes the electronic tag reader/writer 440 to read, from the electronic tag 370, the freight number, lot number, collection request information, weight, electronic tag index and fee. At that time, if the electronic tag classification is a lot tag, the read-out contents is discarded and information is read out of another electronic tag 370 (step 4115). Next, the delivery register index inputted in the step 4110 is decided and if the delivery completion register prevails, the program proceeds to step 4125 but if the absence register prevails, the program proceeds to the process in step 4160.

In the step 4125, the contents of bill index in the collection request information read out of the electronic tag 370 in the step 4115 is further decided. In case pay on arrival is set in the bill index, the process in step 4130 and in case of other than pay on arrival, the program proceeds to the process in step 4140.

In the step 4130, the processor 400 displays a fee read out of the electronic tag 370, together with the freight number, on the output unit 430. Subsequently, the processor 400 receives the input of charge recovery index from the input unit 420. When the recovery index is "finished", the processor 400 updates the recovery index by using this indication. Next, with the recovery index inputted in the step 4130 being "finished", the processor 400 causes the label printer 490 to deliver a receipt describing the consignee name, bill index, fee, transport service contractor name, base station name, person in charge name, delivery date and sign column in the collection request information. It is assumed that the transport service contractor name, base station name and person in charge name are precedently registered in the storage unit 410 (step 4135).

In the step 4140, the person in charge name, delivery date and "delivery completion" indicated in the work index are registered in the electronic tag 370 by means of the electronic tag reader/writer 440. At that time, the processor 400 registers similar information in a lot electronic tag 374 having the same freight number as that read in the step 4115. The freight number, lot number, collection request information, weight, fee and the delivery data registered in the electronic tag 370 are stored in the storage unit 410.

Next, the processor 400 examines whether a delivery completion register end request is inputted from the input unit 420 and in the absence of the delivery completion register end request, the processor 400 repeats the process following the step 4115 (step 4145). In the presence of the inputted end request, the freight number, lot number, collection request information, weight and fee stored in the storage unit 410 are described by the number of freight goods handed over to the consignee and a receipt described with the transport service contractor name, base station name, person in charge name, delivery date and sign column and its copy are delivered from the label printer 490, together with the aforementioned information. The receipt is signed by the consignee and then carried back by the person in charge while the copy being transferred to the consignor (step 4155).

When the delivery register index inputted in the step 4110 is "absence register", the processor 400 causes the electronic tag reader/writer 440 to register the person in charge name, processing date and "absence" indicated in the work index in the electronic tag 370. At that time, similarly to the step 4140, similar information is also registered in the electronic tag 374 having the same freight number and information such as the processing date, freight number, lot number, collection request information, weight and fee is stored in the storage unit 410 (step 4160).

Next, the processor 400 examines whether an absence register end request is inputted from the input unit 420 and in the absence of the absence register end request, the processor 400 returns to the step 4115 to repeat the absence register process in connection with other freight goods (step 4170). In the presence of the absence register end request, the processor 400 causes the label printer 490 to deliver an absence slip in which the freight number stored in the storage unit 410 and the article, the number and consignor name in the collection request information are described in correspondence to the number of freight goods and in which the consignee name, transport service contractor name, base station name, person in charge name, processing date, sign column and a sentence giving notice of the absence. The absence slip is left at the consignee destination in order to inform the consignee of the absence (step 4175).

After the receipt is delivered in the step 4155 or the absence slip is delivered in the step 4175, the processor 400 transmits the delivery register information registered in the storage unit 410, such as the freight number, delivery (processing) date, work index and recovery index, to the delivery/custody freight management system 240 through the radio communication unit 480 (step 4180). In the delivery/custody freight management system 240, the processor 900 receives the delivery register information transmitted from the portable terminal system 215 by way of the radio communication unit 940 and transmits it to the in-base station freight information management system 230 through the in-base station network 255 (step 4185). Further, the in-base station freight information management system 230 transmits the received delivery register information to the freight information overall management system 245 through the inter-base station network 260.

<7: Custody>

Figure 40:
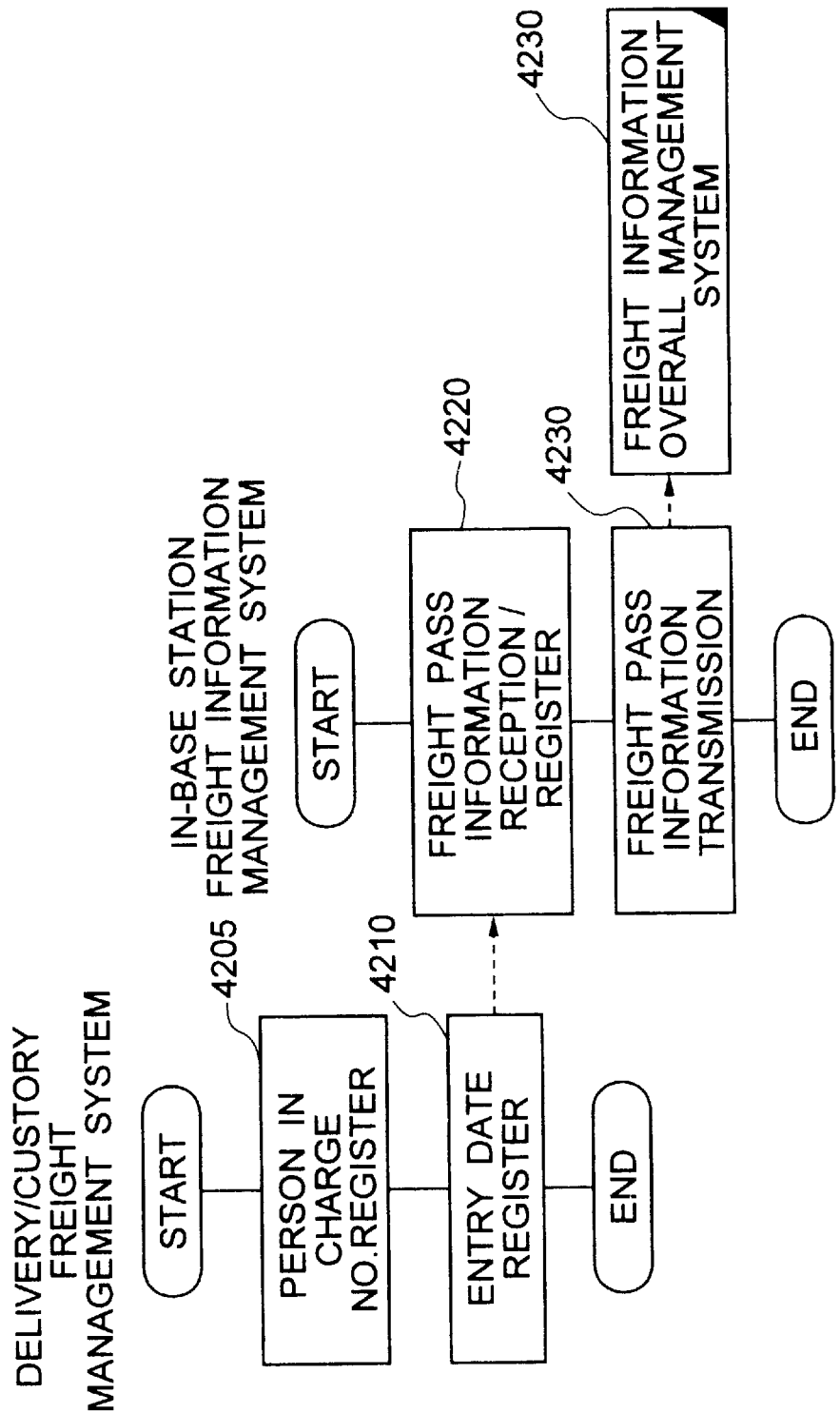
FIG. 40 is a flow chart of the custody process carried out when freight is carried to a custody place.

FIG. 40 is a flow chart of a process carried out when the freight is carried into a custody place in the custody process 138.

When the freight is carried into the custody place, the person in charge number and base station name are inputted from the input unit 920 of the delivery/custody freight management system 240 and stored in the storage unit 510 (step 4205). The processor 900 of the delivery/custody freight management system 240 causes the electronic tag reader/writer 950 installed near an entrance of the custody place to read the freight number and the lot number from the electronic tag 370 of the freight which passes through the entrance when it is brought into the custody place. At that time, the processor 900 writes the current date as entry date into the electronic tag 370. When the entry date has already been recorded on the electronic tag 370, register operation of the entry date is not effected. The processor 900 transmits, as the freight pass information, the freight number and lot number as well as the base station name precedently stored in the storage unit 910, the person in charge name inputted in the step 4205 and "custody" indicated in the work index to the in-base station freight information management system 230, thus ending the process.

In the in-base station freight information management system 230, when the freight pass information transmitted from the delivery/custody freight management system 240 is received, the processor 700 registers the freight pass information in the freight pass information DB 3300 similarly to the step 2875 (step 4220). Then, the information registered in the freight pass information DB 3300 is transmitted at intervals of constant time to the freight information overall management system 245 through the inter-base station network 260 (step 4230).

Figure 41:
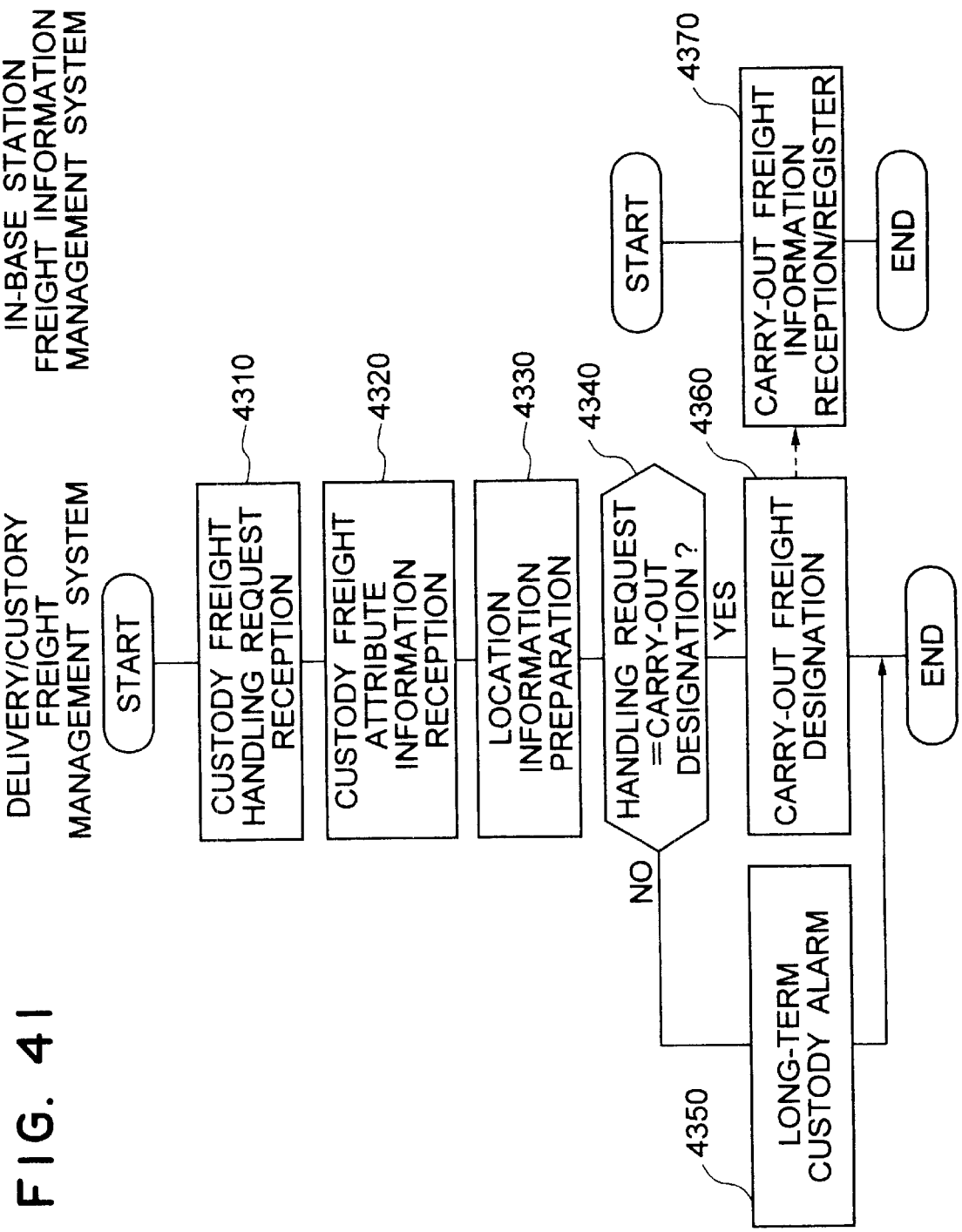
FIG. 41 is a flow chart of a process carried out when a command for carrying out the freight kept in custody and a long-term custody freight alarm are delivered.

FIG. 41 is a flow chart of a process in the custody process 138 carried out by the delivery/custody freight management system 240 and in-base station freight information system 230 when a freight carry-out command and a long-term custody freight alarm are delivered.

The process shown in FIG. 41 is started when a custody freight handling request is inputted from the input unit 920. The custody freight handling request is classified into a carry-out freight command for designating freight to be loaded on a delivery vehicle 110 and a long-term freight notice command for confirming the existence of freight which has been kept in custody for a predetermined time or more (step 4310).

When the custody freight handling request is inputted, the processor 900 causes the electronic tag reader/writer 950 installed at the custody place to read the freight number, lot number, appointed delivery date and entry date which are recorded on an electronic tag 370 attached to the freight kept in custody (step 4320). The processor 900 prepares a custody freight location DB on the basis of the read-out information and stores it in the storage unit 910. As shown in FIG. 42, the custody freight location DB includes, as information, freight number 4410, lot number 4420, appointed delivery date 4430, entry date 4440 and location information 4450 indicative of an approximate position of the freight in the custody place. For example, the location information 4450 can be obtained by moving one or more electronic tag reader/writers 950 within the custody place and calculating through the correspondence between a read time and a freight number read out of the electronic tag 370 or installing an electronic reader/writer in a unit of location and calculating through the correspondence between a location number and a freight number (step 4330).

Figure 43:
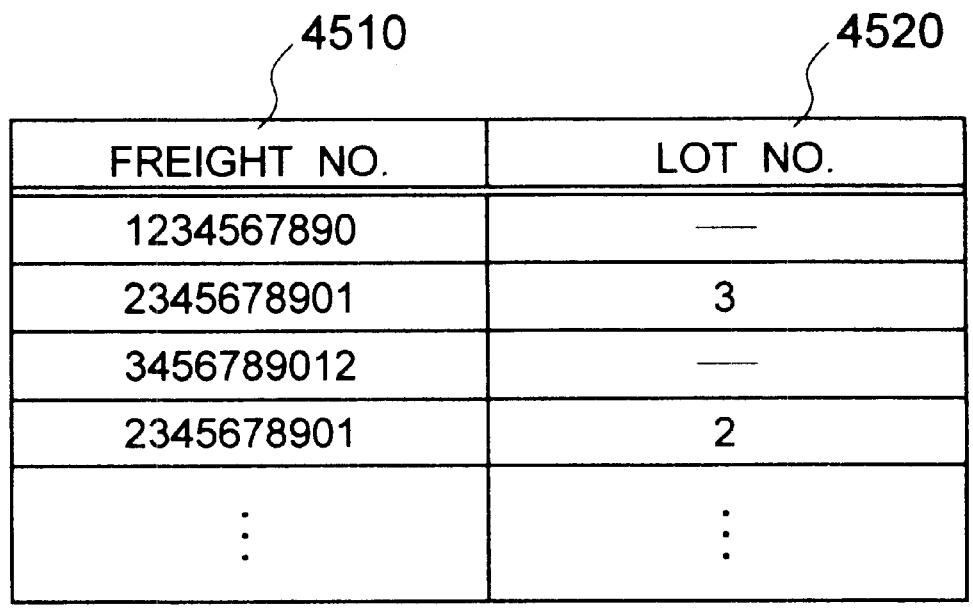
FIG. 43 is a data structural diagram of a carry-out freight DB.

Next, the processor 900 decides the type of the custody freight handling request inputted in the step 4310 (step 4340). If the custody freight handling request is a long-term custody freight notice command, the processor 900 extracts, from the custody freight location DB 4400, a record of data for which a preset time starting with a date set in the entry date 4440 has elapsed. Then, the freight number 4410, lot number 4420 and location 4450 in the extracted record are delivered, as long-term custody freight information, to the output unit 930 and the process ends (step 4350). On the other hand, when the custody freight handling request is a carry-out freight command, delivery time zone information including delivery start schedule date and delivery end schedule date is received from the input unit 920. The processor 900 takes out of the custody freight location information DB 4400 a record in which the value set in the appointed delivery date lies between the delivery start schedule date and the delivery end schedule date in the delivery time zone information received here. Then, the processor deliver the freight number 4410, lot number 4420 and location information 4450 in the taken-out record and transmits the freight number 4410 and lot number 4420, as carry-out information, to the in-base statio freight information system 230, thus ending the process (step 4360). In the in-base station freight information system 230, the carry-out information forwarded from the delivery/custody freight management system 240 is stored in a carry-out freight DB stored in the storage unit 710. As shown in FIG. 43, the carry-out DB has a list of freight number 4510 and lot number 4520 (step 4370).

<8: Freight Information Management>

Figure 44:
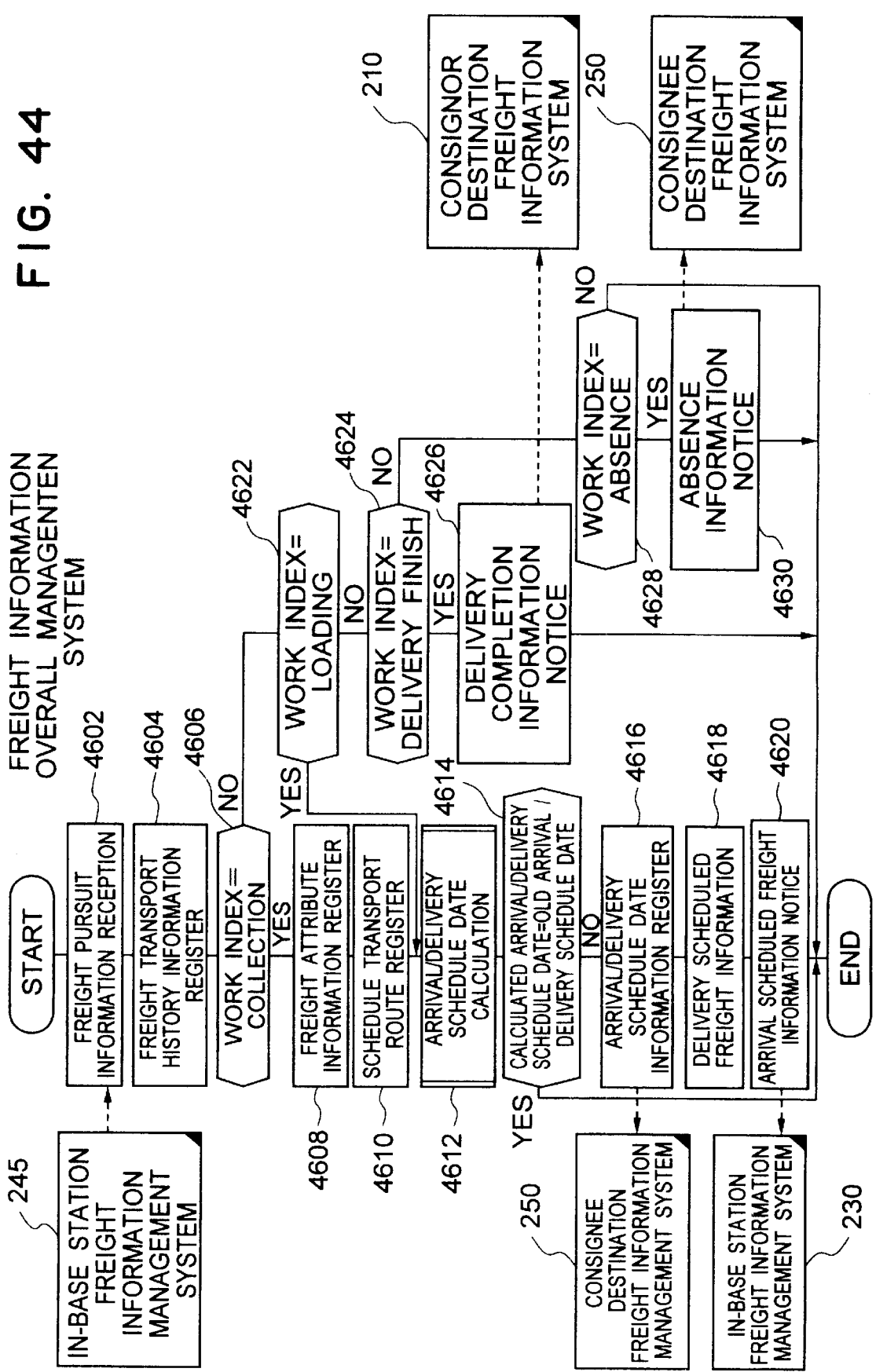
FIG. 44 is a flow chart showing the process flow of the freight information management process.

FIG. 44 is a flow chart showing the process flow in the freight information management process 168.

When receiving the pass freight information from the in-base station freight information management system 230 (step 4602), the freight information overall management system 245 registers data regarding transport history in a freight transport history DB. As shown in FIG. 45, the freight transport history DB holds pass point, base station name, work index at the base station, pass date, person in charge of work, and name of a vehicle participating in the work in respect of individual freight numbers (step 4604). The processor 1100 consults the freight transport history DB 4800 and carries out the following process in respect of the individual freight numbers. Firstly, the processor 1100 examines the latest work index registered in the freight transport history and if the work index is collection, the processor proceeds to step 4608 and in case of a different class, the processor proceeds to step 4622 (step 4606).

In case the latest work index is collection, freight attribute information necessary for management of freight is registered in a freight attribute DB in this phase. Various kinds of information as shown in FIG. 46 are held in respect of the individual freight numbers in the freight attribute DB (step 4608). Subsequently, an arrival store/departure store area information DB is consulted to retrieve an arrival store name meeting information concerning a delivery destination in the freight attribute DB 4700. As shown in FIG. 47, in the arrival store/departure store area information DB, district areas 5020 in which base stations taking charge of arrival stores or departure stores are registered in respect of the individual base stations (arrival stores/departure stores) 5010. On the basis of an arrival store name obtained from this DB and a departure store name obtained from the freight attribute information 4700, a transport route pattern DB 3100 stored in the storage unit 1110 is retrieved to extract a transport route. The processor 1100 registers the extracted transport route in a transport route schedule DB. As shown in FIG. 48, the transport route schedule DB 4900 holds base station index 4910, arrival base station names 4900 corresponding to the base station index and arrival schedule date 4930 at the arrival base station in respect of the individual freight numbers. Of the information in the transport route schedule DB 4900, the arrival schedule date 4930 is determined and registered/updated through a process for calculation of arrival/delivery schedule date in step 4612 when the collection process or the loading process ends (step 4610).

Figures 49, 50:
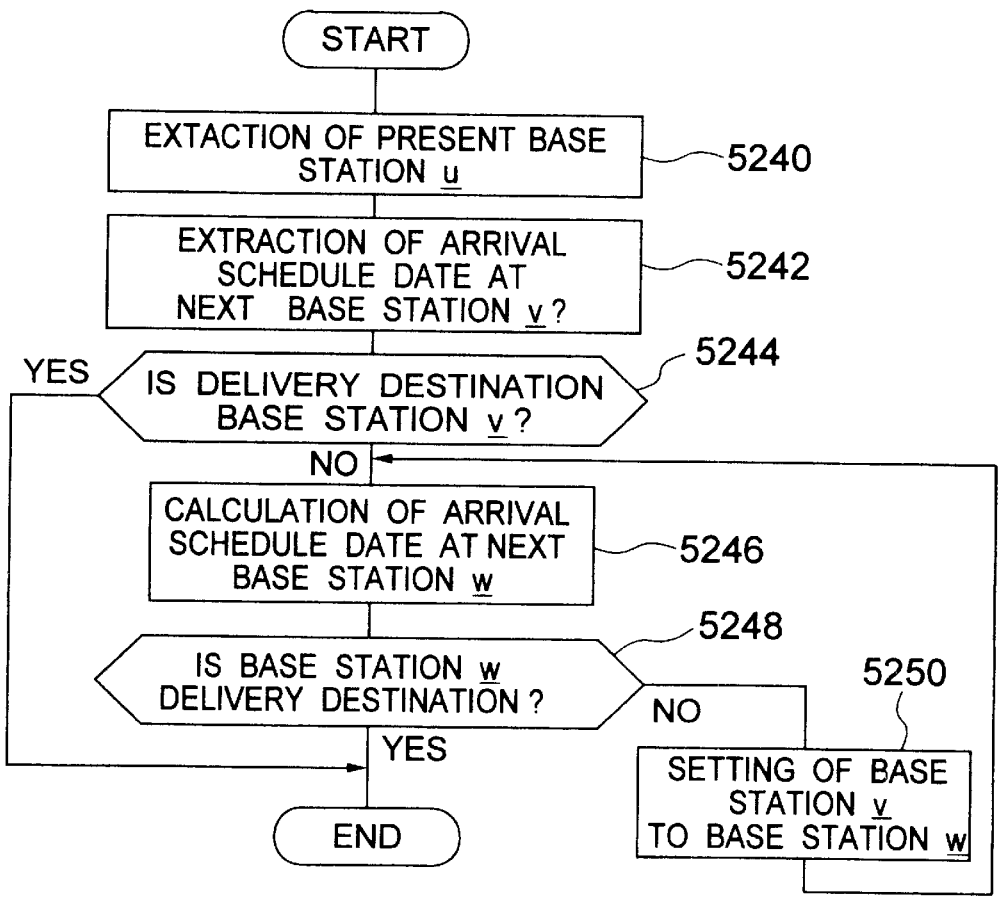
FIG. 49 is a flow chart of the process for calculation of arrival/delivery schedule date.
FIG. 50 is a data structural diagram of a shift master DB of transport mail.

In the step 4612, the processor 1100 performs calculation of arrival schedule dates at the individual base stations and delivery destination. FIG. 49 shows a flow chart of the process for calculation of the arrival/delivery schedule date.

In the calculation process of arrival schedule date, a pass point in the latest history data (data at the end of the history data) is determined as base station u at present on the basis of the freight transport history DB 4800 (step 5240). The processor 1100 extracts a base station next to the present base station u from the transport route schedule DB 4900 and specifies a shift master DB of transport mail from the present base station u to the next base station v. As shown in FIG. 50, transport mail shift 5310 on route, base station departure time 5320 of each transport mail vehicle shift and arrival time 5330 at the next base station are registered in the transport mail shift master DB 5300. Next, the processor 1100 extracts a transport mail shift which can depart in the nearest future in accordance with the specified transport mail shift master DB 5300 and the pass date in the latest history data and on the basis of the arrival time of the transport mail shift, determines an arrival schedule time at the next base station v (step 5242).

Subsequently, it is decided whether the next base station v is delivery destination and if the next base station v is a delivery destination, the calculation process of arrival schedule date ends (step 5244).

If the next base station v is not a delivery destination, the processor 1100 uses the previously determined arrival schedule date to extract, from a work shift master DB of the base station v, a work shift in which a series of work consisting of unloading, sorting and loading can be started earliest. As shown in FIG. 51, work shift 5410 and start time 5420 and end time 5430 of each work shift are registered in respect of the individual base stations in the work shift master DB 5400. The processor 1100 consults the transport mail shift master DB 5300 of transport mail from the base station v to the next base station w on the basis of an extracted work shift end time 5430 and calculates an arrival time at the base station w similarly to the step 5242 (step 5246).

Next, the processor 1100 examines whether the base station w is a delivery destination and if a delivery destination, this process ends (step 5248). In case the base station w is not a delivery destination, the base station v is replaced with the base station w (step 5250) and the processor returns to the step 5246 to calculate an arrival schedule time at a base station after next.

After ending the calculation of the arrival schedule date, the processor 1100 compares the calculated arrival schedule date with the arrival schedule date registered in the transport route schedule DB 4900 (step 4614). In case the two coincide with each other, indicating that the freight is transported on schedule, the process ends as it is. If the two differ from each other, the schedule of transport is not on schedule. In this case, the processor 1100 updates an arrival schedule date 4930 at the base station (or consignee destination) for which the calculated arrival schedule date differs from the arrival schedule date registered in the transport route schedule DB 4900, with the calculated arrival schedule date. Since the arrival schedule date is registered initially at the time that the collection information is settled, arrival schedule dates calculated for the individual base stations are all registered (step 4616).

When the arrival (delivery) schedule date at the consignee destination is changed, the processor 1100 informs a consignee destination freight information system 250 of a new arrival (delivery) schedule date. The consignee destination freight information system 250 of interest is specified from an electronic address corresponding to a delivery destination in the freight attribute DB 4700 (step 4618). If a base station for which the arrival schedule date is changed is present, the processor 1100 informs, to an in-base station freight information management systems 230 in the base stations, arrival schedule freight information including freight number of the corresponding freight and the new arrival schedule date (step 4620).

In the step 4622, the latest work index is examined and if loading is indicated, the program proceeds to the step 4614 and as in the case of the work index indicative of collection, the process following the step 4614 is carried out. If the work index is not indicative of loading, it is further decided whether the latest work index is indicative of delivery completion (step 4624).

When the work index is delivery completion, the processor 1100 informs the consignor destination freight information management system of delivery completion information including image information of a receipt with reception sign, delivery destination, delivery date, article and fee, thus ending the process (step 4626).

When the work index is determined not to be delivery completion in the step 4624, it is further examined whether the latest work index is absent and if the work index is not absent, the process ends (step 4628). On the other hand, in the absence of the work index, the processor 1100 transmits information such as consignor information, article and absence confirming date, the desirable delivery destination and inquiry about date to the consignee destination freight information system 250, thus ending the process (step 4630).

Here, the calculation and recalculation of arrival/delivery schedule date is carried out at the time that the collection process or the loading process ends but for realization of precise transport pursuit, the recalculation of arrival/delivery schedule date may also be carried out at the time that the unloading or the sorting process ends.

<9:Delivery Destination/Date Change Request and Handling>

Figure 52:
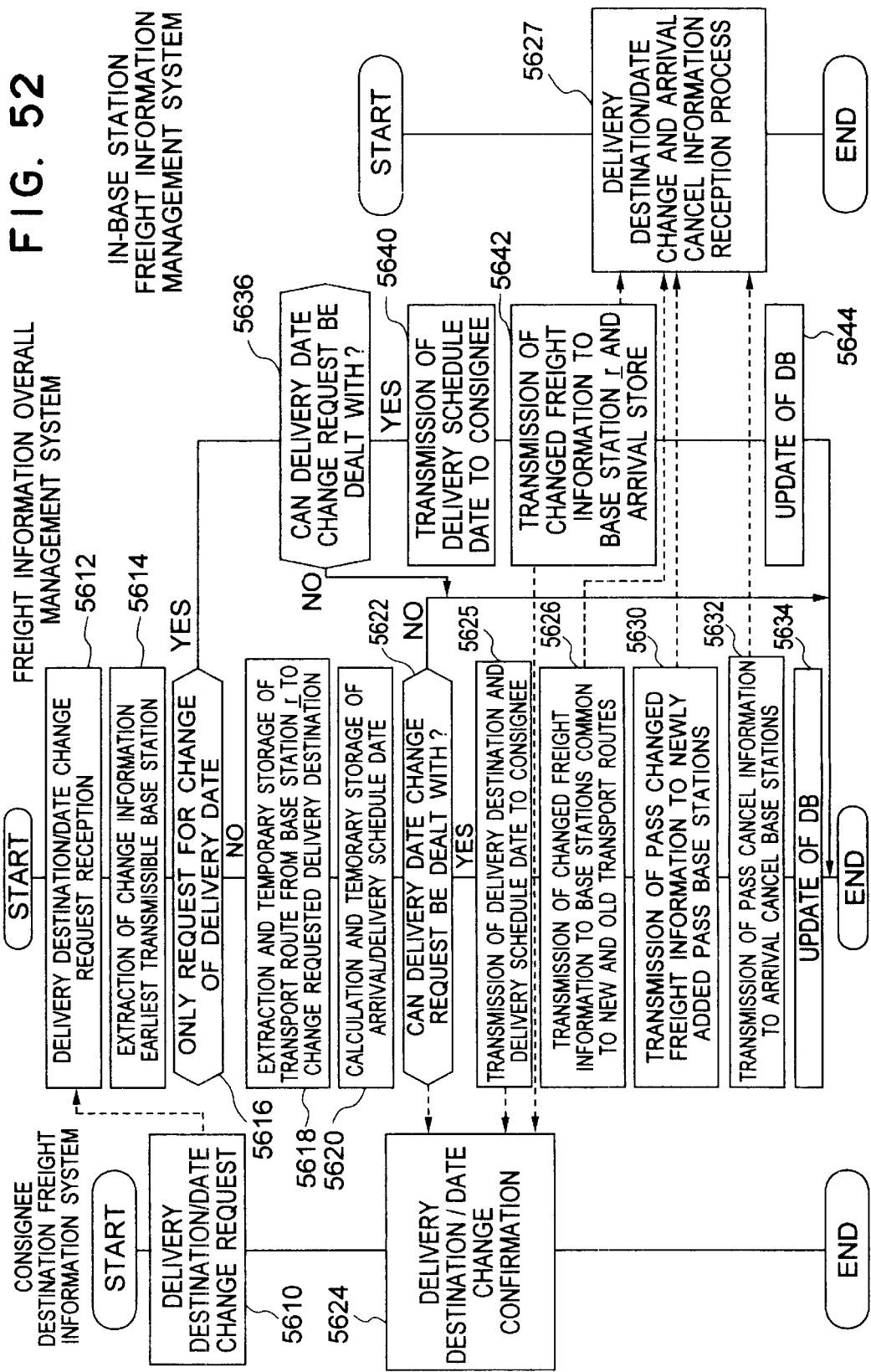
FIG. 52 is a flow chart showing the process flow of the delivery destination/date change request and delivery destination/date change handling processes.

FIG. 52 is a flow chart showing the process flow of the delivery destination/date change request process 162 and the delivery destination/date change handling process 164. In this process, when the consignee destination freight information system 250 makes a request for changing the delivery destination and date in response to a delivery schedule freight information notice or an absence notice from the freight information overall management system 245, the freight information overall management system 245 calculates an arrival schedule date in response to the change request and if being able to respond to the change, it informs the in-base station freight information management system 230 and consignee destination freight information system 250 of change information. If being unable to respond to the change, the system 245 informs the consignee destination freight information system 250 of change impermissible information.

When the change of delivery schedule freight information notice received from the consignee through the freight information overall management system 245 or the change of delivery destination or date responsive to the absence notice is commanded, the consignee destination freight information management system 250 transmits a delivery destination change request or a delivery date change request to the freight information overall management system 245 in a unit of freight number (step 5610).

When the freight information overall management system 245 receives the delivery destination change request or delivery data change request forwarded from the consignee destination freight information management system 250 (step 5812), the processor 1100 extracts a base station r in which information in an electronic tag 370 can be updated earliest in order to write the change contents into the electronic tag 370 of freight in question. Specifically, pass point names and work index are taken out of the latest history data in the freight transport history DB 4800. In case the work index is loading completion, indicating that the process is on the way of transport, the processor 1100 determines the next arrival base station as base station r. For determination of this base station, the transport route schedule DB 4900 is consulted to retrieve a pass point name extracted from the freight transport history DB 4800 and an arrival base station next to the pass point is determined as this base station. On the other hand, if the work index is of unloading completion or sorting completion, indicating that the freight is present at any base station, this base station corresponds to a pass point extracted from the freight transport history DB 4800 (step 5614).

Next, the processor 1100 examines the contents of the change request and if the change request is for only the delivery date, proceeds to the process in step 5636 but if the change request is for both the delivery destination and the delivery date, it proceeds to the process in step 5618 (step 5616).

When only the request for changing the delivery destination prevails or both the request for changing the delivery destination and the request for changing the delivery date prevail, the processor 1100 retrieves the arrival store/ departure store area information DB 5000 on the basis of address information of the change request delivery destination to extract a base station P taking charge of an area of the changed delivery destination as a new arrival store. Next, the processor 1100 retrieves the transport route pattern DB 3100 on the basis of the base stations r and P to determine a transport route ranging from the base station r to the delivery destination subject to the change request. Specifically, the determination is carried out as below in accordance with the base index of the base station r.

(1) In case of base station r being departure store

In this case, the transport route ranging from the base station r to the change request delivery destination is determined similarly to the ordinary transport route.

(2) In case of base station r being departure transit store or arrival transit store In this case, the processor 1100 retrieves an entry in which the arrival store name 3120 indicates the base station P from the transport route pattern DB 3100 to extract a transport route pattern including the base station r in the transport route. Then, by using a transport route from the base station r to the base P in the extracted transport route pattern, the transport route reaching the change request delivery destination is determined.

(3) In case of base station r being arrival store

This case corresponds to moving toward an arrival store or a state in which the freight is in an arrival store and delivery is not yet finished or the delivery of the freight is not permitted because of the absence of the consignee. In this case, the transport route reaching the change request delivery destination is determined similarly to the ordinary transport route by using the arrival store (base station r) before the change request as a departure store.

The processor 1100 temporarily stores the new transport route determined as above (step 5618).

In connection with the determined new transport route, the processor 1100 calculates schedule dates of freight arrival at individual base stations and the consignee destination after the change through the process similar to that explained with reference to FIG. 49 (step 5620).

Next, the processor 1100 gives the consignee destination freight information management system 250 notice for asking whether delivery on the delivery date designated by the delivery data change request is permissible or impermissible. Here, it is examined whether the delivery date designated by the delivery date change request is later than the freight arrival schedule date at the consignee destination determined in the step 5620. When the requested delivery date is earlier than the arrival schedule date, the delivery date change request cannot be dealt with and therefore, the processor 1100 ends the process. At that time, inability to deal with and information for requesting the change of the delivery date are transmitted to the consignee destination freight information system 250. In the absence of the delivery date change request, the program proceeds to the next process in step 5625 without alteration (step 5622).

In the step 5625, answer information including the delivery destination after the change and the new delivery schedule date (in the absence of the delivery date change request, the delivery schedule date calculated in the step 5620 and in the presence of the delivery date change request, the requested delivery date) is transmitted to the consignee destination freight information system 250.

Next, the processor 1100 compares the new transport route determined in the step 5618 with the transport route before the change registered in the transport route schedule DB 4900 to identify a base station common to the two, a base station newly added to the transport route and a base station removed from the transport route. At that time, the base station r is commanded to write the delivery destination information (name, address, electronic mail and the like) after the change and the requested delivery date (in the presence of a request) into the electronic tag 370 of the freight in question (step 5626).

Subsequently, the processor 1100 informs the in-base station freight information management system 230 in the base station newly added to the transport route of the freight number and the arrival schedule date (step 5630). Further, the freight number of the freight in question, together with pass cancel information indicating that the freight does not pass because of the change of the transport route, is transmitted to the base station excluded from the transport route (step 5632).

After the above process, the processor 1100 erases information in transport route schedule DB 4900 concerning the base station excluded from the transport route and registers base stations following the base station r which are determined to be included in the new transport route and newly calculated freight arrival schedule dates at these base stations in the transport route schedule DB 4900. The processor also updates the changed information in the freight attribute information DB 4700, thus ending the process (step 5634).

On the other hand, when the presence of only the delivery date change request is determined in the step 5616, the processor 1100 decides whether the requested delivery date can be dealt with. In this case, since the arrival schedule date at the consignee destination registered in the transport route schedule DB 4900 coincides with an arrival schedule date on the shortest schedule, it is examined whether a delivery date designated by the delivery date change request is later than the arrival schedule date at the consignee destination registered in the transport route schedule DB 4900. When the requested delivery date is earlier than the arrival schedule date, the delivery date change request cannot be dealt with and therefore the processor 1100 ends the process. At that time, inability to deal with and information for requesting the change of the delivery date are transmitted to the consignee destination freight information system 250 (step 5636). In case the delivery date change request can be dealt with, the processor 1100 transmits answer information including the freight number of the freight in question and the delivery schedule date in the form of the date designated by the delivery date change request to the consignee destination freight information management system 250 (step 5640).

Next, the processor 1100 informs the base station r of the change of the delivery schedule date and commands it to write the changed delivery date into an electronic tag 370 of the freight in question (step 5642). Thereafter, the processor 1100 updates the arrival schedule date at the consignee destination in the transport route schedule DB 4900 and the desirable delivery date in the freight attribute information DB 4700 with the requested delivery date, thus ending the process (step 5644).

In the consignee destination information management system 250, when the answer information sent from the freight information overall management system 245 is received, the answer to the change request is confirmed by the consignee (step 5624). In the in-base station freight information management system 230, when the information sent from the freight information overall management system 245 is received, the following process is carried out. In case the base station is the base station r, delivery destination/date change information concerning the freight in question is prepared on the basis of the received information and registered in the delivery destination/date change information DB 3000. In the base station newly added in the transport route, the freight number and arrival schedule date are registered as new arrival schedule freight on the basis of the received information. In the base station excluded from the transport route, register of the arrival schedule freight is erased (step 5627).

<10: Freight Information Offer and Inquiry>

Figure 53:
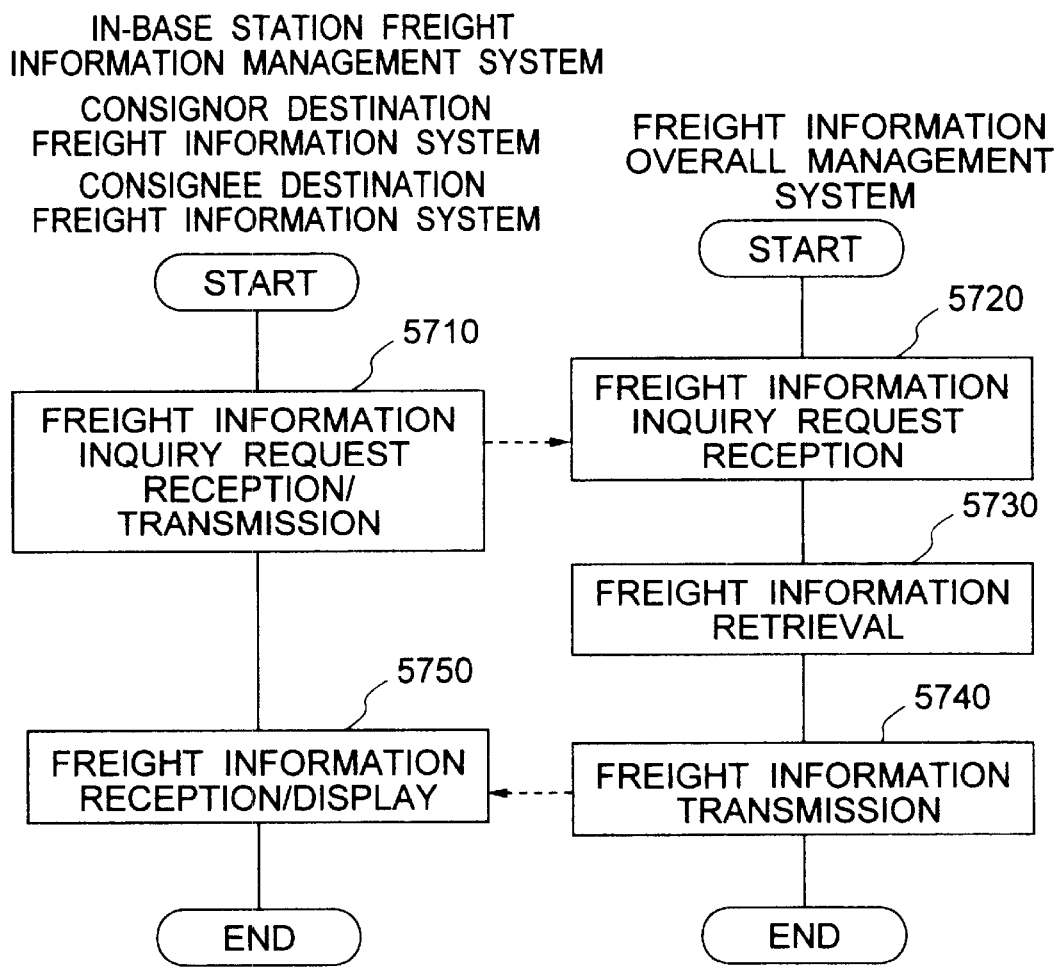
FIG. 53 is a flow chart showing the process flow of the freight information offer process and freight information inquiry process.

FIG. 53 is a flow chart showing the process flow of the freight information offer process 158 and freight information inquiry process.

When the consignee destination freight information system 250, the consignor destination freight information system 210 or the in-base station freight information management system 230 receives a request for inquiry of freight information, it transmits the inquiry request to the freight information overall management system 245 (step 5710).

When receiving the inquiry request of the freight information (step 5720), the freight information overall management system 245 retrieves the transport route schedule DB 4900 and freight transport history DB 4800 in accordance with the contents of the received inquiry request to extract information serving as an answer to the inquiry. For example, in response to an inquiry about the delivery schedule date of freight from the consignee, the transport route schedule DB 4900 may be retrieved to extract a date of delivery of the freight in question to the consignee destination. In response to an inquiry about the present position of freight, the freight transport history DB 4800 may be retrieved to extract the latest information on the freight in question. In case an inquiry about work classified persons in charge, mail names of transport means or the like is made for the purpose of troubleshooting at a base station, the freight transport history DB 4800 can be retrieved to obtain necessary information. In case the inquiry is carried out in accordance with the freight attribute such as the consignee, the freight attribute DB 4700 is retrieved by using information designated by the inquiry to obtain a freight number and retrieval is effected in accordance with the obtained freight number (step 5730). The information obtained in the step 5730 is transmitted to the consignee destination information system 250, the consignor destination freight information system 210 or the in-base station freight information management system 230 of the inquiry originator (step 5740).

When the consignee destination freight information system 250, consignor destination freight information system 210 or in-base station freight information management system 230 receives a response to the inquiry from the freight information overall management system 245, it displays the contents of the response on the output unit 330, 730 or 1030 (step 5750).

<11: Nonarrival Freight Check>

Figure 54:
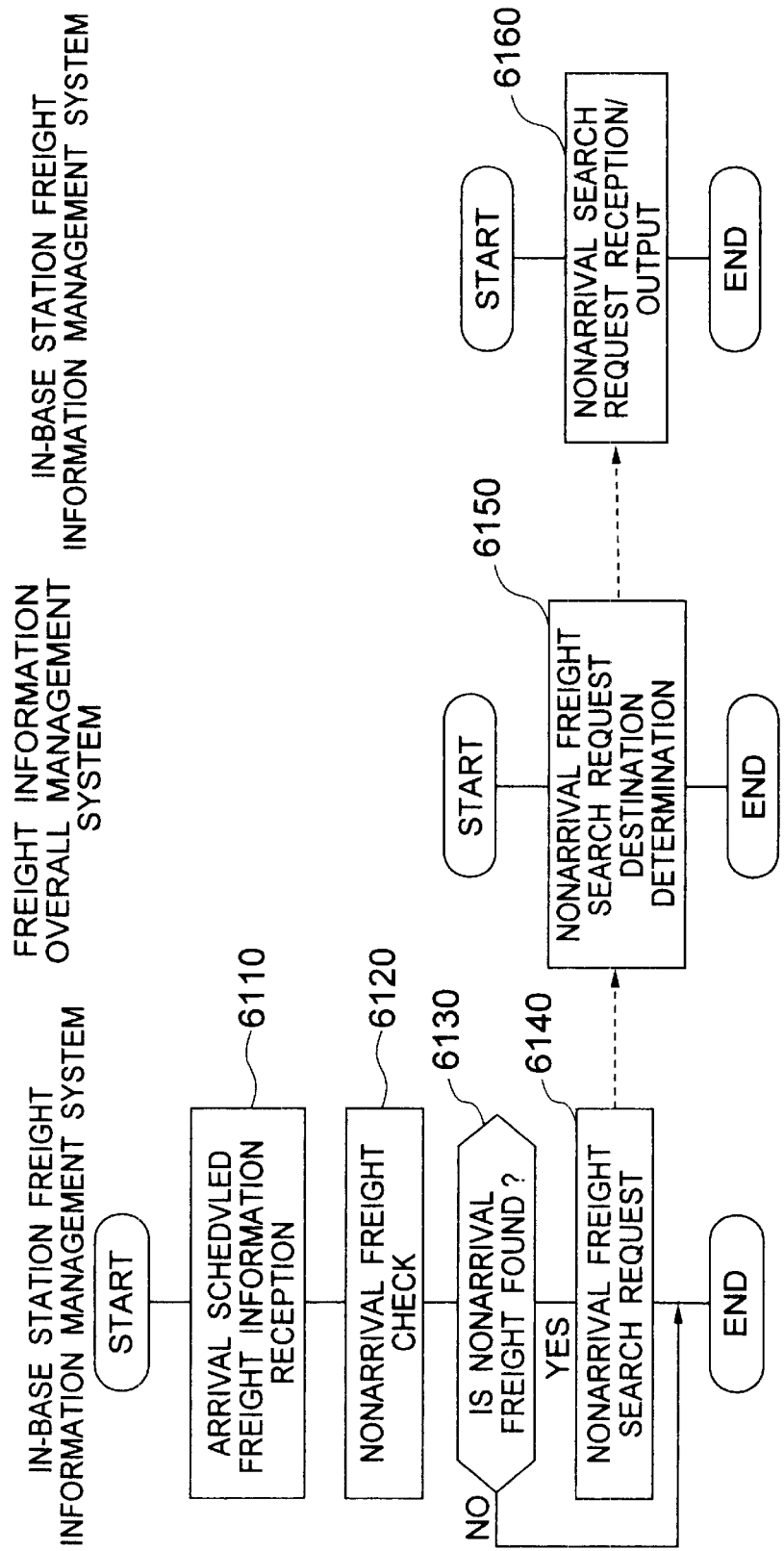
FIG. 54 is a flow chart showing the process flow of nonarrival freight check process 132.

FIG. 54 is a flow chart showing the process flow of the nonarrival freight check process 132.

Figures 55, 56:
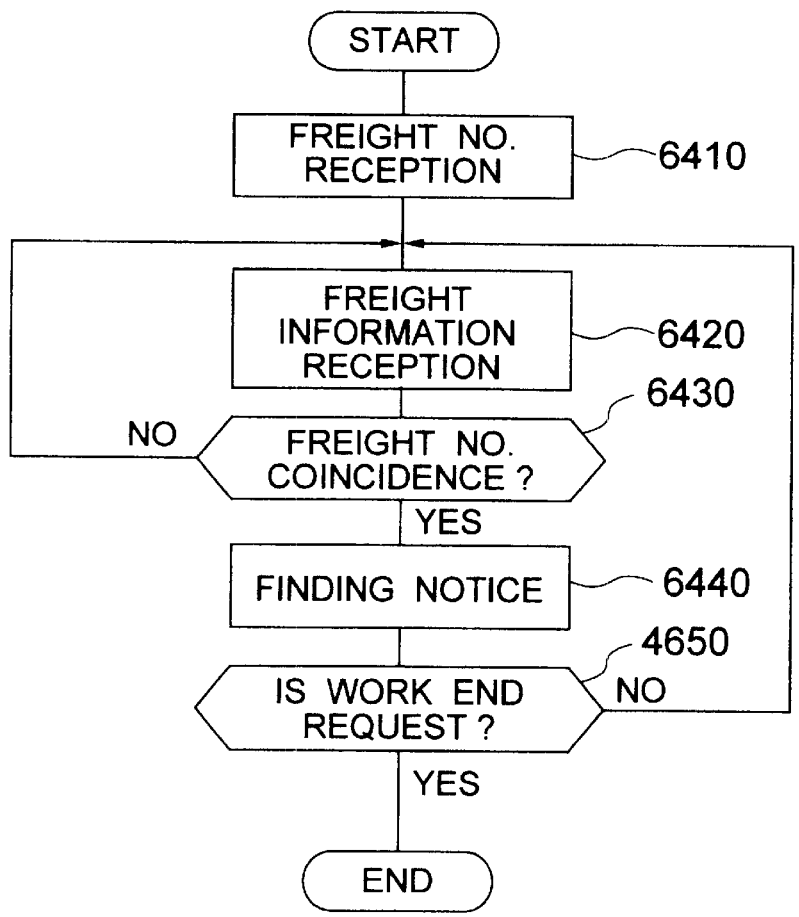
FIG. 55 is a data structural diagram of an arrival scheduled freight information DB.
FIG. 56 is a flow chart of a process carried out by the portable terminal system during search of freight.

In the in-base station freight information management system 230, when arrival scheduled freight information is received from the freight information overall management system 245, the scheduled freight information sent from the processor 700 is stored in an arrival scheduled freight information DB in the storage unit 710. As shown in FIG. 55, the arrival scheduled freight information DB 6000 includes, as information, freight number 6210 of freight scheduled to be arrived and date 6220 on which the freight is expected to be arrived (step 6110).

When a request for nonarrival freight check is inputted from the input unit 720, the processor 700 checks nonarrival freight goods. More specifically, the processor 700 obtains, from the arrival scheduled freight information DB 6000, a freight number 6210 of a record in which a date earlier than the present time is registered in the arrival schedule date 6220. Next, the processor 700 extracts, from the freight pass information DB 3300 in the storage unit 710, a record in which "unloading" is registered in the work index 3340 to obtain a freight number 3310 in the record. The processor 700 compares the freight numbers obtained from the arrival scheduled freight information DB 6000 and freight pass information DB 3300 to extract a freight number which is included in the arrival scheduled freight information DB 6000 but is not included in the freight pass information DB 3300. If an extracted freight number is present, the processor 700 holds that freight number as a nonarrival freight number. At that time, a record of arrival scheduled freight information DB 6000 in which the freight number obtained from the freight pass information DB 3300 is registered in the freight number 6220 is erased.

Next, the processor 700 decides whether a nonarrival freight number is present and in the absence of a nonarrival freight number, it ends the process (step 6130). In the presence of a nonarrival freight number, the processor 700 sends a nonarrival freight search request including the nonarrival freight number to the freight information overall management system 245 through the inter-base station network 260, thus ending the process (step 6140).

In the freight information overall management system 245, when the nonarrival freight search request is received from the in-base station freight information management system 230, the processor 1100 retrieves the freight transport history DB 4800 stored in the storage unit 1110 by using the forwarded freight number as a nonarrival freight number to extract a base station name recorded in the final history from the transport history information of the freight number in question. Then, the processor takes out freight attribute information of the freight number from the freight attribute information DB 4700. The processor 1100 sends a nonarrival freight search request including the freight attribute information and the freight number to the in-base station freight information management system 230 of the base station name previously extracted (step 6150).

The in-base station freight information management system 230 receiving the nonarrival freight search request from the freight information overall management system 245 delivers, as search object freight information, the freight number contained in the forwarded nonarrival freight search request and the freight attribute information of that freight to the output unit 730 (step 6160).

<12: Individual Freight Information Confirmation>

The individual freight information confirming process 166 is carried out by using the portable terminal system 215. The individual freight information confirming process 166 is effected for the purpose of confirming the freight information at, for example, each base station. In this process, information held in an electronic tag 370 attached to freight representing an object to be confirmed is read by the electronic reader/writer 440 of the portable terminal system 215 d freight attribute information such as article, consignor information and consignee information which are contained in the collection request information or pass base station, person in charge of work and pass date which are contained in the freight pass history information are delivered to the output unit 430. FIG. 56 is a flow chart of the process carried out by the portable terminal system 215 during search of freight carried out on the basis of a nonarrival freight search request.

A freight number of nonarrival freight informed to the in-base station freight information management system 230 by a nonarrival freight search request is inputted to the input unit 420 and the processor 400 acquires this freight number (step 6410).

Next, the processor 400 causes the electronic tag reader/writer 440 to read the freight number held by the electronic tag 370 (step 6420). The processor 400 compares the freight number inputted from the input unit 420 with the freight number read out of the electronic tag 370 to examine whether the two coincide with each other (step 6430). When the two do not coincide with each other, the processor 400 returns to the step 6420 to read a freight number of different freight and repeat a similar process. On the other hand, when the two coincide with each other, the processor 400 delivers the coincidence of freight number to the output unit 430 and informs that the freight is found (step 6440).

Thereafter, the processor 400 decides whether a work end request is inputted from the input unit 420. In the presence of the work end request, the processor ends the process but in the absence of the work end request, the processor returns to the process in the step 4620 (step 6450).

Here, the freight of interest is searched by using the freight number as the key but the search can be carried out similarly even when other information than the freight number, for example, the article, consignee name or the like is used as the key.

According to the embodiments set forth so far, information described on the electronic tag is utilized effectively in the freight transportation to realize a managed freight management system which can efficiently deal with the change request of delivery destination/date and handling of freight goods including handling of special freight goods such as fragile or precision machinery and instruments. Also, a managed freight management system can be realized in which irregular conditions such as erroneous arrival, erroneous loading, leave-out, nonarrival of freight and over loading can be dealt with quickly.

The present invention is not limited to the foregoing embodiments but can take various forms within the gist of the present invention. For example, while in the foregoing embodiments, the process for unloading and loading transport freight goods at individual base stations is carried out by cooperation of the on-vehicle system carried on a vehicle with the in-base station freight information management system but in place of the on-vehicle system, a system having the equivalent function to that of the aforementioned on-vehicle system may be provided stationarily in the base station.

What is claimed is:

1. A freight information management method useful in a freight information management system, comprising:
 on the basis of a consignor address and a consignee address of freight requested to be delivered from a consignor destination, determining a delivery route of said freight in a freight information management center;
 writing the determined delivery route into an electronic tag attached to said freight remotely from said freight information management center;
 while said freight is delivered via a plurality of collection/delivery stations in accordance with the delivery route in the electronic tag attached to said freight, determining a redelivery route of said freight in response to a delivery time designated by said consignee in the freight information management center;
 writing the determined redelivery route into said electronic tag attached to said freight remotely from said freight information management center; and
 changing the delivery route of said freight in accordance with the redelivery route in said electronic tag attached to said freight.

2. A freight information management method according to claim 1,
 wherein information concerning said redelivery route is transmitted from said freight information management center to a collection/delivery station where said freight is expected to be collected and remotely written into said electronic tag attached to said freight through a reader/writer provided at the collection/delivery station.

* * * * *